US009392022B2

(12) United States Patent
Frascadore et al.

(10) Patent No.: US 9,392,022 B2
(45) Date of Patent: Jul. 12, 2016

(54) METHODS AND APPARATUS TO MEASURE COMPLIANCE OF A VIRTUAL COMPUTING ENVIRONMENT

(71) Applicant: VMware, Inc., Palo Alto, CA (US)

(72) Inventors: Gregory A. Frascadore, Colorado Springs, CO (US); Robert Helander, Colorado Springs, CO (US); James Sullivan, Colorado Springs, CO (US); Rebecca Smith, Peyton, CO (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/069,257

(22) Filed: Oct. 31, 2013

(65) Prior Publication Data

US 2014/0331276 A1    Nov. 6, 2014

Related U.S. Application Data

(60) Provisional application No. 61/819,462, filed on May 3, 2013.

(51) Int. Cl.
| | | |
|---|---|---|
| *H04L 29/06* | (2006.01) | |
| *G06F 21/00* | (2013.01) | |
| *G06F 9/455* | (2006.01) | |
| *G06F 21/57* | (2013.01) | |

(52) U.S. Cl.
CPC ............ *H04L 63/20* (2013.01); *G06F 9/45558* (2013.01); *G06F 21/00* (2013.01); *G06F 21/577* (2013.01); *H04L 63/104* (2013.01); *H04L 63/1433* (2013.01); *G06F 2009/45591* (2013.01)

(58) Field of Classification Search
CPC . G06F 21/57; G06F 21/577; H04L 29/06904; H04L 63/1433
See application file for complete search history.

(56) References Cited

U.S. PATENT DOCUMENTS

| | | | |
|---|---|---|---|
| 7,369,912 B2 | 5/2008 | Sherriff et al. | |
| 7,587,718 B1 | 9/2009 | Mincarelli et al. | |
| 8,024,733 B2 | 9/2011 | Hambrick et al. | |
| 9,110,695 B1 | 8/2015 | Bent et al. | |
| 2002/0178206 A1 | 11/2002 | Smith | |
| 2005/0008001 A1 | 1/2005 | Williams et al. | |
| 2007/0101331 A1 | 5/2007 | Krebs | |
| 2007/0143851 A1* | 6/2007 | Nicodemus et al. | ............ 726/25 |

(Continued)

OTHER PUBLICATIONS

Wikipedia NPL obtained from Wikipedia.com on Mar. 12, 2015.*

(Continued)

*Primary Examiner* — Tri Tran

(57) ABSTRACT

Methods, apparatus, systems and articles of manufacture are disclosed to measure compliance of a virtual computing environment. An example method disclosed herein includes determining, with a processor, a maximum surprisal value of a policy to be enforced on a computing resource in a computing environment, the maximum surprisal value corresponding to a probability of the computing resource being in-compliance with the policy without testing the computing resource with respect to the policy, determining a current surprisal value of the computing resource with respect to the policy based on knowledge of at least one condition of policy being at least one of satisfied by or inapplicable to the computing resource, and determining a compliance score of the computing resource with respect to the policy based on the maximum surprisal value of the policy and the current surprisal value of the computing resource with respect to the policy.

19 Claims, 28 Drawing Sheets

(56) References Cited

U.S. PATENT DOCUMENTS

| | | |
|---|---|---|
| 2008/0071867 A1 | 3/2008 | Pearson et al. |
| 2010/0162259 A1 | 6/2010 | Koh et al. |
| 2011/0106737 A1 | 5/2011 | Siddalingaprabhu et al. |
| 2012/0173986 A1 | 7/2012 | Jung |
| 2013/0013565 A1 | 1/2013 | Oza |
| 2013/0247133 A1 | 9/2013 | Price et al. |
| 2013/0297799 A1 | 11/2013 | George et al. |

OTHER PUBLICATIONS

Tutorvista NPL obtained from Turovista.com on Mar. 12, 2015.*

Bolker et al. NPL 2007; otained from Google on Aug. 14, 2015.*

BeattheMath 2007 NPL; obtained from Beatthemat.com on Aug. 14, 2015.*

Houmb et al.—2009 NPL—CVSS is an estimated scoring system; obtained from Google on Sep. 14, 2015.*

Wikipedia NPL 2016—Information Theory—calculating Surprisal information.*

Microsoft Developer Network, "FileSystemWatcher Class," <http://msdn.microsoft.com/en-us/library/system.io.filesystemwatcher.aspx>, retrieved Feb. 19, 2014, 11 pages.

Microsoft Developer Network, "Receiving Events at All Times," <http://msdn.microsoft.com/en-us/library/aa393014(VS.85).aspx>, created Oct. 15, 2013, retrieved Feb. 19, 2014, 3 pages.

Hsu, Chih-Wei, Chih-Chung Chang, and Chih-Jen Lin, "A Practical Guide to Support Vector Classification," <http://www.csie.ntu.edu.tw/~cjlin/papers/guide/guide.pdf>, created 2003, updated Apr. 15, 2010, retrieved Feb. 25, 2014, 16 pages.

Chang, Chih-Chung and Chih-Jen Lin, "LIBSVM : a library for support vector machines," <http://www.csie.ntu.edu.tw/~cjlin/papers/libsvm.pdf>, created 2001, updated Mar. 4, 2013, retrieved Feb. 25, 2014, 39 pages.

Marvasti, Mazda A., Arnak V. Poghosyan, Ashot N. Harutyunyan, and Naira M. Grigoryan, "Pattern Detection in Unstructured Data," IFIP/IEEE, International Symposium on Integrated Network Management (IM2013): Experience Session Paper, 2013, retrieved Feb. 25, 2014, 6 pages.

United States Patent and Trademark Office, "Non-Final Office Action", issued in connection with U.S. Appl. No. 14/069,298, dated Jul. 17, 2015 (18 pages).

United States Patent and Trademark Office, "Non-Final Office Action," issued in connection with U.S. Appl. No. 14/069,225, on Feb. 2, 2016, 28 pages.

United States Patent and Trademark Office, "Non-Final Office Action," issued in connection with U.S. Appl. No. 14/069,257 on Sep. 23, 2015, 27 pages.

Ethan D. Bolker and Maura M. Mast, "Relative and Absolute Change Percentages," in non-final Office action issued in connection with U.S. Appl. No. 14/069,257 on Sep. 23, 2015, 6 pages.

"Two Methods to Calculate Total Average Speed," Beat the GMAT, in non-final Office action issued in connection with U.S. Appl. No. 14/069,257 on Sep. 23, 2015, 106 pages.

Siv Hilde Houmb and Virginia N. L. Franqueira, "Estimating ToE Risk Level using CVSS," in non-final Office action issued in connection with U.S. Appl. No. 14/069,257 on Sep. 23, 2015, 8 pages.

* cited by examiner

```
800
└─AND
  └─OR CHECK FOR 32-BIT RULES
802A ⊗  └─CRITERION: CHECK THAT 32-BIT ARCH IS IRRELEVANT FOR THIS ARCHITECHTURE
         UNAME_TEST (OVAL:GOV.NIST.USGCB.RHEL:TST:201670): CHECK_EXISTENCE = AT_LEAST_ONE_EXISTS, CHECK = NONE SATISFY
           UNAME_OBJECT (OVAL:GOV.NIST.USGCB.RHEL:OBJ:201670):
           UNAME_STATE (OVAL:GOV.NIST.USGCB.RHEL:STE:201670):
             PROCESSOR_TYPE: OPERATION=PATTERN MATCH | VALUE = ^ , "$
804A  └─CRITERION: /ETC/AUDIT/AUDIT.RULES CONTAINS -A EXIT,ALWAYS -F ARCH=ARCH -S SETHOSTNAME -S SETDOMAINNAME -K SYSTEM-LOCALE
         TEXTFILECONTENT54_TEST (OVAL:GOV.NIST.USGCB.RHEL:TST:201590): CHECK_EXISTENCE = AT_LEAST_ONE_EXISTS, CHECK = ALL
           TEXTFILECONTENT54_OBJECT (OVAL:GOV.NIST.USGCB.RHEL:OBJ:201590):
             PATH: /ETC/AUDIT
             FILENAME: AUDIT.RULES
             PATTERN: OPERATION = PATTERN MATCH | VALUE=^-A-[SEXIT,ALWAYS[S|-F[SARCH=B32[S|-S|SSETHOSTNAME[S|-S|SSETDOMAINNAME[S|-K[SSYSTEM-LOCALE$
             INSTANCE: DATATYPE=INT / VALUE=1
  └─OR CHECK FOR 64-BIT RULES
802B ⊗  └─CRITERION: CHECK THAT 64-BIT ARCH IS IRRELEVANT FOR THIS ARCHITECHTURE
         UNAME_TEST (OVAL:GOV.NIST.USGCB.RHEL:TST:201672): CHECK_EXISTENCE = AT_LEAST_ONE_EXISTS, CHECK = NONE SATISFY
           UNAME_OBJECT (OVAL:GOV.NIST.USGCB.RHEL:OBJ:201670):
           UNAME_STATE (OVAL:GOV.NIST.USGCB.RHEL:STE:201672):
             PROCESSOR_TYPE: OPERATION=PATTERN MATCH | VALUE = "X86_64$"|A64$
804B  └─CRITERION: /ETC/AUDIT/AUDIT.RULES CONTAINS -A EXIT,ALWAYS -F ARCH=ARCH - S SETHOSTNAME -S SETDOMAINNAME -K SYSTEM-LOCALE
         TEXTFILECONTENT54_TEST (OVAL:GOV.NIST.USGCB.RHEL:TST:201591): CHECK_EXISTENCE = AT_LEAST_ONE_EXISTS, CHECK = ALL
           TEXTFILECONTENT54_OBJECT (OVAL:GOV.NIST.USGCB.OBJ:TST:201591):
             PATH: /ETC/AUDIT
             FILENAME: AUDIT.RULES
             PATTERN: OPERATION = PATTERN MATCH | VALUE=^-A-[SEXIT,ALWAYS[S|-F[SARCH=B64[S|-S|SSETHOSTNAME[S|-S|SSETDOMAINNAME[S|-K[SSYSTEM-LOCALE$
             INSTANCE: DATATYPE=INT / VALUE=1
```

804C — ├CRITERION: /ETC/AUDIT/AUDIT.RULES CONTAINS -W /ETC/ISSUE -P WA -K SYSTEM-LOCALE
TEXTFILECONTENT54_TEST (OVAL:GOV.NIST.USGCB.RHEL.TST:201592): CHECK_EXISTENCE = AT_LEAST_ONE_EXISTS, CHECK = ALL
   TEXTFILECONTENT54_OBJECT (OVAL:GOV.NIST.USGCB.RHEL.OBJ:201592):
      PATH: /ETC/AUDIT
      FILENAME: AUDIT.RULES
      PATTERN: OPERATION=PATTERN MATCH / VALUE=^-W|S|/ETC/ISSUE|S|-P|SWA|S|-K|SSYSTEM|-LOCALE$
      INSTANCE: DATATYPE=INT / VALUE = 1

804D — ├CRITERION: /ETC/AUDIT/AUDIT.RULES CONTAINS -W /ETC/ISSUE.NET -P WA -K SYSTEM-LOCALE
TEXTFILECONTENT54_TEST (OVAL:GOV.NIST.USGCB.RHEL.TST:201593): CHECK_EXISTENCE = AT_LEAST_ONE_EXISTS, CHECK = ALL
   TEXTFILECONTENT54_OBJECT (OVAL:GOV.NIST.USGCB.RHEL.OBJ:201593):
      PATH: /ETC/AUDIT
      FILENAME: AUDIT.RULES
      PATTERN: OPERATION=PATTERN MATCH / VALUE=^-W|S|/ETC/ISSUE|.NET||S|-P|SWA|S|-K|SSYSTEM|-LOCALE$
      INSTANCE: DATATYPE=INT / VALUE = 1

804E — ├CRITERION: /ETC/AUDIT/AUDIT.RULES CONTAINS -W /ETC/HOSTS -P WA -K SYSTEM-LOCALE
TEXTFILECONTENT54_TEST (OVAL:GOV.NIST.USGCB.RHEL.TST:201594): CHECK_EXISTENCE = AT_LEAST_ONE_EXISTS, CHECK = ALL
   TEXTFILECONTENT54_OBJECT (OVAL:GOV.NIST.USGCB.RHEL.OBJ:201594):
      PATH: /ETC/AUDIT
      FILENAME: AUDIT.RULES
      PATTERN: OPERATION=PATTERN MATCH / VALUE=^-W|S|/ETC/HOSTS|S|-P|SWA|S|-K|SSYSTEM|-LOCALE$
      INSTANCE: DATATYPE=INT / VALUE = 1

802C ⊗ ├CRITERION: /ETC/AUDIT/AUDIT.RULES CONTAINS -W /ETC/SYSCONFIG/NETWORK -P WA -K SYSTEM-LOCALE
TEXTFILECONTENT54_TEST (OVAL:GOV.NIST.USGCB.RHEL.TST:201595): CHECK_EXISTENCE = AT_LEAST_ONE_EXISTS, CHECK = ALL
   TEXTFILECONTENT54_OBJECT (OVAL:GOV.NIST.USGCB.RHEL.OBJ:201595):
      PATH: /ETC/AUDIT
      FILENAME: AUDIT.RULES
      PATTERN: OPERATION=PATTERN MATCH / VALUE=^-W|S|/ETC/SYSCONFIG/NETWORK|S|-P|SWA|S|-K|SSYSTEM|-LOCALE$
      INSTANCE: DATATYPE=INT / VALUE = 1

METHODS AND APPARATUS TO MEASURE COMPLIANCE OF A VIRTUAL COMPUTING ENVIRONMENT

RELATED APPLICATIONS

This patent arises from a non-provisional application which claims the benefit of U.S. Provisional Application Ser. No. 61/819,462, filed on May 3, 2013, which is hereby incorporated herein by reference in its entirety.

FIELD OF THE DISCLOSURE

This disclosure relates generally to virtual computing, and, more particularly, to methods and apparatus to measure compliance of a virtual computing environment.

BACKGROUND

Compliance policies are often used to monitor and maintain resources deployed in computing environments such as data centers. Policies such as the Payment Card Industry Data Security Standard, the Department of Defense Information Assurance Certification and Accreditation Process, vendor-supplied hardening guides, etc., provide strong guidelines for handling and protecting sensitive data. Failure by an organization to comply with these standards may result in loss of revenue, loss of reputation, and/or loss of accreditation.

BRIEF DESCRIPTION OF THE DRAWINGS

FIGS. 8A and 8B illustrate an example compliance events record generated by the example compliance monitor of FIGS. 2 and/or 3 to log compliance states of a computing resource with different criteria of a compliance policy rule.

DETAILED DESCRIPTION

Figure 1:
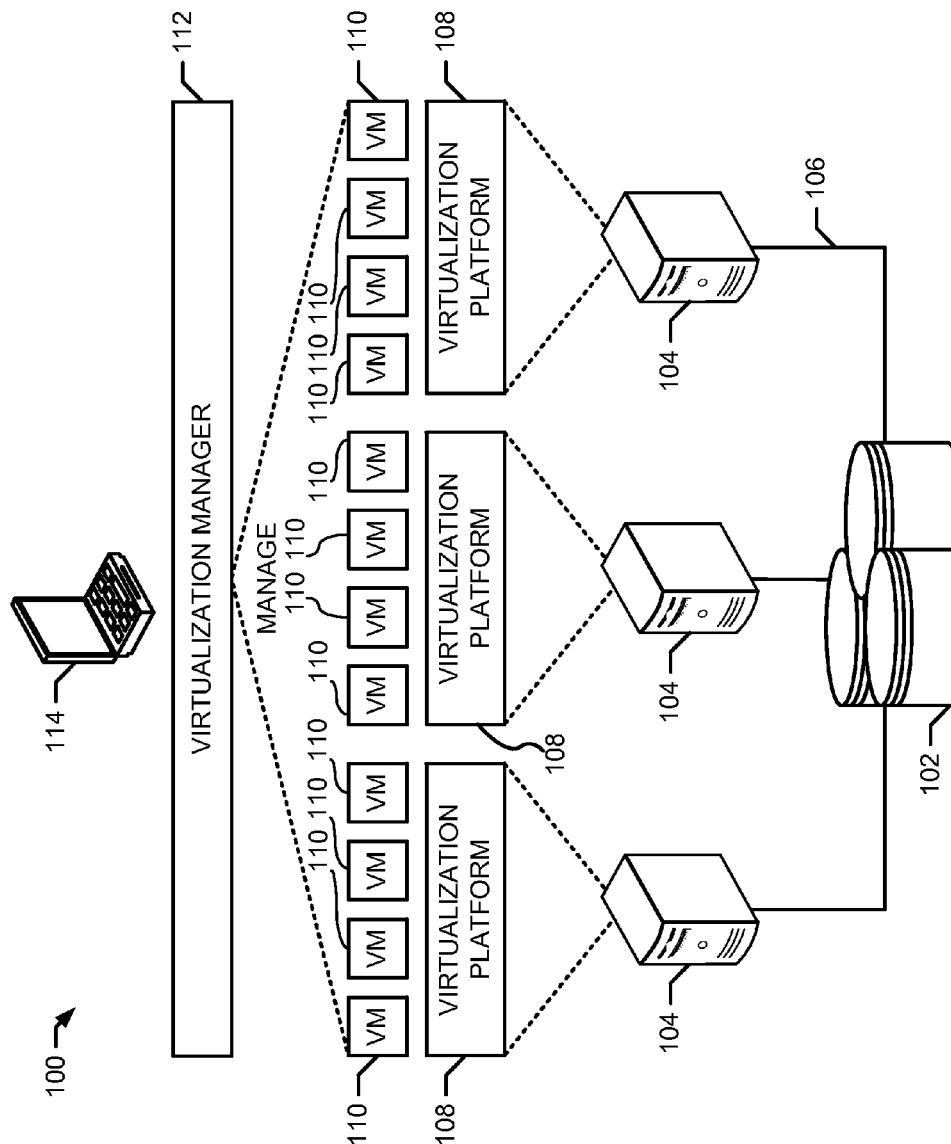
FIG. 1 is an illustration of an example virtual computing environment.

Physical computing environments include physical computing resources such as servers, storage devices, etc. Physical computing resources may be expensive to maintain and/or may require specialized knowledge to operate and/or service. Virtual computing environments (sometimes referred to as "virtual data centers") virtualize such physical resources or physical components making it possible for someone who does not actually own the physical computing resources (e.g., servers, storage components and networks) to utilize the resources through commercial transactions. Virtualizing aggregates and presents various physical resources as virtual resources in a virtual computing environment.

Over time, sensitive data and information has accumulated in virtual computing environments as virtual computing has been adopted in more and more industries. For example, computing environments may store medical records, credit card information, user identification information (e.g., social security numbers), etc. Organizations are under strenuous requirements to protect information stored within their computing environments. When combined with the trend towards virtualization, the growing inventory of virtual machines, and the emergence of software-defined data centers (e.g., virtual data centers), the task of ensuring compliance with various regulations and standards has become daunting. Further, given budget and other constraints, organizations must manage larger, more complex environments with the same or fewer information technology (IT) maintenance and management resources. Such stretching of resources makes compliance an even greater challenge. As the quantity of stored data has exploded in the virtualization era, server configuration analysis has become time-consuming and often requires multiple tools.

Compliance policies are used to increase the security and/or privacy protections of computing environments. Such policies define rules for computing resource configurations (e.g., configuration settings) within the computing environments. Different compliance policies define different sets and/or types of rules and/or requirements for deployment and/or configuration settings of physical and/or virtual computing environments (e.g., physical and/or virtual data centers). Thus, a compliance policy describes the state and/or states that a computing environment and/or its resources should be in (e.g., a compliant posture) when the computing environment and/or its resources are in compliance with a policy. A compliance posture is a level of assurance that adequate controls have been implemented to meet the goals of a policy (e.g., information protection). A computing resource (or a computing asset) is a type of resource with inspect-able attributes and/or properties. A configuration of the computing resource refers to the state of the various attributes and/or properties. A configuration policy defines the configuration(s) acceptable for compliant operation. Computing resources include physical hosts, virtual machines, virtual network configurations, data structures, data centers, software applications, etc. The configuration settings of a computing resource may be subject to two or more policies having different purposes. For example, a computing resource may be subject to one or more policies to preserve information security, one or more policies to satisfy legal or regulatory requirements, one or more policies to satisfy corporate or industry standards, one or more policies to maintain high performance or efficiency, one or more policies to satisfy contractual or quality of service goals, etc.

Different compliance policies (sometimes referred to as "policies," "regulations," "benchmarks," "guidelines," "standards" or "best-practices") may originate from different policy writing organizations such as the National Institute of Standards (NIST), the Center for Internet Security (CIS), industry groups like the Payment Card Industry (PCI), regulations like the Health Insurance Portability and Accountability Act (HIPAA), and/or product manufacturers. Each policy represents a standard of operation with which a computing resource configuration must comply. Since policies originate with different entities, the policies may be inconsistent with each other. For example, a first policy may specify that a system must rotate log files so that logs never exhaust disk space, while a second policy may require that logs persist forever and that the system must cease operation if log storage space becomes exhausted.

An assessment (sometimes referred to as a "compliance assessment," a "policy assessment" or a "compliance test") tests whether a resource adheres to a designated set of policies. Conventionally, policies are made available to system administrators as human-readable language (e.g., English) documents that put the onus on the system administrator to read, interpret and determine whether a computing environment is in compliance with the policy. In some examples, to reduce unnecessary business risk, policy publishers and/or organizations may provide a policy in a machine-readable form written using a structured language, program, or script. In such a format, the policy may contain one or more rules. Rules are Boolean-valued logical expressions (e.g., expressions constituting criteria formed by combining individual criterion using operators (or connectors) such as the logical AND operator, the logical OR operator, or the logical NOT operator). Each criterion implements either a Boolean-valued test of one resource configuration (e.g., a property) setting, or a reference by name to another criterion, set of criteria, or a rule. When executed in software, machine-readable policies automate the process of regulatory compliance.

When software is used to automate assessment (e.g., via Open Vulnerability Assessment Language (OVAL) or Extensible Configuration Checklist Description Format (XCCDF)), a management application managing a virtual computing environment can automatically test the virtual computing environment against numerous policies. When an acceptable compliance posture is achieved, the management application attempts to maintain the compliant posture. Thus, the management application must effectively respond to changes in the environment (e.g., events) and inform a system administrator (or operator) of the impact of the change(s).

FIG. 1 is an illustration of an example virtual computing environment 100. The example virtual computing environment 100 of FIG. 1 includes an example network of storage arrays 102 in communication with example computing servers 104. The example network of storage arrays 102 may be implemented using any suitable wired and/or wireless storage including, for example, one or more Fiber Channel Storage Area Network (SAN) arrays, one or more Internet Small Computer System Interface (iSCSI) SAN arrays, one or more Network Attached Storage (NAS) arrays, etc. In the illustrated example, the network of storage arrays 102 are connected to and shared between groups of servers through storage area networks, thereby enabling aggregating storage resources and enabling increased flexibility in provisioning the storage resources to, for example, example virtual machines 110.

In the illustrated example of FIG. 1, the example storage servers 104 may be x86 servers in communication with the example network of storage arrays 102 via an example network 106. The network 106 of FIG. 1 may be implemented using any suitable wired and/or wireless network(s) such as, for example, one or more data buses, one or more Local Area Networks (LANs), one or more wireless LANs, one or more cellular networks, the Internet, etc.

In the illustrated example of FIG. 1, the example computing servers 104 provide example virtualization platforms 108. The example virtualization platforms 108 of FIG. 1 respectively execute on corresponding ones of the example computing servers 104. An example virtualization platform 108 (sometimes referred to as a "virtualization layer," a "hypervisor" or a "virtual machine monitor") abstracts processor, memory, storage and/or other resources of the computing server 104 into one or more virtual machines 110. In the illustrated examples, a virtual machine 110 includes an operating system and/or executes one or more applications (sometimes referred to herein as "appliances"). In some examples, the virtualization platform 108 may be installed on a computing server 104 without an operating system (e.g., a bare metal hypervisor). In some examples, the virtualization platform 108 may be installed on a storage device rather than on a computing server. The example virtualization platform 108 virtualizes and aggregates the underlying physical hardware resources (e.g., the example network of storage arrays 102 and/or the example computing servers 104) across the physical computing environment and provides pools of virtual resources available for use in the virtual computing environment 100. Thus, by using the resources available from the physical components of the virtual computing environment 100, the example virtual machines 110 may request resources dynamically as a workload increases or release resources dynamically as the workload decreases.

The example virtual machines 110 of FIG. 1 may be designated to a particular host, cluster or resource pool, or a data center when they are created. A host is a virtual representation of computing and memory resources of a physical computing server 104 executing a virtualization platform 108. When two or more physical computing servers 104 are grouped to work and be managed as a whole (e.g., as a single entity or computing resource), the aggregate computing and memory resources may be referred to as a cluster. In some examples, a computing server may be dynamically added or removed from a cluster. Computing and memory resources from hosts and/or clusters may be partitioned into a hierarchy of resource pools.

To manage the virtual computing environment 100, the example virtual computing environment 100 of FIG. 1 includes an example virtualization manager 112. The example virtualization manager 112 provides a single point of control to the virtual computing environment 100. In the illustrated example, the virtualization manager 112 manages the assignments of virtual machines 110 to be virtualized on corresponding ones of the computing servers 104, and manages the assignments of resources of the computing servers 104 to the virtual machines 110. In the illustrated example, the virtual computing environment 100 is accessible via an example management client 114. For example, a virtual machine 110 in the virtual computing environment 100 may be accessed via a web access interface through a web browser of the client 114. In some other examples, the virtualization manager 112 may include one or more interfaces that enable other applications to manage the example virtual computing environment 100 and access the example virtualization platforms 108 and/or the example virtual machines 110.

Figure 2:
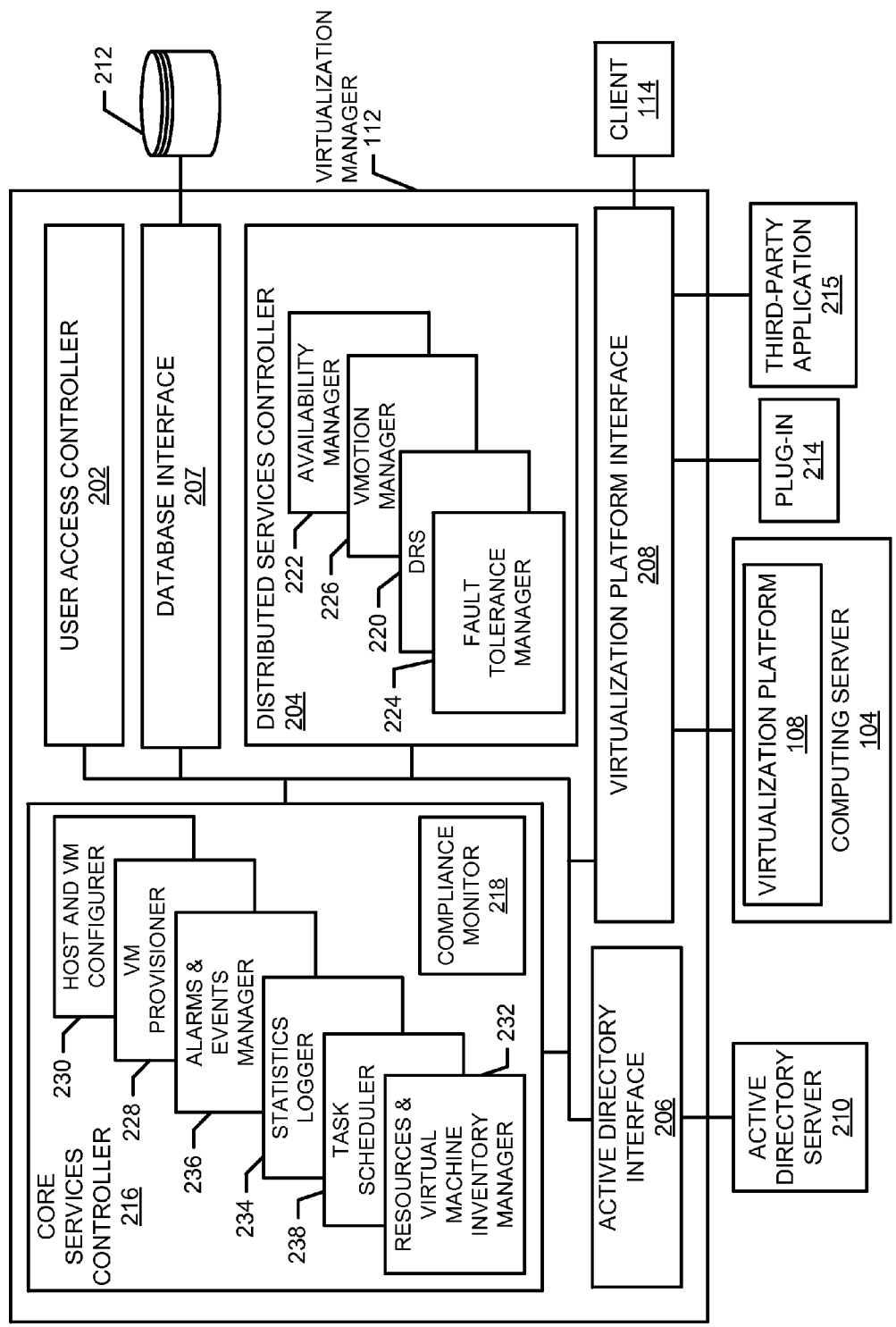
FIG. 2 is a block diagram of an example implementation of the example virtualization manager of FIG. 1.

FIG. 2 is a block diagram of an example implementation of the example virtualization manager 112 of FIG. 1. In the illustrated example of FIG. 2, the virtualization manager 112 enables centralized management of the example virtual computing environment 100. The example virtualization manager 112 aggregates physical resources via the example virtualization platforms 108 and presents a central collection of dynamic resources that may be provisioned to example virtual machines 110 in the virtual computing environment 100. In the illustrated example, the virtualization manager 112 includes an example user access controller 202, an example distributed services controller 204, an example active directory interface 206, an example database interface 207, an example virtualization platform interface 208 and an example core services controller 216.

In the illustrated example of FIG. 2, the user access controller 202 enables creating and managing different levels of access to the virtualization manager 112 based on, for example, different user classes. User classes define different access rights to different users. For example, users in a first user class may be permitted to create and manage physical virtualization hardware in the virtual computing environment 100, while users in a second user class may be permitted to manage virtual resources within a particular resource pool in a virtual machine cluster.

In the illustrated example of FIG. 2, the example distributed services controller 204 enables extending the capabilities of a virtualization platform 108 beyond a single computing server 104. For example, the distributed services controller 204 may include an example distributed resource scheduler (DRS) 220 to allocate and/or balance computing capacity dynamically across collections of hardware resources for virtual machines 110 (FIG. 1), an example availability manager 222 to enable restarting a virtual machine 110 on another computing server 104 if, for example, an initial computing server hosting the virtual machine 110 fails, an example fault tolerance manager 224 to enable creating a secondary copy of an original (or primary) virtual machine 110, an example vMotion manager 226 to enable migration of virtual machine(s) from one computing server 104 to another computing server, etc.

In the illustrated example of FIG. 2, the virtualization manager 112 includes example interfaces 206, 207, 208 to enable integrating additional or third party applications with the virtualization manager 112. For example, the active directory interface 206 of the illustrated example enables communicating with an example active directory server 210 to, for example, obtain user access control information. In the illustrated example, the database interface 207 enables the virtualization manager 112 to communicate with an example database 212 to store information such as virtual machine configurations, host configurations, resources and virtual machine inventory, performance statistics, events, alarms, user permissions and/or roles, etc. The example virtualization platform interface 208 of the illustrated example enables the virtualization manager 112 to communicate with one or more application plug-ins 214, third party applications 215 and/or management clients (e.g., the example management client 114 of FIG. 1).

In the illustrated example of FIG. 2, the virtualization manager 112 includes the example core services controller 216 to provide management services for the virtual computing environment 100. For example, the core services controller 216 may include an example virtual machine provisioner 228 (to manage automated provisioning of virtual machines and their resources), an example host and virtual machine configurer 230 (to enable configuring hosts and virtual machines in the virtual computing environment 100), an example resources and virtual machine inventory manager 232 (to organize and manage virtual machines and resources in the virtual computing environment 100), an example statistics logger 234 (to log and report performance and resource usage statistics of computing resources such as virtual machines, hosts, storage devices, and/or clusters), an example alarms and events manager 236 (to track and warn users about potential resource overuse or event conditions), an example task scheduler 238 (to schedule actions to occur at a given time), etc.

In the illustrated example of FIG. 2, the core services controller 216 includes an example compliance monitor 218 to monitor policy compliance of the virtual computing environment 100. Although the compliance monitor 218 may be implemented as an application in the core services controller 216 in FIG. 2, the example compliance monitor 218 may alternatively be included as a plug-in (e.g., the example plug-in 214) and communicate with the example virtualization manager 112 via the virtualization platform interface 208. In the illustrated example, the compliance monitor 218 receives a notification when an event (e.g., a configuration change in one or more computing resources of the virtual computing environment 100) is detected. The compliance monitor 218 of the illustrated example assesses the impact of the event on the compliance posture of one or more resources with respect to one or more policies that are enforced in the virtual computing environment 100.

While an example manner of implementing the example virtualization manager 112 of FIG. 1 is illustrated in FIG. 2, one or more of the elements, processes and/or devices illustrated in FIG. 2 may be combined, divided, re-arranged, omitted, eliminated and/or implemented in any other way. Further, the example user access controller 202, the example distributed services controller 204, the example active directory interface 206, the example database interface 207, the example virtualization platform interface 208, the example active directory server 210, the example database 212, the example plug-in 214, the example third party application 215, the example core services controller 216, the example compliance monitor 218, the example distributed resource scheduler 220, the example availability manager 222, the example fault tolerance manager 224, the example vMotion manager 226, the example virtual machine provisioner 228, the example host and virtual machine configurer 230, the example resources and virtual machine inventory manager 232, the example statistics logger 234, the example alarms and events manager 236, the example task scheduler 238 and/or, more generally, the example virtualization manager 112 of FIG. 1 may be implemented by hardware, software, firmware and/or any combination of hardware, software and/or firmware. Thus, for example, any of the example user access controller 202, the example distributed services controller 204, the example active directory interface 206, the example database interface 207, the example virtualization platform interface 208, the example active directory server 210, the example database 212, the example plug-in 214, the example third party application 215, the example core services controller 216, the example compliance monitor 218, the example distributed resource scheduler 220, the example availability manager 222, the example fault tolerance manager 224, the example vMotion manager 226, the example virtual machine provisioner 228, the example host and virtual machine configurer 230, the example resources and virtual machine inventory manager 232, the example statistics logger 234, the example alarms and events manager 236, the example task scheduler 238 and/or, more generally, the example virtualization manager 112 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user access controller 202, the example distributed services controller 204, the example active directory interface 206, the example database interface 207, the example virtualization platform interface 208, the example active directory server 210, the example database 212, the example plug-in 214, the example third party application 215, the example core services controller 216, the example compliance monitor 218, the example distributed resource scheduler 220, the example availability manager 222, the example fault tolerance manager 224, the example vMotion manager 226, the example virtual machine provisioner 228, the example host and virtual machine configurer 230, the example resources and virtual machine inventory manager 232, the example statistics logger 234, the example alarms and events manager 236 and/or the example task scheduler 238 is/are hereby expressly defined to include a tangible computer readable storage device or storage disk such as a memory, a digital versatile disk (DVD), a compact disk (CD), a Blu-ray disk, etc. storing the software and/or firmware. Further still, the example virtualization manager 112 of FIG. 1 may include one or more elements, processes and/or devices in addition to, or instead of, those illustrated in FIG. 2, and/or may include more than one of any or all of the illustrated elements, processes and devices.

Figure 3:
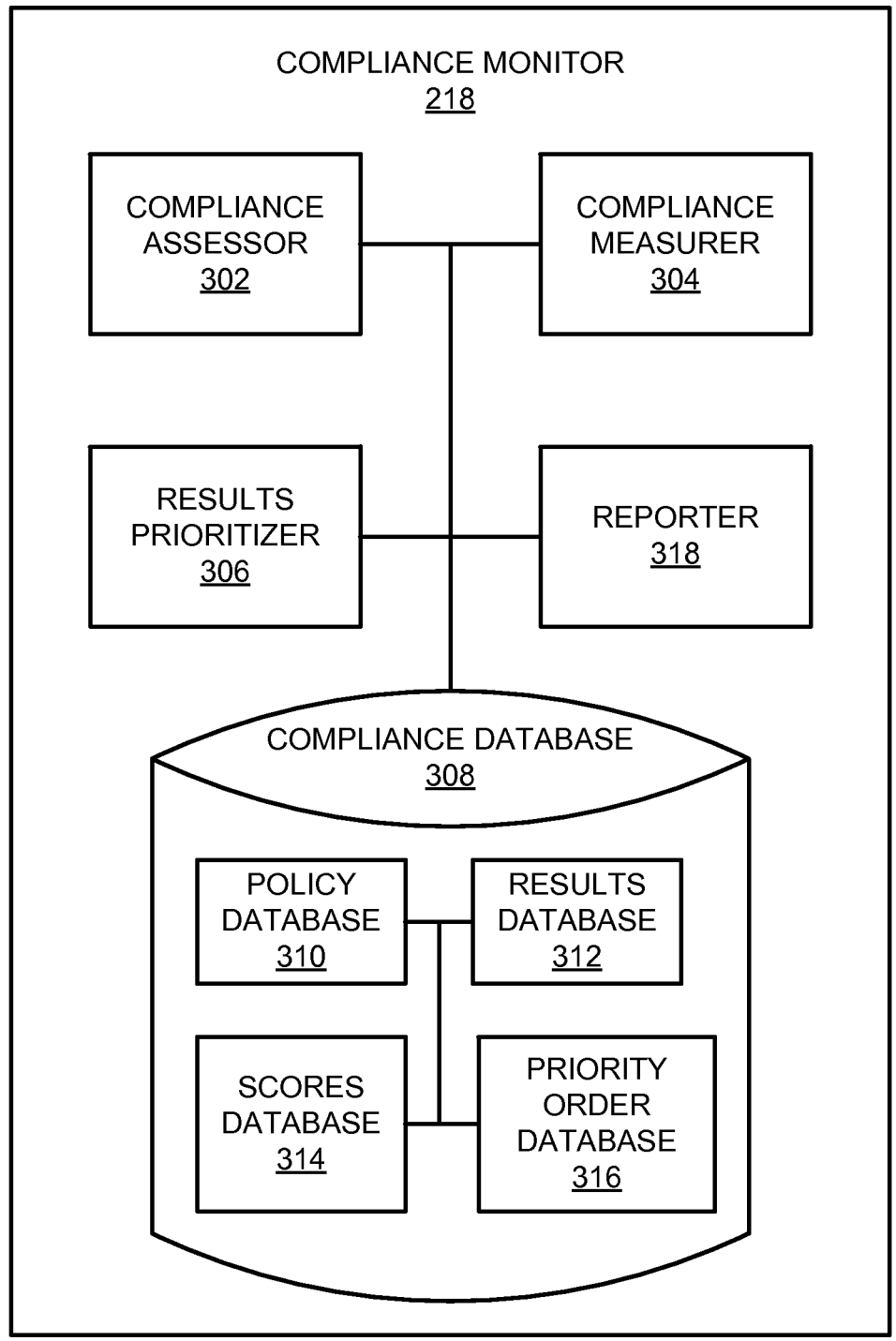
FIG. 3 is a block diagram of an example implementation of the example compliance monitor of FIG. 2.

FIG. 3 is a block diagram of an example implementation of the example compliance monitor 218 of the example virtualization manager 112 of FIG. 2. The example compliance monitor 218 enables determining policy compliance states of the computing resources of the virtual computing environment 100 and identifying computing resources that are not in compliance with the policies. In the illustrated example of FIG. 3, the example compliance monitor 218 includes an example compliance assessor 302, an example compliance measurer 304, an example results prioritizer 306, an example compliance database 308 and an example reporter 318. The example policy database 310 stores the policy (or policies) enforced in the virtual computing environment 100 of FIG. 1. A policy may be stored in the policy database 310 as a document (or other type of data structure such as a list, a table, etc.) including Boolean-valued checks for the policy.

The example compliance monitor 218 of FIG. 3 includes the example compliance assessor 302 to assess or determine policy compliance of computing resources in real-time (or substantially near real-time) after a configuration change occurs (e.g., when a change event is detected) in the virtual computing environment 100. For example, the compliance assessor 302 may monitor an event stream that signals configuration changes to computing resources in the virtual computing environment 100. When an event corresponding to a configuration change of a computing resource (e.g., the example network of storage arrays 102 (FIG. 1), the example computing resources 104 (FIG. 1), the example virtualization platform 108 (FIG. 1), and/or the example virtual machines 110) is detected, the example compliance assessor 302 identifies other computing resources that are affected by the event. For example, the compliance assessor 302 may use an inventory list of computing resources that relate to other computing resources. The compliance assessor 302 of the illustrated example also tests those computing resources against compliance policies enforced in the virtual computing environment 100 (e.g., by automatically applying policy rules, checks, and/or tests to the states of data structures, resources, etc.). In this manner, the example compliance assessor 302 of FIG. 3 provides updated compliance results (e.g., assessment results) in real-time or substantial real-time (e.g., less than ten seconds). In some examples, the compliance assessor 302 pre-populates the policy database 310 with one or more policies, populates the policy database 310 with a specified policy (or policies), and/or updates the policy database 310 periodically (e.g., every 24 hours, every Monday at 9:00 AM, etc.) and/or aperiodically (e.g., when prompted to update) with updates to existing policies such as modifying, adding, or removing criteria. In some examples, the compliance assessor 302 stores the assessment results and/or other corresponding information in the example results database 312 of the compliance database 308.

The example compliance monitor 218 of FIG. 3 includes the example compliance measurer 304 to measure the extent to which a computing resource is adhering to compliance policies during operation. By measuring compliance, the example compliance measurer 304 may use a compliance policy as a metric for measuring the configuration quality of a computing resource. In addition, the example compliance measurer 304 may use a detected event, categorized as a gain or loss of compliance, to determine a normalized compliance score. In some examples, combining compliance scores over time, over groups of computing resources (e.g., a cluster of virtual machines 110) and/or with other policies enables the example compliance measurer 304 to distinguish relevant events from irrelevant events (e.g., configuration changes that increase or decrease a compliance score versus configuration changes that do not affect the compliance score), to track compliance trends, to identify compliance issues that are of greater importance to the corresponding user based on historical data, etc. In some examples, the compliance measurer 304 stores the scores and/or other corresponding information in the example scores database 314 of the compliance database 308.

The example compliance monitor 218 of FIG. 3 includes the example results prioritizer 306 to prioritize (e.g., flag, identify, etc.) results of compliance assessments based on historical performances or actions of an organization (e.g., a system administrator, an information technology (IT) administrator, etc.). The example results prioritizer 306 analyzes historical data to determine the importance of an assessment result to an organization based on past actions responding to the same type(s) of assessment results. In the illustrated examples, historical data includes previous assessment results (e.g., as determined by the example compliance assessor 302), responses to the results (e.g., repairing a defect), changes in compliance scores (e.g., as calculated by the example compliance measurer 304), rates of changes to compliance scores (e.g., as calculated by the example compliance measurer 304), etc. For example, if a first computing resource fails a Payment Card Industry (PCI) test (e.g., generates a first defect) and a second computing resource fails a Center for Internet Security (CIS) test (e.g., generates a second defect), the example results prioritizer 306 analyzes historical data to determine whether historical response times are quicker (e.g., reduce defects at a greater rate) to address (e.g., repair, remediate, etc.) computing resources that fail a PCI test or to address repairs to computing resources that fail a CIS test. In some such examples, the results prioritizer 306 may prioritize the first and second defects accordingly (e.g., the first defect flagged to be addressed before the second defect) based on, for example, previous responses or rates of responses to similar defects. In some examples, the results prioritizer 306 stores the priority order and/or other corresponding information in the example priority order database 316 of the compliance database 308 for display to a user in, for example, a results report.

The example compliance monitor 218 of FIG. 3 includes the example reporter 318 to generate reports based on information stored in the compliance database 308. For example, the reporter 318 of the illustrated example retrieves assessment results stored in the results database 312 and generates a report identifying the assessment results for a computing resource(s), a policy (or policies) that was/were tested, satisfied and/or failed, the virtual computing environment 100, etc. In some examples, the reporter 318 retrieves compliance scores from the scores database 314 and generates a report identifying the compliance scores for a computing resource(s), a policy (or policies), the virtual computing environment 100, etc. In some examples, the reporter 318 retrieves rankings from the priority order database 316 and generate a report identifying the ranked order of the assessment results to facilitate correcting issues in an order consistent with past practices. The example reporter 318 of FIG. 3 may generate reports as documents for printout, as a graphical user interface for display via, for example, a monitor, etc.

While an example manner of implementing the example compliance monitor 218 of FIG. 2 is illustrated in FIG. 3, one or more of the elements, processes and/or devices illustrated in FIG. 3 may be combined, divided, re-arranged, omitted, eliminated and/or implemented in any other way. Further, the example compliance assessor 302, the example compliance measurer 304, the example results prioritizer 306, the example compliance database 308, the example policy database 310, the example results database 312, the example scores database 314, the example priority order database 316, the example reporter 318 and/or, more generally, the example compliance monitor 218 of FIG. 2 may be implemented by hardware, software, firmware and/or any combination of hardware, software and/or firmware. Thus, for example, any of the example compliance assessor 302, the example compliance measurer 304, the example results prioritizer 306, the example compliance database 308, the example policy database 310, the example results database 312, the example scores database 314, the example priority order database 316, the example reporter 318 and/or, more generally, the example compliance monitor 218 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example compliance assessor 302, the example compliance measurer 304, the example results prioritizer 306, the example compliance database 308, the example policy database 310, the example results database 312, the example scores database 314, the example priority order database 316 and/or the example reporter 318 is/are hereby expressly defined to include a tangible computer readable storage device or storage disk such as a memory, a digital versatile disk (DVD), a compact disk (CD), a Blu-ray disk, etc. storing the software and/or firmware. Further still, the example compliance monitor 218 of FIG. 2 may include one or more elements, processes and/or devices in addition to, or instead of, those illustrated in FIG. 3, and/or may include more than one of any or all of the illustrated elements, processes and devices.

Figure 4:
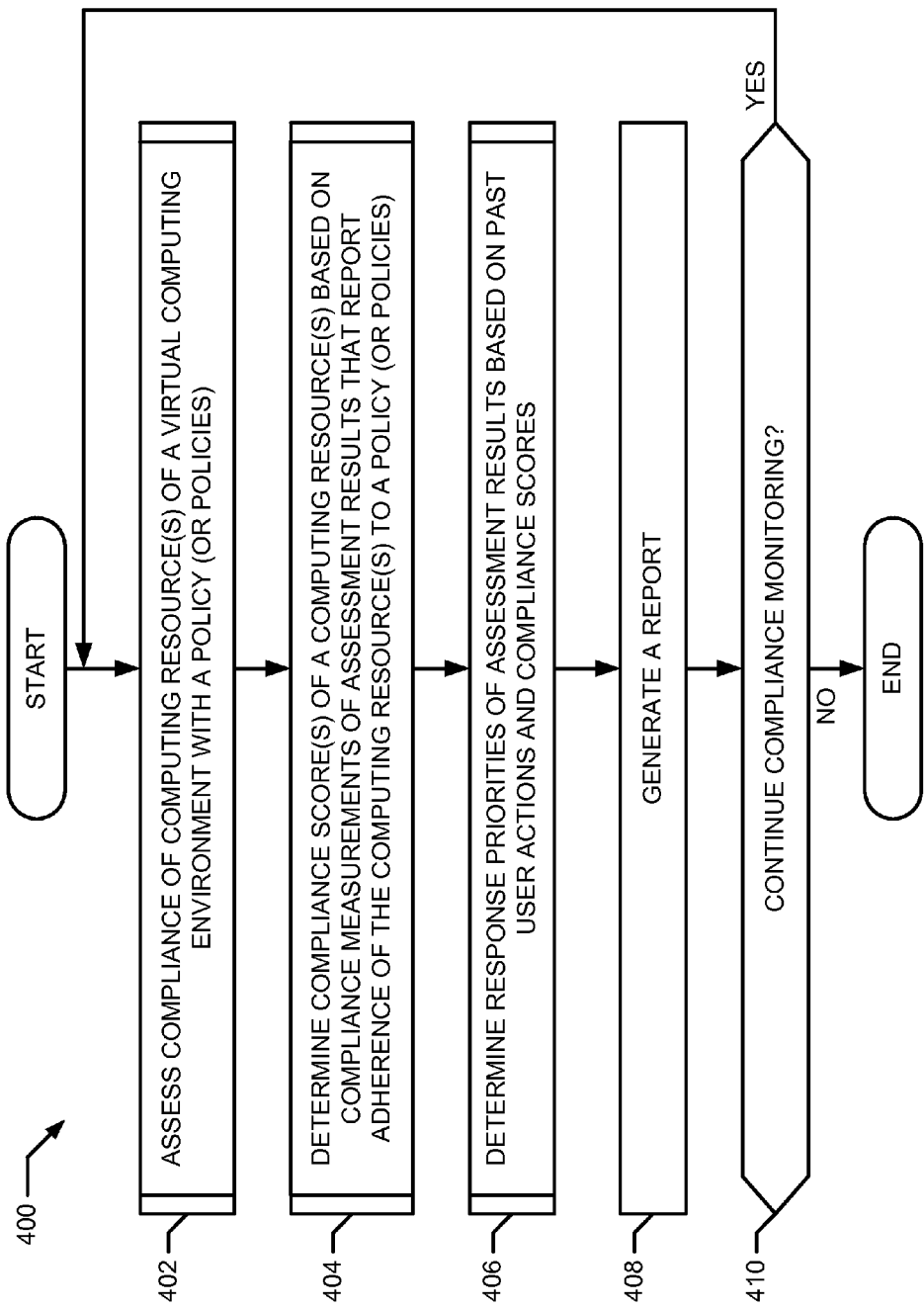
FIG. 4 is a flow chart representative of example machine-readable instructions that may be executed to determine policy compliance of computing resources of a virtual computing environment.

A flowchart representative of example machine-readable instructions for implementing the compliance monitor 218 of FIGS. 2 and/or 3 is shown in FIG. 4. In this example, the machine-readable instructions comprise a program for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowchart illustrated in FIG. 4, many other methods of implementing the example compliance monitor 218 may alternatively be used. For example, the order of execution of the blocks may be changed, and/or some of the blocks described may be changed, eliminated, or combined.

The program of FIG. 4 begins at block 402 when the example compliance assessor 302 (FIG. 3) assesses compliance of one or more computing resources (e.g., the example network of storage arrays 102 (FIG. 1), the example computing servers 104 (FIG. 1), etc.) in the virtual computing environment 100 (FIG. 1) with a policy (or policies). For example, the compliance assessor 302 may receive notification of a newly generated event, identify the computing resource(s) associated with the event, test the identified computing resource(s) for policy compliance, and store the assessment results (e.g., test satisfied or test unsatisfied) in the results database 312 (FIG. 3) of the compliance database 308 (FIG. 3). Example processes disclosed herein that may be used to implement block 402 are described below in connection with FIGS. 5-7.

At block 404, the example compliance measurer 304 (FIG. 3) determines compliance score(s) of the computing resource(s) based on compliance measurements of assessment results that report adherence of the computing resource(s) to the policy (or policies). For example, the compliance measurer 304 may retrieve assessment results from the results database 312, calculate a normalizing factor based on a policy, calculate compliance scores for the policy using the normalizing factor, and store the compliance scores in the scores database 314 (FIG. 3) of the compliance database 308. Example processes disclosed herein that may be used to implement block 404 are described below in connection with FIGS. 8-14.

At block 406, the example results prioritizer 306 determines response priorities of assessment results indicative of compliance failure states (e.g., defects) based on past repair actions and compliance scores. For example, the results prioritizer 306 may group defects into defect classes based on the policy that generated the defect, process historical data associated with the defect classes, and estimate a ranking (e.g., a priority order) for responding to the defect classes (e.g., analyzing defects, fixing defects, etc.) based on an analysis of the historical data, and store the response rankings in the priority order database 316 (FIG. 3) of the compliance database 308. Example methods disclosed herein that may be used to implement bock 406 are described below in connection with FIGS. 15-17.

At block 408, the example reporter 318 (FIG. 3) generates a report based on the compliance policy assessment. For example, the reporter 318 may retrieve assessment results from the results database 312, compliance scores from the scores database 314 and/or response rankings from the priority order database 316, and generate a report. In some examples, the report may be presented used a graphical user interface for user review.

At block 410, the example compliance monitor 218 (FIG. 2) determines whether to continue monitoring compliance of the virtual computing environment 100. If the compliance monitor 218 determines to continue monitoring compliance of the virtual computing environment 100 (e.g., while in communication with the example virtualization manager 112 (FIG. 1)), control returns to block 402 to assess compliance of computing resource(s) of the virtual computing environment 100. Otherwise, if, at block 410, the compliance monitor 218 determines not to continue monitoring compliance (e.g., due to an application/process shutdown event, a computer shutdown event, etc.), the example process of FIG. 4 ends.

Example methods and apparatus to implement blocks 402, 404, and 406 of FIG. 4 are disclosed herein. For example, block 402 may be implemented using example methods and apparatus disclosed herein to perform event-driven compliance assessments of a virtual computing environment, as discussed below in connection with FIGS. 5-7. Block 404 may be implemented using example methods and apparatus disclosed herein to measure compliance of a computing resource and, thus, the affect an event has on policy compliance, as discussed below in connection with FIGS. 8-14. Block 406 may be implemented using example methods and apparatus disclosed herein to identify priorities when responding to assessment results, as discussed below in connection with FIGS. 15-17.

Although blocks 402, 404 and 406 are shown as occurring in the same process flow in FIG. 4, in other examples, any one or more of the blocks 402, 404, and 406 may be implemented independent of the others. For example, block 402 may be implemented to assess compliance of computing resources without implementing block 404 to determine compliance scores as disclosed herein and/or without implementing block 406 to determine response priorities as disclosed herein. In some examples, block 404 may be implemented to determine compliance scores without implementing block 402 to assess compliance of computing resources as disclosed herein and/or block 406 to determine response priorities as disclosed herein. In some examples, block 406 may be implemented to determine response priorities without implementing block 402 to assess compliance of computing resources as disclosed herein and/or block 404 to determine compliance scores as disclosed herein.

I. Assessing Compliance

Achieving and maintaining policy-based compliance presents many challenges within enterprises and organizations subject to Governance and Regulatory Compliance. For example, the number of policies maintained at an organization for their virtual computing environment contributes to a growing library of configuration tests. Due to the number of configuration tests and complexities associated therewith, organizations may wish to use a management application within their virtual computing environment to automate compliance assessment.

Prior management applications use a polling method to maintain an acceptable compliance posture. For example, on a pre-determined basis (e.g., every twenty-four hours), prior management applications may collect (e.g., poll) the state of specified computing resources from a virtual computing environment as determined by a policy (or policies) and store the collected information in a centralized repository. Then, the prior management applications determine the compliance posture of the virtual computing environment in a batch after all the information is collected and stored. Delays between polling may result in missing interim states that were out of compliance during the interval before polling but changed to a compliant state through happenstance prior to the polling. In prior systems, due to the amount of time needed to collect, store and evaluate the collected information, notifications of compliance violations are not available for some time (e.g., hours) after a change occurs in the virtual computing environment. This process of "batch testing," while sometimes effective, necessarily creates delays between compliance failures and notifications to the IT staff, requires specialized training in the setup and maintenance of the collecting software, and requires a carefully orchestrated polling interval. For example, an overly long polling interval increases the risk of missing configuration changes that may affect compliance. For example, a computing resource may change from an in-compliance state (e.g., online) to an out-of-compliance state (e.g., offline), and then back into an in-compliance state (e.g., online) during a polling interval. As a result, the management application monitoring compliance of the virtual computing environment may never recognize that some event caused a computing resource to fall out-of-compliance, and thus, cannot take steps to prevent that event from re-occurring. In contrast, having a polling interval that is too short risks decreasing performance of the virtual computing environment due to the large amount of computation and data collection required for batch testing. For example, processing resources and storage resources must be used to collect, store and evaluate the collected information each time the polling interval ends and a batch testing is performed.

Unlike prior systems that perform batch testing, example methods and apparatus disclosed herein use event-driven assessments, which provide updated compliance results in real-time (or substantially near real-time). In addition, rather than batch testing potentially all computing resources in the virtual computing environment, examples disclosed herein enable limiting testing to those computing resources that are affected by a configuration change (e.g., an event) on an occurrence by occurrence basis, thereby resulting in improved performance of the virtual computing environment by leaving processing resources and storage resources free to execute other operations. As a result, unlike prior systems, which must wait until system-wide batch testing is performed, examples disclosed herein enable determining compliance of a computing resource (e.g., a portion of a system) immediately upon the occurrence of a configuration change affecting the computing resource (e.g., affecting a portion of the system) and/or at least closer in time to the occurrence of the change (e.g., in a range from zero to ten seconds (e.g., three seconds) of detecting an event indicative of a computing resource configuration change) without waiting for batch testing to be performed. That is, whereas batch processing is triggered by a timer and/or a threshold (e.g., a buffer is X percent full), compliance processing in the illustrated example is driven by detection of a computing configuration change. Thus, unlike batch processing, which depends on an external measure to trigger analysis, in examples disclosed herein, compliance processing is driven by organic configuration events that suggest a compliance defect may have occurred.

Figure 5:
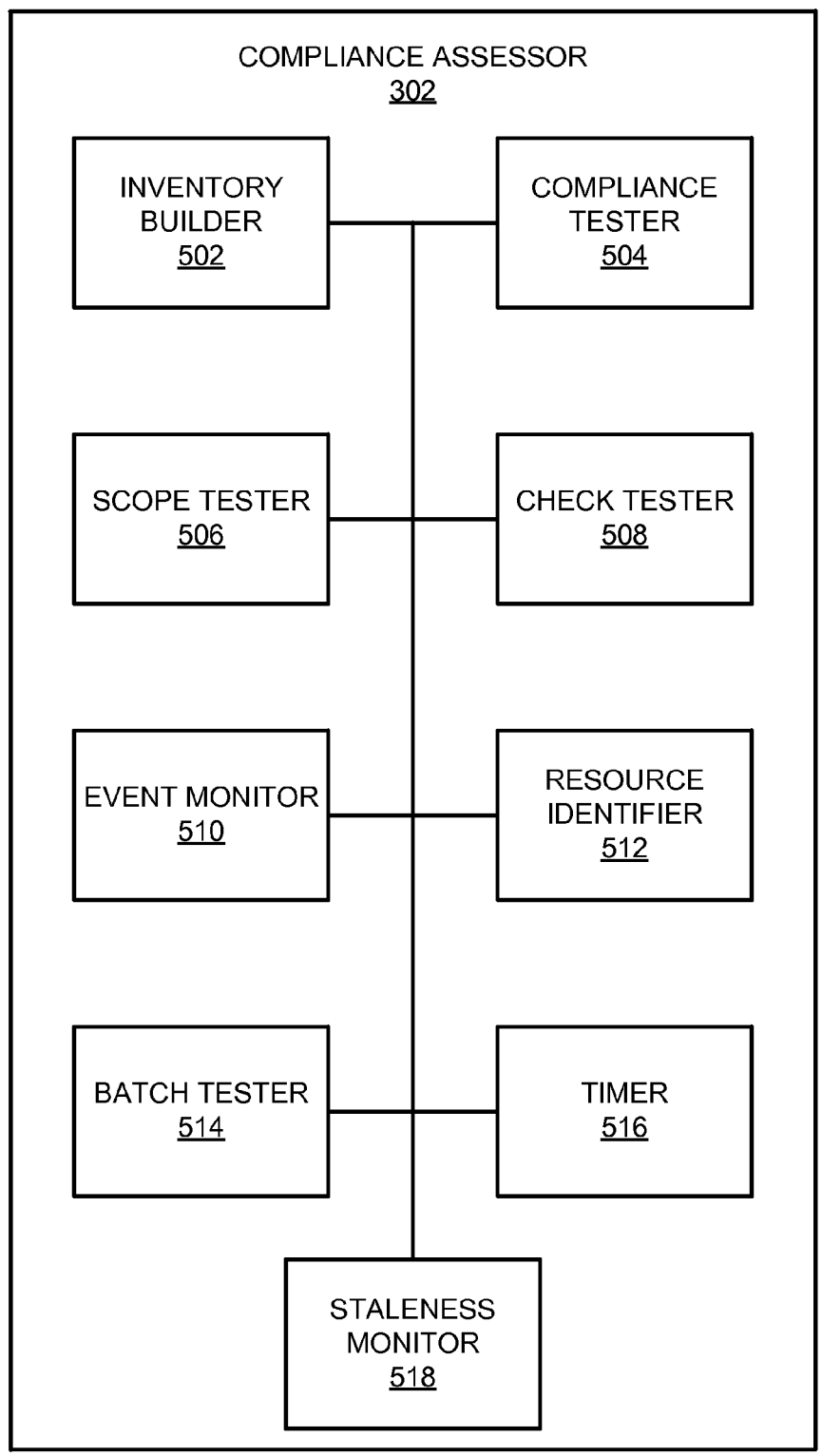
FIG. 5 is a block diagram of an example implementation of the example compliance assessor of FIG. 3.

FIG. 5 is a block diagram of an example implementation of the example compliance assessor 302 of the example compliance monitor 218 of FIGS. 2 and 3. In the illustrated example of FIG. 5, the example compliance assessor 302 includes an example inventory builder 502, an example compliance tester 504, an example scope tester 506, an example check tester 508, an example event monitor 510, an example resource identifier 512, an example batch tester 514, an example timer 516 and an example staleness monitor 518.

In the illustrated example of FIG. 5, the example compliance assessor 302 includes the example inventory builder 502 to query the virtual computing environment 100 (FIG. 1) and register the computing resources (e.g., the example network of storage arrays 102 (FIG. 1), the example computing servers 104 (FIG. 1), etc.) within the virtual computing environment 100. In some examples, the inventory builder 502 queries the virtual computing environment 100 upon installation into the virtual computing environment 100. For example, the compliance monitor 218 (FIGS. 2 and 3), the example compliance assessor 302 and/or the example inventory builder 502 may be installed in the virtual computing environment 100 with the virtualization manager 112 (FIGS. 1 and 2) or may be installed at a later time (e.g., via the example plug-in 214 (FIG. 2) or the example third party application 215 (FIG. 2)).

In some examples, the inventory builder 502 registers the computing resources as an inventory list. As used herein, an inventory list is a dynamic list of computing resources that relate to other computing resources. In some examples, the inventory list may be organized by inventory type. For example, selecting a cluster list (e.g., via a web access client) may return identities or indications of all clusters in the virtual computing environment 100 as well as lists of all resource types that relate to the cluster (or clusters) selected. Some example resource types include lists of virtual machines, databases, servers, networks, etc. In some examples, the inventory builder 502 retrieves an inventory of resources (e.g., an inventory list) from another application communicating with the example virtualization manager 112 (FIG. 1). The inventory builder 502 of the illustrated example stores the inventory list in a database such as the example compliance database 308 of FIG. 3.

In the illustrated example of FIG. 5, the example compliance assessor 302 includes the example compliance tester 504 to test computing resources against policies to generate compliance results. As described above, a policy is a collection of rules containing criteria that are logical expressions of one or more Boolean-valued criterion. Each criterion is either a test of a computing resource configuration (e.g., a property) setting (e.g., logging.enabled="true"), or is a reference by name to another criterion, criteria or rule. For example, when defining a rule, a criterion of the rule may utilize by reference the same criteria of a second rule.

In the illustrated example of FIG. 5, criteria of a rule include a scope condition tested by a scope tester 506 and a check condition tested by a check tester 508. The process of testing a computing resource for compliance with a policy using the scope tester 506 and/or the check tester 508 is referred to as an assessment. Thus, when the example compliance tester 504 receives a message to test a computing resource (e.g., from the example inventory builder 502, the example resource identifier 514, etc.), the compliance tester 504 accesses the example policy database 310 (FIG. 3) to retrieve a policy that includes one or more policy rules (sometimes referred to herein as "rules").

While a policy applies to an inventory of computing resources, a rule may be applicable to a subset of the inventory of computing resources. Thus, when testing the computing resource against the policy, a rule scope condition checked by the scope tester 506 determines whether a rule applies to the computing resource. For example, a rule may apply only to a certain operating system (e.g., LINUX operating system, etc.). Thus, those computing resources that do not execute that operating system fail the rule scope condition. In the illustrated example, when the scope tester 506 determines that a computing resource fails the rule scope condition, the rule corresponding to the rule scope condition is inapplicable to that computing resource, and the example compliance tester 504 continues assessment with the next rule.

Continuing the above example, the set of computing resources that do satisfy the scope condition (e.g., that do execute the specified LINUX operating system) may be referred to as being within the scope of the rule. In the illustrated example, if a computing resource passes (or satisfies) a rule scope condition performed by the scope tester 506, the check tester 508 determines whether the computing resource satisfies a respective rule check condition. In the illustrated example, a rule check condition may be used to compare a configuration setting (e.g., a property) of a computing resource to a value required by the rule check condition for that computing resource. If the configuration setting value of the computing resource satisfies the check condition, the check tester 508 determines that the computing resource passes (or satisfies) the rule check condition. However, if the computing resource configuration setting value does not satisfy the rule check condition, then the check tester 508 determines that the computing resource fails (or does not satisfy) the rule check condition. When a computing resource fails a rule check condition, a defect is detected.

In the illustrated example of FIG. 5, the example check tester 508 stores the result of the rule check test in a database such as the example results database 312 of FIG. 3. In some examples, the check tester 508 appends a timestamp to the result when storing the result in the results database 312. Thus, for example, a results entry in the results database 312 may include a computing resource identifier (identifying the computing resource tested), a rule identifier (identifying the rule and the policy tested), a result of the policy test, the results of the scope tester 506 on each scope condition tested by the scope tester 506, the results of the check tester 508 on each rule check condition tested by the check tester 508, the results of each criterion test, and a timestamp.

In the illustrated example of FIG. 5, the example compliance assessor 302 includes the example event monitor 510 to detect newly generated events in the virtual computing environment 100. In some examples, the event monitor 510 may receive messages from the virtualization manager 112 (FIG. 1) when the state of a computing resource changes. For example, an application in the core services controller 216 (FIG. 2) may publish a list (sometimes referred to as a "feed" or "stream" (e.g., an events stream)) of configuration events that affect the virtual computing environment 100 (e.g., via a web feed such as an Atom feed, a Rich Site Summary (RSS) feed, etc.). In some such examples, the event monitor 510 may subscribe to the feed.

In some examples, the event monitor 510 may use components of one or more kernels included in the virtual computing environment 100 to generate events. As discussed above in connection with the example virtual machines 110 (FIG. 1), each virtual machine 110 may include an operating system having an operating system kernel. As a result, the event monitor 510 may subscribe to a different operating system kernel for each of the different operating systems operating on the virtual machines 110. For example, the event monitor 510 may generate an event based on a change indication received from an Inotify subsystem or a FileSystem Watcher subsystem. Inotify is a Linux kernel subsystem that notifies subscribed applications of changes to a file system via, for example, a web feed (or an events stream). Similarly, FileSystem Watcher is a .NET class subsystem that enables an application (e.g., the example event monitor 510) to subscribe to file system events. Upon receiving a notification of a newly generated event via a web feed (or an events stream), the example event monitor 510 outputs a notification message identifying the event via, for example, an events stream.

In the illustrated example of FIG. 5, the compliance assessor 302 includes the example resource identifier 512 to identify one or more computing resources associated with a detected event. For example, the resource identifier 512 of the illustrated example parses the notification message retrieved from the example event monitor 510 to identify one or more computing resources. In some examples, the resource identifier 510 may identify additional information regarding the computing resources such as the new state of the computing resources, other computing resources related to the event-associated computing resources (e.g., via the inventory list generated by the inventory builder 502), etc. In the illustrated example of FIG. 5, the resource identifier 512 provides the identified information (e.g., the event-associated computing resources, compliance states of the new computing resources, other related computing resources, etc.) in a list to the compliance tester 504 to determine whether the event affected policy compliance of other computing resources of the virtual computing environment 100. In this manner, the example compliance assessor 302 assesses compliance of computing resources of the virtual computing environment 100 with a compliance policy (or policies) in response to detecting an event and without waiting for batch testing of the computing resources to be performed by, for example, the batch tester 514.

In the illustrated example of FIG. 5, the compliance assessor 302 includes the staleness monitor 518 to identify computing resource(s) that have not been assessed in a pre-determined amount of time (e.g., twenty-four hours). For example, the staleness monitor 518 may periodically (e.g., every five minutes) check timestamps associated with resource assessments to determine if any computing resources have not been assessed within a threshold duration (e.g., in a pre-determined amount of time) and, thus, have stale assessments (e.g., outdated assessments or assessments that may no longer be valid). In some examples, an assessment becomes stale when a subsequent assessment (e.g., an event-associated assessment, a batch test, etc.) has not been performed on the corresponding computing resource in a pre-determined amount of time. In the illustrated example of FIG. 5, when the staleness monitor 518 determines an assessment to be stale, the staleness monitor 518 provides an identity of the corresponding resource to the compliance tester 504 to test the resource against policies to generate a new (e.g., fresh) assessment result for the resource. In some such examples, the events monitor 519 may include an indication that the staleness-related events are lower priority relative to the event-associated events, thereby allowing the compliance tester 504 to perform event-related assessments first, and to perform staleness-related events when processing resources are available. For example, the staleness monitor 518 may check timestamps every five minutes and identify a resource with a stale assessment (e.g., an assessment performed more than twenty-four hours prior) having a timestamp indicating that it was performed on Jan. 1, 2013, at 12:05 pm. However, the compliance tester 504 may not have processing resources available to perform staleness-related assessments until 12:11 pm that day. In such an example, the staleness monitor 518 may not identify the assessment performed the prior day at 12:11 pm to be stale until the staleness monitor 518 performs its 12:15 pm check on Jan. 2, 2013. In this manner, the compliance assessor 302 maintains fresh compliance assessments (e.g., valid or updated compliance assessments) while leaving processing resources and storage resources free to execute other operations.

In the illustrated example of FIG. 5, the example compliance assessor 302 includes the example batch tester 514 to perform batch testing of the virtual computing environment 100. For example, when initiated, the batch tester 514 may query the virtual computing environment 100, update the inventory list to include the computing resource states of the computing resources at that time, and then test each of the computing resources in the virtual computing environment 100 against a policy (or policies) enforced in the virtual computing environment 100.

In the illustrated example of FIG. 5, the example compliance assessor 302 includes the example timer 516 to maintain a regular polling interval between batch tests. For example, the timer 516 may initiate the batch tester 514 periodically (e.g., every thirty minutes) to batch test the virtual computing environment 100. In some examples, the polling interval may be dynamic and vary based on, for example, a workload. In this manner, the example compliance assessor 302 may perform event-driven assessments (e.g., via the event monitor 510) and regular (e.g., periodic) batch tests (e.g., via the batch tester 514).

In some examples, the batch tester 514 may be included with the event monitor 510. In some examples, the batch tester 514 may be triggered by the event monitor 510. The example event monitor 510 detects newly generated events in the virtual computing environment, which enables real-time (or substantially near real-time) compliance assessment. The example batch tester 514 performs batch tests of each of the computing resources of the example virtual computing environment 100, including any computing resources that were recently tested as a result of a detected occurrence of a configuration change, at regular polling intervals. Thus, the combination enables the collected data set to be more robust and complement each other. For example, the compliance assessor 302 can perform compliance tests that utilize data indicated by events detected by the event monitor 510 and data collected at intervals by the batch tester 514. In some examples, the compliance assessor 302 performs compliance tests that utilize data indicated by events detected by the example event monitor 510 and related data identified by the example inventory builder 502 that is unchanged from the previous batch test.

While an example manner of implementing the compliance assessor 302 of FIG. 3 is illustrated in FIG. 5, one or more of the elements, processes and/or devices illustrated in FIG. 5 may be combined, divided, re-arranged, omitted, eliminated and/or implemented in any other way. Further, the example inventory builder 502, the example compliance tester 504, the example scope tester 506, the example check tester 508, the example event monitor 510, the example resource identifier 512, the example batch tester 514, the example timer 516, the example staleness monitor 518 and/or, more generally, the example compliance assessor 302 of FIG. 3 may be implemented by hardware, software, firmware and/or any combination of hardware, software and/or firmware. Thus, for example, any of the example inventory builder 502, the example compliance tester 504, the example scope tester 506, the example check tester 508, the example event monitor 510, the example resource identifier 512, the example batch tester 514, the example timer 516, the example staleness monitor 518 and/or, more generally, the example compliance assessor 302 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example inventory builder 502, the example compliance tester 504, the example scope tester 506, the example check tester 508, the example event monitor 510, the example resource identifier 512, the example batch tester 514, the example timer 516 and/or the example staleness monitor 518 is/are hereby expressly defined to include a tangible computer readable storage device or storage disk such as a memory, a digital versatile disk (DVD), a compact disk (CD), a Blu-ray disk, etc. storing the software and/or firmware. Further still, the example compliance assessor 302 of FIG. 3 may include one or more elements, processes and/or devices in addition to, or instead of, those illustrated in FIG. 5, and/or may include more than one of any or all of the illustrated elements, processes and devices.

Figure 6:
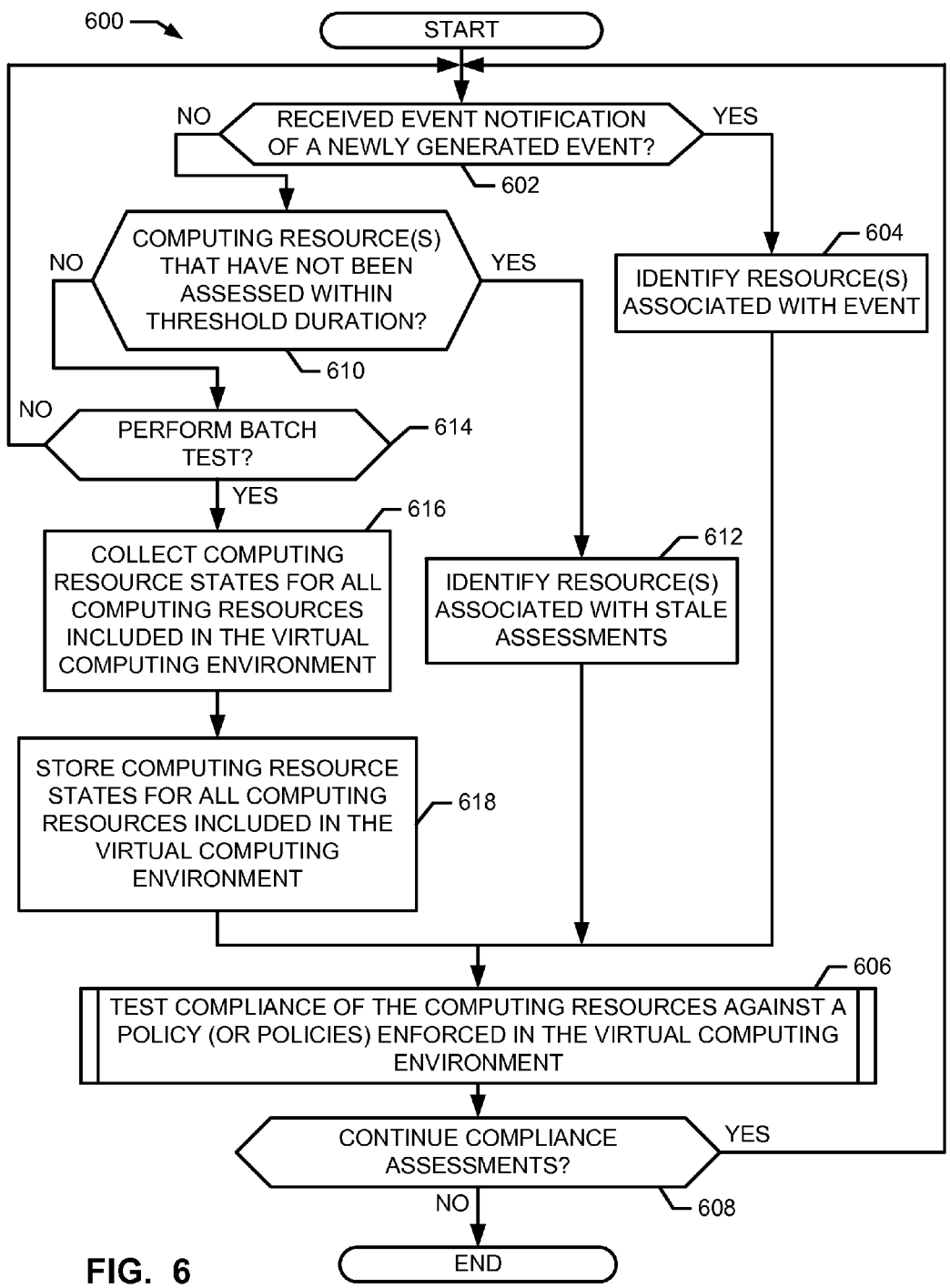
FIGS. 6 and 7 are flow charts representative of example machine-readable instructions that may be executed to perform event-driven compliance testing of computing resources in a virtual computing environment.
Figure 7:
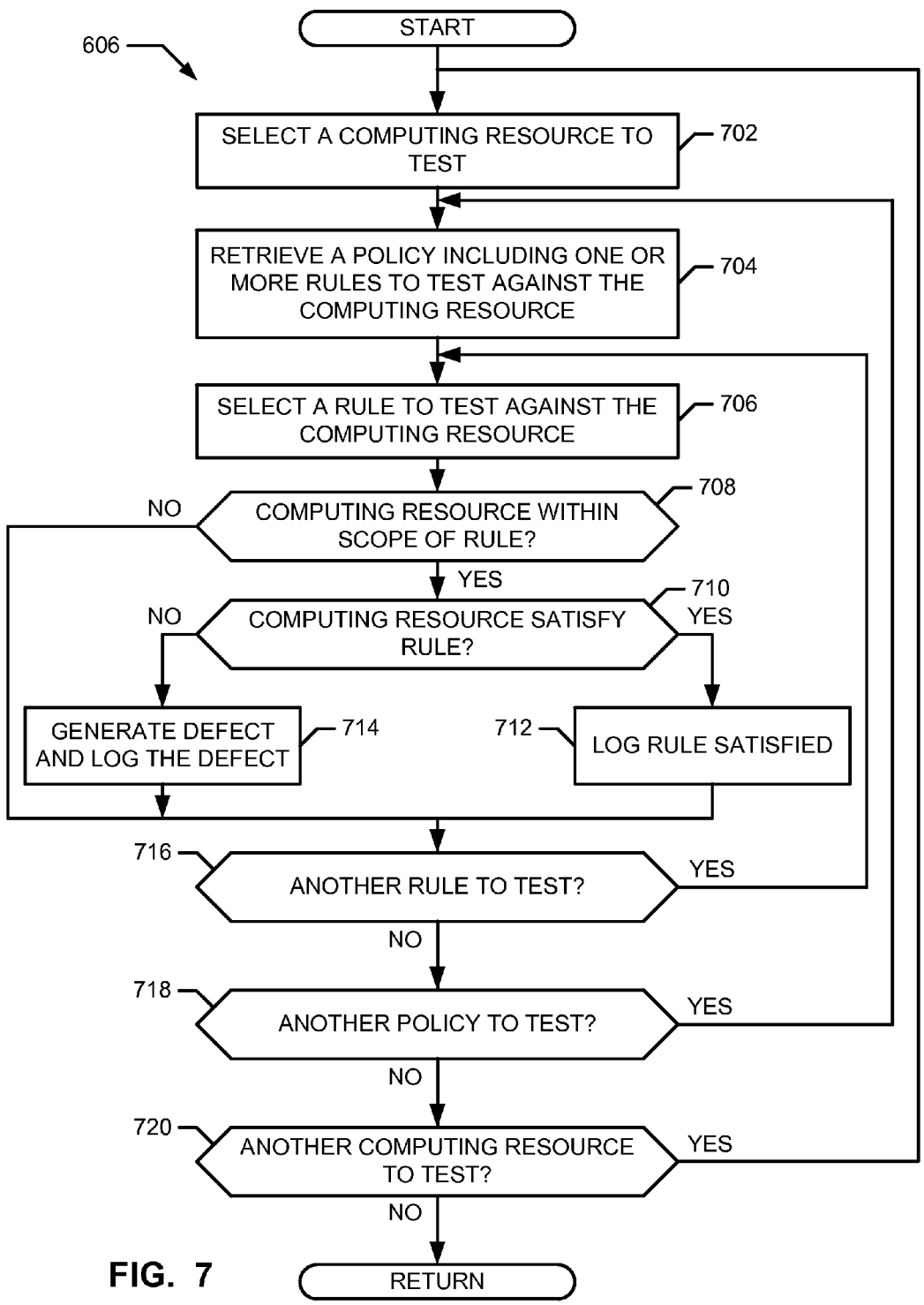

Flowcharts representative of example machine-readable instructions for implementing the compliance assessor 302 of FIGS. 3 and/or 5 are shown in FIGS. 6 and 7. In these examples, the machine-readable instructions comprise a program(s) for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowcharts illustrated in FIGS. 6 and/or 7, many other methods of implementing the example compliance assessor 302 may alternatively be used. For example, the order of execution of the blocks may be changed, and/or some of the blocks described may be changed, eliminated, or combined. Although the operations in the flow diagrams of FIGS. 6 and 7 are shown in seriatim, the examples of FIGS. 6 and 7 may additionally or alternatively be implemented so that one or more of the operations are performed in parallel with one or more other ones of the operations.

The program of FIG. 6 begins at block 602 when the example event monitor 510 (FIG. 5) determines whether a computing resource in the example virtual computing environment 100 (FIG. 1) generated an event. For example, the event monitor 510 may subscribe to a feed from an application in the example core services controller 216 (FIG. 2) and receive notifications of newly generated events via an event stream. If, at block 602, the event monitor 510 does receive notification of a newly generated event, then, at block 604, the example resource identifier 512 (FIG. 5) identifies a computing resource(s) (e.g., the example computing server 104 (FIG. 1)) associated with the event. For example, the resource identifier 512 may parse information in a message from the event monitor 510 to identify one or more computing resources associated with the event. In some examples, the resource identifier 512 queries the inventory builder 502 (FIG. 5) to identify computing resources related to the event-associated computing resources. In some examples, the resource identifier 512 queries the policy database 310 (FIG. 3) to retrieve a policy (or policies) enforced in the virtual computing environment 100.

At block 606, the example compliance tester 504 (FIG. 5) tests the one or more event-associated computing resources (and, if applicable, computing resources related to the event-associated computing resources) against a policy identified by the resource identifier 512, as described in greater detail below in connection with FIG. 7. For example, the compliance tester 504 may compare a computing resource state against a rule check condition of a policy rule and store the result of the comparison in the example results database 312 (FIG. 3). At block 608, the compliance assessor 302 determines whether to continue performing compliance assessments. For example, the compliance assessor 302 (FIGS. 3 and/or 5) may stop performing compliance assessments during a power outage. In some such examples, the example process of FIG. 6 ends. Otherwise control returns to block 602 to determine whether a computing resource in the example virtual computing environment 100 generated an event.

Returning to block 602, if the event monitor 510 does not receive notification of a newly generated event, control advances to block 610, at which the example staleness monitor 518 (FIG. 5) determines whether the virtual computing environment 100 includes computing resource(s) that have not been assessed within a threshold duration (e.g., twenty-four hours). For example, the staleness monitor 518 may parse through timestamps associated with past assessments from the example results database 312 and determine any computing resources with assessments older than twenty-four hours. If, at block 610, the staleness monitor 518 identifies stale assessments, then, at block 612, the example staleness monitor 518 identifies the computing resource(s) corresponding to the stale assessments. For example, the staleness monitor 518 includes identifiers of the identified resources in a list to the compliance tester 504. In some examples, the staleness monitor 518 may include a priority marker with the identified resources indicating that performing assessments of the identified resources (e.g., staleness-related assessments) is of lower priority than performing assessments of event-associated computing resources. Control then proceeds to block 606 to test compliance of the computing resources against the policy (or policies) enforced in the virtual computing environment 100.

Returning to block 610, if the staleness monitor 518 does not determine any stale assessments, control advances to block 614, at which the example compliance assessor 302 determines whether to perform batch testing of the virtual computing environment 100. For example, the timer 516 (FIG. 5) may expire and initiate batch testing processing. Otherwise, the compliance assessor 302 may be event-driven and initiate compliance assessments of the virtual computing environment 100 when an event in the virtual computing environment 100 is generated (or detected).

If, at block 614, the compliance assessor 302 determines not to perform batch testing (e.g., the timer 516 does not indicate that the polling interval expired), then, control returns to block 602. Otherwise control advances to block 616, at which the batch tester 514 (FIG. 5) collects computing resource states for all computing resources included in the virtual computing environment 100. For example, the batch tester 514 may query the virtual computing environment 100 to retrieve/identify the most recent computing resource states of the virtual computing environment 100 computing resources. Thus, in some examples, the batch tester 514 may query hundreds of computing resources to collect the computing resource states of the computing resources. At block 618, the batch tester 514 batches the computing resource states for the virtual computing environment 100 computing resources. For example, the batch tester 514 may update the inventory list (stored in the example compliance database 308 (FIG. 3)) to include the most recent computing resource states of the computing resources. As discussed above, collecting computing resource states and storing the computing resource states is costly in terms of processing resources and storage resources, thereby resulting in inefficient compliance assessments. Control then proceeds to block 606 to test compliance of the computing resources against the policy (or policies) enforced in the virtual computing environment 100.

The program of FIG. 7 illustrates an example method of testing whether a computing resource is in compliance with a policy enforced in the virtual computing environment 100 (FIG. 1). The example program of FIG. 7 may be used to implement block 606 of FIG. 6. The program of FIG. 7 begins at block 702 when the example compliance tester 504 (FIG. 5) selects a computing resource to test. For example, the compliance tester 504 may select a computing resource from the list of identified computing resources, as described above in connection with the resource identifier 512 (FIG. 5). At block 704, the compliance tester 504 retrieves a policy including one or more rules for testing against the computing resource. For example, the compliance tester 504 may retrieve the policy from the policy database 310 (FIG. 3). At block 706, the compliance tester 504 selects one of the one or more rules to test. At block 708, the compliance tester 504 determines whether the computing resource is within the scope of the rule. For example, the scope tester 506 (FIG. 5) tests the computing resource against the scope condition of the rule. If, at block 708, the scope tester 506 determines that the computing resource fails the scope condition of the rule, control proceeds to block 716. Otherwise if the computing resource satisfies the scope condition of the rule, control advances to block 710, at which the compliance tester 504 determines whether the computing resource satisfies the rule. For example, the check tester 508 (FIG. 5) tests the computing resource state against the check state of the rule. When the computing resource state is the same as (e.g., matches) the check state of the rule, the computing resource passes the rule check condition and, at block 712, the check tester 508 logs that the computing resource satisfies the rule in the example results database 312 of FIG. 3. When the computing resource does not satisfy (e.g., does not match) the rule check condition, at block 714, the check tester 508 generates a defect (e.g., a defect result) and the check tester 508 logs the defect in the results database 312.

After the check tester 508 logs the assessment result in the results database 312 at block 712 or block 714, or if the computing resource failed the rule scope condition at block 708, at block 716, the compliance tester 504 determine(s) whether the policy includes another rule to test. For example, the compliance tester 504 may determine whether the tested rule was the last rule in the policy. If, at block 716, the compliance tester 504 determines the policy includes another rule to test, control returns to block 706 to test a new rule against the computing resource.

Otherwise, if, at block 716, the compliance tester 504 determines that the last rule in the policy was tested, then, at block 718, the compliance tester 504 determines whether another policy is enforced on the computing resource. For example, the compliance tester 504 may query the policy database 312 for another policy. If the policy database 512 indicates that there is another rule to test, then control returns to block 704 to retrieve another policy from the policy database 312. Otherwise, if the policy database 312 indicates that there is not another policy to test (e.g., the example policy database 312 returns an empty reply or a null value), then, at block 720, the compliance tester 504 determines whether there is another computing resource to test. For example, the compliance tester 504 may check if the list of computing resources provided by the resource identifier 514 includes another computing resource. If, at block 720, the compliance tester 504 determines that there is another computing resource to test (e.g., the computing resources list includes a non-tested computing resource), then control returns to block 702 to select another computing resource to test. Otherwise, if the program of FIG. 6 is initiated by a newly generated event or if the compliance tester 504 determines that there is not another computing resource to test at block 720, then control returns to a calling function or process such as the example program of FIG. 6, and the example process of FIG. 7 ends.

II. Measuring Compliance

After a configuration change (or event) is received and compliance of a corresponding computing resource(s) is determined, examples disclosed herein may be used to measure the extent to which the computing resource(s) are adhering to a compliance policy. Such disclosed examples may be useful to a system administrator managing the virtual computing environment 100 (FIG. 1). For example, if a computing resource fails a policy, the system administrator may use examples disclosed herein to assess the degree to which the computing resource is in compliance (e.g., an in-compliance amount or a degree of compliance with a policy). Some disclosed examples may be used to identify defects for which quicker responses (e.g., corrections) would be relatively more beneficial to the virtual computing environment. In addition, the system administrator may use examples disclosed herein to measure compliance over time, over a group of computing resources and/or across a collection of policies.

FIGS. 8A and 8B illustrate an example compliance events record 800 indicative of compliance states of a computing resource with respect to different criteria of a policy (P) (e.g., OVAL definition CCE-14816-3 or oval:nist.usgcb.rhel:def: 20159). The compliance events record 800 of the illustrated example includes results of eight criteria of the policy (P). In the illustrated example, the compliance events record 800 includes compliance failures 802A, 802B, 802C indicating that the computing resource failed three of the eight criteria (e.g., marked with an "X" inside a circle). The compliance events record 800 also includes five compliance successes 804A, 804B, 804C, 804D, 804E indicating that the computing resource passed five of the criteria (e.g., marked with a check mark).

Some prior compliance measurement tools measure compliance of a policy as a whole. That is, some prior compliance measurement tools provide only a pass (or satisfied or "1") indicator or fail (or unsatisfied or "0") indicator of the computing resource with respect to the policy as a whole (e.g., policy compliance failure 806). In such prior compliance measurement tools, a system administrator is only informed when the compliance of a computing resource with a policy as a whole unit changes from compliance success to compliance failure or from compliance failure to compliance success. Thus, the system administrator is unaware when an individual criterion of the policy changes compliance states. For example, if one of the five compliance successes 804 changes to a compliance failure 802, and the compliance status corresponding to the whole, unitary policy continues to display an indicator of only the policy compliance failure 806, the system administrator will be aware that the compliance of the corresponding computing resource with the policy continues to be in a fail state, but the system administrator will not be able to discern, based on the compliance failure indicator 806, that the computing resource moved further away from a compliance posture (e.g., the compliance successes of the computing resource decreased from five compliance successes 804 to four compliance successes 804).

Compliance may be measured using numerical values. Some prior compliance measurement tools measure compliance based on a raw score of, for example, compliance successes versus the total tested policy criteria. For example, prior compliance measurement tools may calculate a score of "5/8" (e.g., 62.5 percent compliance for the five compliance successes 804 of the eight total tested policy criteria of FIGS. 8A and 8B) based on the compliance events record 800 of FIGS. 8A and 8B. While this may be true as a raw score, it lacks relevance to whether the computing resource is in or out of compliance. For example, passing all eight of the criteria noted in the compliance events record 800 may not be necessary to be in compliance with the policy (P). In the example of FIGS. 8A and 8B, the compliance failure 802C causes the policy compliance failure 806, while the compliance failures 802A, 802B are not relevant due to the compliance successes 804A, 804B. As discussed above in connection with compliance policies, a policy may be expressed as a logical combination of one or more criteria. Equation 1 below is an example logical representation of an example policy (P) illustrated in FIGS. 8A and 8B.

$$P = (\neg V_1 \| V_2) \&\& (\neg V_3 \| V_4) \&\& V_5 \&\& V_6 \&\& V_7 \&\& V_8 \quad \text{Equation 1}$$

In Equation 1 above, the policy (P) is a logical combination of criteria. Each criterion is a Boolean-valued check (e.g. $V_2$) or logical negation of a check (e.g. $\neg V_1$). In Equation 1, "$\|$" is the logical OR operator, and "&&" is the logical AND operator. Example Equation 1 represents a policy compliance test that defines a threshold for policy compliance (e.g., a compliance posture). Thus, using Equation 1 above in connection with the compliance events record 800 of FIGS. 8A and 8B, a computing resource tested against the policy (P) need only satisfy six of the eight criteria to pass. For example, the computing resource must only comply with criterion ($\neg V_1$) or comply with criterion ($V_2$), must comply with criterion ($\neg V_3$) or comply with criterion ($V_4$), and must comply with each of criterion ($V_5$, $V_6$, $V_7$, and $V_8$). However, while prior compliance measurement tools that use a raw score of "6/8" may determine that the computing resource fails the policy (P), the raw score of "6/8" does not agree with such a compliance failure. Furthermore, in some examples, a computing resource may be in compliance with a policy and never have a raw score of "8/8." For example, the check ($V_1$) of the policy (P) may determine whether the computing resource is operating a 32-bit architecture while the check ($V_3$) of the policy (P) may determine whether the computing resource is operating a 64-bit architecture. In some such examples, while the computing resource may comply with the policy (P) by operating either the 32-bit architecture or the 64-bit architecture, the computing resource does not operate both architectures simultaneously (e.g., at the same time or substantially near the same time) and, thus, cannot achieve a raw score of "8/8."

Accordingly, example methods and apparatus disclosed herein enable measuring compliance based on the compliance state of individual criterion of a policy. For example, as explained in connection with example Equation 1 above the example compliance events record 800 of FIGS. 8A and 8B, examples disclosed herein process the properties of the policy (P) so that if a logically OR'ed criterion (e.g., the criterion ($\neg V_3$)) is satisfied, the first (satisfied) logically OR'ed criterion ($\neg V_3$) is processed as a necessary criterion and the second logically OR'ed criterion (e.g., the criterion ($V_4$)) is processed as an unnecessary criterion. In some such examples, changes to the compliance state of the second logically OR'ed criterion ($V_4$) are treated as irrelevant in measuring compliance of the computing resource. That is, when the first logically OR'ed criterion ($\neg V_3$) is satisfied (e.g., marked by a compliance success 804B), a change in the compliance state of the second logically OR'ed criterion ($V_4$) is irrelevant in determining whether the computing resource is in compliance with the policy (P). Thus, unlike prior systems, examples disclosed herein enable recognizing necessary criteria and/or unnecessary criteria so that a compliance score increases as necessary criteria are satisfied, decreases as necessary criteria become unsatisfied and is unaffected by configuration changes that are neutral (e.g., unnecessary criteria change values and/or no-longer necessary criteria change values).

Compliance scores from compliance measurements of different policies may not always be meaningfully comparable to one another because policies often originate from different sources (e.g., different publishers) that use different policy criteria or compliance success standards. For example, a computing resource may be required to comply with a first policy including four criteria provided by a policy publishing source, and may be subject to also comply with a second policy including one hundred criteria provided by the same or different policy publishing source. Thus, each policy effectively provides a different level of difficulty for achieving compliance and, thus, a different compliance metric for measuring compliance.

Examples disclosed herein enable calculating a normalized (or standardized) compliance score for each policy based on the properties of the policy. In this manner, normalized compliance scores across different policies are meaningfully comparable to one another. The properties of a policy include the number of criteria ($V_m$) in the policy, the relationship between criteria (e.g., the logical representation of the policy including the logical AND operator, the logical OR operator, the logical NOT operator, etc.), and the compliance state (e.g., compliance failure or compliance success) of each of the criteria ($V_m$). Examples disclosed herein use the properties of the policy to calculate a surprisal value of the policy, which may then be used to calculate a normalized compliance score for a computing resource against the policy. The surprisal value (or uncertainty) is defined herein as the amount of information expressed by a particular outcome, given a distribution of outcomes and their probabilities.

To illustrate, consider a dice-rolling policy ($P_{dice}$) where two dice ($d_1$, $d_2$) are rolled and the policy is satisfied when the sum of the two rolled dice is to equal eleven. Equation 2 below is a logical representation of the policy ($P_{dice}$).

$$P_{dice} = (d_1 = 5 \&\& d_2 = 6) \| (d_1 = 6 \&\& d_2 = 5) \quad \text{Equation 2}$$

In Equation 2 above, the surprisal value for the policy ($P_{dice}$) may be calculated based on the number of combinations of two dice rolls that sum to eleven. Thus, the surprisal value corresponds to the amount of uncertainty that something will happen given the properties of the system. For example, in Equation 2 above, the surprisal value depends on the number of criteria (e.g., two dice rolled), the logical relationship between the criteria (e.g., the sum of the two dice), and the values of the two dice. Thus, in Equation 2 above, the surprisal value is different when the result of no dice is known, when the result of one of the two dice is known, and when the result of both dice are known. That is, the amount of uncertainty in satisfying the policy ($P_{dice}$) decreases when the result of one die is known, and decreases again (e.g., zero uncertainty) when the results of the two dice are known. The surprisal value calculated before any information is known may be referred to as the maximum surprisal (or uncertainty) of the policy ($P_{dice}$). The surprisal value when one of the dice values is known may be referred to as the remaining surprisal value of the policy ($P_{dice}$) given the amount of information known (e.g., the first die result). The difference in values between the maximum surprisal value and the remaining surprisal value after information is known (e.g., the first die result) corresponds to the amount of surprisal lost and, thus, may be referred to as information gain. The ratio of the information gain to the maximum surprisal value may be referred to as the compliance score for the policy ($P_{dice}$) given the information known.

Thus, examples disclosed herein calculate a compliance score using the properties of the policy. As a result, examples disclosed herein enable comparing and/or combining compliance scores with one another. For example, the compliance score can be combined over time and/or over a group of computing resources that are measured against the same policy because the compliance score is with respect to the same maximum surprisal. In addition, compliance scores over policies may be combined by using the ratio of the maximum surprisal of each policy. As a result, the compliance posture of a computing resource may be evaluated based on the combined measured compliance of a group of computing resources, the combined measured compliance of a computing resource over time and/or the combined measured compliance of the computing resource against two or more policies.

Moreover, when calculating a compliance score, examples disclosed herein do not depend on the type of policy (e.g., a vulnerability policy, a compliance policy, etc.) being enforced. In addition, some examples disclosed herein may be used to calculate a compliance score for a policy that does not enable automated compliance assessments (e.g., the policy rules are not machine-readable), but that includes satisfied/unsatisfied (e.g., pass/fail, true/false, etc.) truth-values to perform a manual compliance assessment. For example, a compliance score may still be calculated for a policy encoded in the Open Checklist Interactive Language (OCIL) where the results are human answers to a questionnaire. That is, examples disclosed herein may calculate a compliance score for any policy that can be represented as a Boolean expression. For example, examples disclosed herein may calculate a compliance score for reports generated by methods that did not use example scoring processes disclosed herein (e.g., a different scoring process, a legacy scoring process, etc.). Thus, in some examples, examples disclosed herein retroactively calculate a compliance score for a legacy scoring process. In some examples, compliance scores for reports are generated using a first compliance score calculated by a first scoring technique (e.g., example scoring processes disclosed herein) and one or more other scoring techniques different from the first scoring technique.

Some prior compliance measurement systems generate compliance reports based on assessment results of computing resources of the virtual computing environment 100 (FIG. 1) against a policy. A compliance report may provide information regarding, for example, the compliance posture of a computing resource when the computing resource is tested against the policy. However, prior compliance measurement systems generate the compliance reports based on the polling (e.g., sampling) and subsequent assessment of computing resources at discrete moments in time separated by significant time intervals. That is, prior compliance measurement systems may perform compliance assessments by polling computing resources periodically (e.g., every thirty minutes) and, thereby, generate compliance reports that measure compliance periodically (e.g., every thirty minutes). As a result, changes in the compliance state of a computing resource that occur between compliance assessments (e.g., between the periodic polling of computing resources) are not reported in the compliance report.

Unlike prior systems, examples disclosed herein enable streaming compliance measurements continuously. For example, rather than measuring compliance periodically as a batch operation that polls multiple computing resources in a virtual computing environment at the same time to determine configuration change events, examples disclosed here may measure on a per-event basis as configuration changes occur in a virtual computing environment, as discussed in greater detail above in connection with the example compliance assessor 302 (FIG. 3). As a result, when comparing compliance measurements over time, compliance measurements disclosed herein correspond to a trace of compliance measurements (e.g., a stream of continuous compliance measurements) rather than discrete (or impulse) values.

Figure 9:
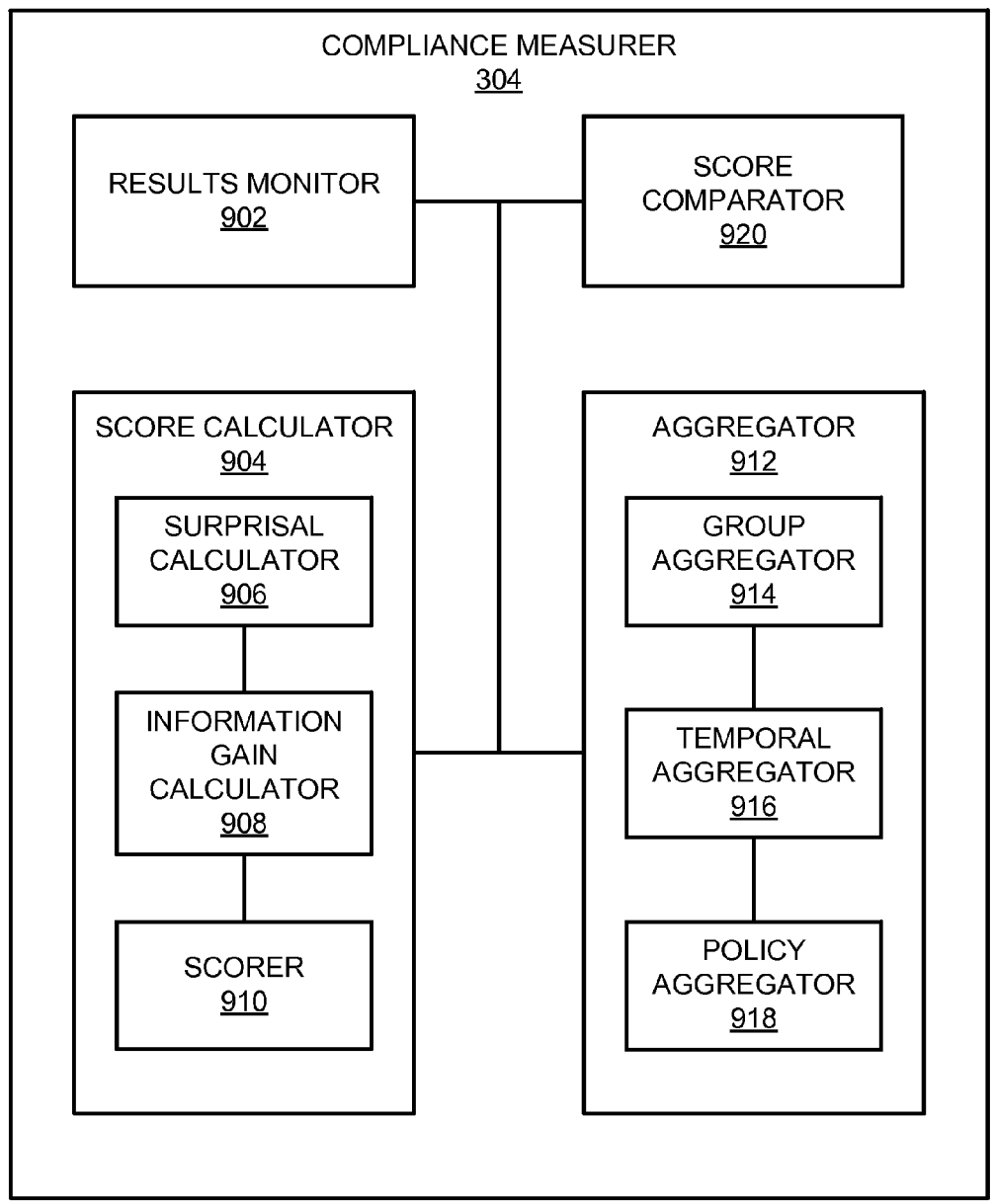
FIG. 9 is a block diagram of an example implementation of the example compliance measurer of FIG. 3.

FIG. 9 is a block diagram of an example implementation of the example compliance measurer 304 of the example compliance monitor 218 of FIGS. 2 and 3 to measure compliance. In the illustrated example of FIG. 9, the compliance measurer 304 includes an example results monitor 902, an example score calculator 904, an example aggregator 912, and an example score comparator 920. In the illustrated example, the score calculator 904 includes an example surprisal calculator 906, an example information gain calculator 908 and an example scorer 910. The aggregator 912 of the illustrated example includes an example group aggregator 914, an example temporal aggregator 916, and an example policy aggregator 918.

In the illustrated example of FIG. 9, the compliance measurer 304 includes the results monitor 902 to monitor changes to assessment results. For example, the results monitor 902 may receive a notification from the example compliance assessor 302 (FIGS. 3 and 5) when the compliance assessor 302 updates an assessment result in the example results database 312 (FIG. 3). For example, an assessment result may change from satisfied to fails (or unsatisfied). In some examples, the results monitor 902 may monitor incoming data to the results database 312 to determine if the results database 312 is being updated with a new result. When the results monitor 902 receives notification of a new result (e.g., via the example compliance assessor 302), the results monitor 902 determines the computing resource(s) affected by the results change and initiates the score calculator 904 to calculate a compliance score for the computing resource in accordance with a policy (or policies).

In the illustrated example of FIG. 9, the compliance measurer 304 includes the example score calculator 904 to calculate a compliance score of a computing resource for a policy. For example, the score calculator 904 may retrieve a policy from the example policy database 310 (FIG. 3) that is enforced against the computing resource. The compliance score (or measure of compliance) may be used to determine the amount of compliance, may be combined with other compliance scores (e.g., over time, over groups of computing resources and/or with other policies), and/or may be used to compare two or more compliance scores.

The score calculator 904 of the illustrated example uses properties of a policy to calculate a maximum surprisal for the policy and a remaining surprisal value of the policy for a computing resource. The maximum surprisal varies for each policy and depends on the properties of the policy. For example, the number of criteria and/or the logical structure of a policy may influence the maximum surprisal. Thus, the remaining surprisal varies for each resource with respect to a policy and may depend on the properties of the policy and/or the properties of the resource (e.g., the number of criteria, the logical structure of the policy, the truth values (e.g., true or false) resulting from testing the resource against the policy criterion, etc.). The example score calculator 904 uses the difference between the maximum surprisal and remaining surprisal values (e.g., the information gain) as the measure of the amount of compliance to the policy by the computing resource. In the illustrated example, the score calculator 904 normalizes the information gain by dividing it by the maximum surprisal to calculate a compliance score of the policy for the computing resource. In addition, in some examples, the example score calculator 904 appends a timestamp to the compliance score representative of when the compliance score was calculated. In some examples, the score calculator 904 stores the calculated compliance score in the example scores database 314 of FIG.

In the illustrated example of FIG. 9, the score calculator 904 includes the example surprisal calculator 906 to calculate surprisal values. For example, the surprisal calculator 906 may use Equation 3a below to calculate the maximum surprisal (I(P|0)) value of a policy (P). The surprisal value of satisfying a policy (P) is measured in criteria bits (sometimes referred to herein as "crits" or "bits"). A criteria bit is a unit of information when measuring a surprisal value in a binomial system (e.g., true/false, heads/tails, on/off, etc.)

$$I(P \mid 0) = \log_2 \frac{2^{\#(P)}}{SatCount(P)} \qquad \text{Equation 3a}$$

$$I(P \mid a) = \log_2 \frac{2^{\#(P|a)}}{SatCount(P \mid a)} \qquad \text{Equation 3b}$$

Figure 25A:
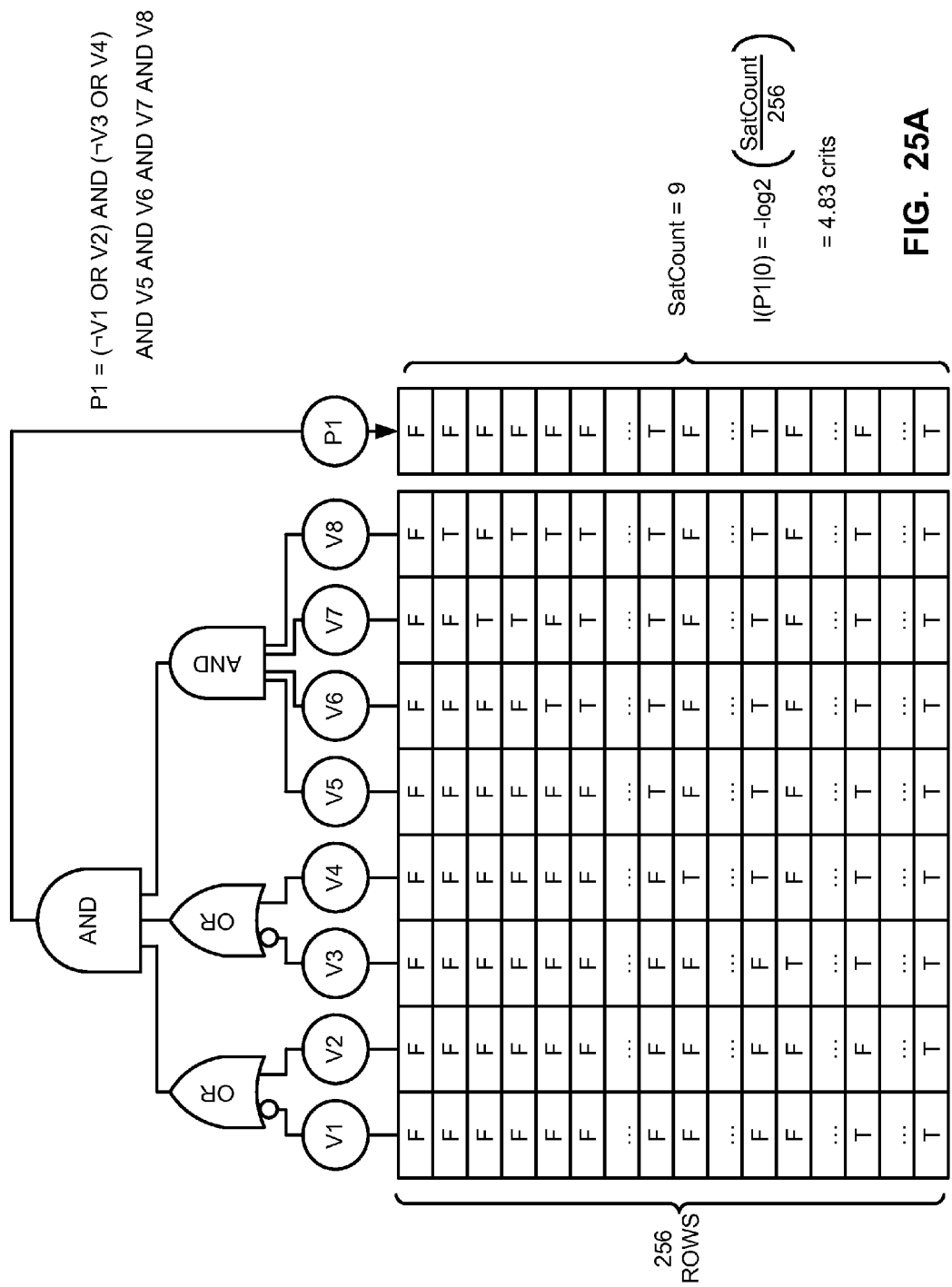
FIGS. 25A and 25B illustrate example truth tables representing functional values of an example policy.
Figure 25B:
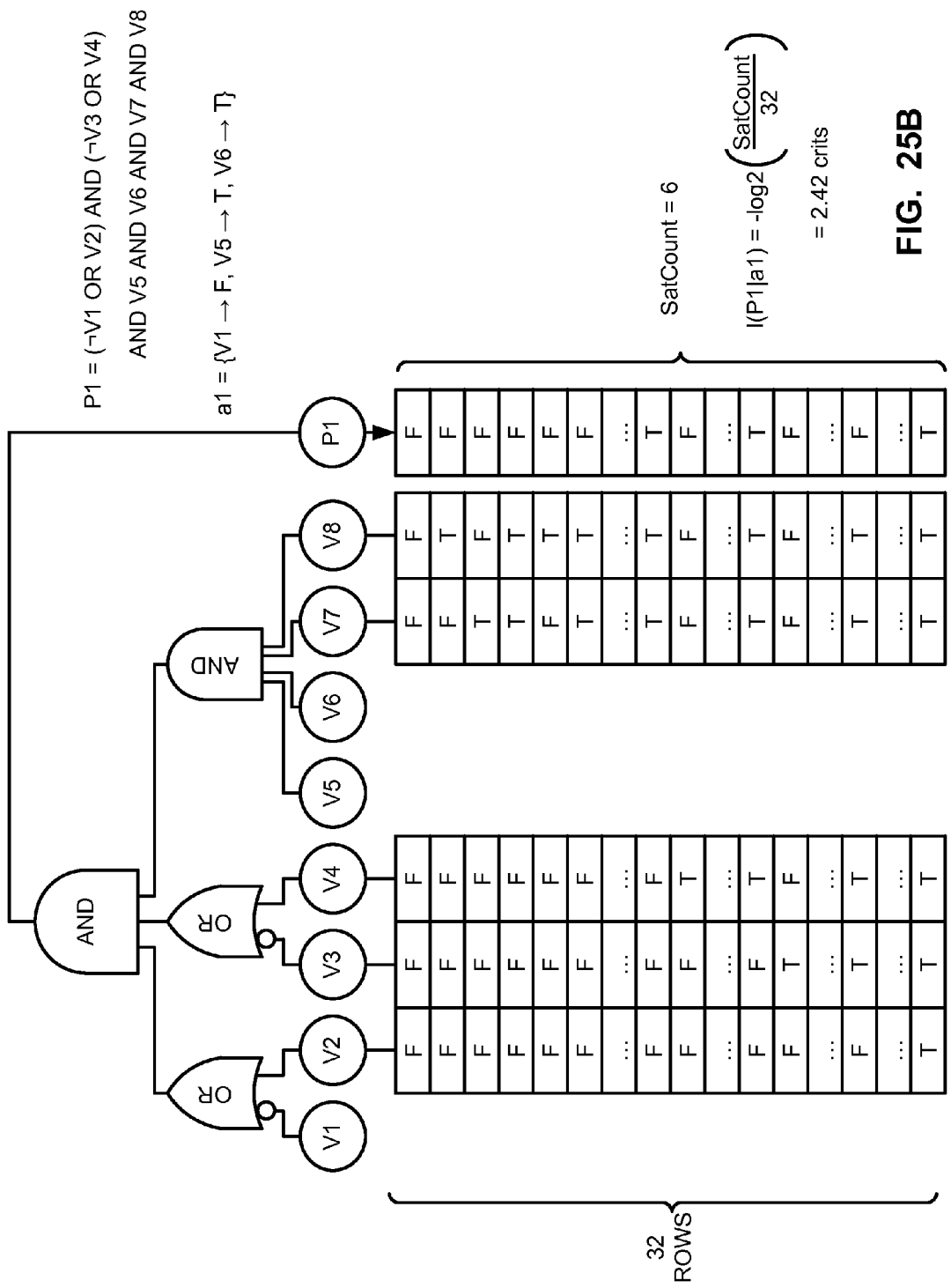

In Equation 3a above, the maximum surprisal (I(P|0)) is the surprisal value of the policy (P) given no (e.g., zero) amount of information regarding the compliance status of any of the criteria of the policy. The SatCount(P) is the number of combinations of criteria truth-values that satisfy the policy (P), and the value #(P) is the number of distinct checks in the policy (P). For example, referring back to the policy (P) defined in Equation 1 above and referring to FIG. 25A, the value #(P) is eight (e.g., ($V_1, \ldots V_8$)) and the SatCount(P) is nine since there are nine rows satisfying the policy (P) in FIG. 25A (i.e., where the value of the policy (P) is true). There are 256 rows (i.e., $2^{\#(P)}=2^8$) in FIG. 25A, one for each combination of the truth-values of the eight checks ($V_1$ to $V_8$). Thus, using Equation 3a, the maximum surprisal (I(P|0)) for the policy (P) defined in Equation 1 is equal to 4.83 crits (i.e., $\log_2 2^8/9$). To calculate the amount of remaining surprisal (I(P|a)) for a policy (P) given a computing resource (a), the surprisal calculator 906 calculates the SatCount(P|a) based on the criteria ($V_1, \ldots V_8$) satisfied by the computing resource (a) and uses Equation 3b above to calculate the surprisal of the computing resource (a). For example, referring back to the policy (P) defined in Equation 1 above and referring to FIG. 25B, suppose a computing resource (a) satisfies criteria ($\neg V_1, V_5$, and $V_6$), then the value #(P|a) is five (i.e., #(P)−3=8−3) and the SatCount(P|a) is the number of combinations of truth values that satisfy the policy (P) chosen from amongst those that already satisfy the criteria ($\neg V_1, V_5$, and $V_6$). Accordingly, the SatCount(P|a) is six, and the remaining surprisal (I(P|a)) for the policy (P) on the computing resource (a) is 2.42 crits (i.e., $\log_2 2^5/6$).

In the illustrated example of FIG. 9, the score calculator 904 includes the example information gain calculator 908 to calculate the information gain (or the amount of compliance) of a policy for a computing resource. For example, the information gain calculator 908 may use Equation 4 below to calculate the information gain.

$$G(P|a)=I(P|0)-I(P|a) \qquad \text{Equation 4}$$

In Equation 4 above, the information gain (G(P|a)) measures the amount of compliance that the computing resource (a) has with the policy (P) given the state of the computing resource (a). Thus, as the number of satisfied criteria in a policy grows, the information gain increases. Moreover, the information gain increases because as more of the criteria truth-values are known (e.g., satisfied or unsatisfied by a computing resource), the surprisal value of the computing resource decreases (e.g., there is less uncertainty with whether the computing resource is able to satisfy the policy). In addition, in the illustrated example of FIG. 9, if the compliance state for a computing resource changes (e.g., switches from in-compliance to out-of-compliance) the cause for the compliance change can be identified because a change in the information gain may be attributed to a change in the truth-value of a criterion. Thus, credit or blame can be directly assigned to events (e.g., configuration changes).

In the illustrated example of FIG. 9, the score calculator 904 includes the example scorer 910 to calculate a compliance score of a policy for a computing resource. For example, the scorer 910 may use Equation 5 below to calculate a compliance score.

$$B(P \mid a) = \frac{G(P \mid a)}{I(P \mid 0)} * 100\% \qquad \text{Equation 5}$$

In Equation 5 above, the compliance score (B(P|a)) is the amount that the computing resource (a) is in compliance with a policy (P) measured in percentage. In Equation 5 above, the example scorer 910 divides the information gain (G(P|a)) by the maximum surprisal (I(P|0)) to normalize the information gain. The example scorer 910 multiplies the result by "100%" to transform the range of values for the compliance score to between 0% and 100%.

In the illustrated example of FIG. 9, the compliance measurer 304 includes the aggregator 912 to combine compliance scores. For example, a system administrator may wish to know compliance of a policy enforced against the example computing servers 104 (FIG. 1) of the example virtual computing environment 100 (FIG. 1). The example group aggregator 914 uses Equation 6 below to calculate a combined compliance score (e.g., a group-aggregated compliance score) for the retrieved compliance scores.

$$B(P \mid \{a_1, \ldots a_n\}) = \frac{\sum G(P \mid a_j)}{n * I(P \mid 0)} \qquad \text{Equation 6}$$

In Equation 6 above, the combined compliance score (B(P|{$a_1, \ldots a_n$})) is the arithmetic average compliance score for the group of computing resources ({$a_1, \ldots a_n$}) against the policy (P). For example, the aggregator 912 and/or the group aggregator 914 may retrieve the compliance score for each of the computing resources in the group from the example scores database 314. The combined compliance score for the group of computing resources is then calculated by taking the average of the retrieved compliance scores (e.g., summing the compliance scores and dividing by the number of computing resources). As the compliance scores for each of the computing resources is calculated with respect to the same maximum surprisal value, the example group aggregator 914 may take the arithmetic average of the compliance scores for the group of computing resources to calculate the combined compliance score (e.g., the group-aggregated compliance score) for the group of computing resources against the policy.

In the illustrated example of FIG. 9, the temporal aggregator 916 of the aggregator 912 combines compliance scores for a computing resource over time. For example, a system administrator may want to know how a computing resource measured in compliance over a period such as a week or a historical range (e.g., Q1 of 2012). In some such examples, the temporal aggregator 916 uses either Equation 7 below or Equation 8 below to calculate a combined compliance score (e.g., a temporally-aggregated compliance score) for a computing resource over a group of discrete moments or over an interval, respectively.

$$B(P \mid \{a@t_1, \ldots a@t_m\}) = \frac{\sum_t G(P \mid a@t)}{m\, I(P \mid 0)}, \quad \text{Equation 7}$$

$$t \text{ in } \{t_1, \ldots t_m\}$$

$$B(P \mid a@[t_1, t_m]) = \frac{\int G(P \mid a@t) dt}{(t_m - t_1) I(P \mid 0)}, \quad \text{Equation 8}$$

$$t \text{ in } [t_1, t_m]$$

In Equation 7 above, the combined compliance score $(B(P \mid \{a@t_1, \ldots a@t_m\}))$ is calculated for a group of discrete moments ($\{t_1 \ldots t_m\}$). In Equation 8 above, the combined compliance score $(B(P \mid a@[t_1, t_m]))$ is calculated over an interval ($[t_1, t_m]$). In some examples, the example aggregator 912 and/or the temporal aggregator 916 may retrieve compliance scores for the computing resource (a) over a period from the example scores database 314. When the compliance scores are of discrete moments, the example temporal aggregator 916 uses Equation 7 above to calculate the combined compliance score (e.g., the temporally-aggregated compliance score) of the computing resource over time. For example, the temporal aggregator 916 may retrieve compliance scores from the example scores database 314 corresponding to assessment results calculated during batch testing (e.g., on the first day of every month of the year). In some such examples, the assessment results are stored in the example results database 312 (FIG. 3) periodically (e.g., every twenty-four hours), and, thus, the compliance scores retrieved from the scores database 314 correspond to discrete moments (e.g., every thirty days). In contrast, if the compliance scores are determined continuously over time, then the example temporal aggregator 916 uses Equation 8 above to calculate the combined compliance score of the computing resource over time. For example, the assessment results stored in the results database 312 may correspond to event-driven assessments. In some such examples, assessment results are stored in the results database 312 when an event is recorded. Thus, the corresponding compliance scores retrieved from the scores database 314 are continuous (e.g., the compliance score at a time ($t_i$) is the same as at a previous time ($t_{i-1}$) until an event is detected).

In the illustrated example of FIG. 9, the policy aggregator 918 of the aggregator 912 combines compliance scores for a computing resource over a collection of policies. For example, a collection of policies ($P_1$ to $P_n$) may be enforced on a computing resource (a). When calculating a combined compliance score for the computing resource (a) against the collection of policies, the combined compliance score is not calculated by arithmetically averaging the individual compliance scores ($\{B(P_1 \mid a), \ldots B(P_n \mid a)\}$) if the compliance scores are normalized by different maximum surprisals ($\{I(P_1 \mid a), \ldots, I(P_n \mid a)\}$). For example, consider a computing resource (a) that is 99% in-compliance against a first policy ($P_1$) (i.e., compliance score $(B(P_1 \mid a))$=99%) with a maximum surprisal of two crits and that the computing resource (a) is 50% in-compliance against a second policy ($P_2$) (i.e., compliance score $(B(P_2 \mid a))$=49%) with a maximum surprisal of 100 crits. Calculating the combined compliance score using the arithmetic average would lead a system administrator to believe that the computing resource (a) is 74% (i.e., (99+49)/2) in-compliance with the policies ($P_1$, $P_2$). However, the example policy aggregator 918 calculates the combined compliance score by summing the independent gains for the policies ($P_1$, $P_2$) and then renormalizing the compliance score. Thus, as disclosed in greater detail below in connection with Equations 9-14, the example policy aggregator 918 calculates a combined compliance score for the computing resource (a) of 50% (i.e., (0.99*2)/(100+2)+(0.49*100)/(100+2)).

As described above, policies may include a large number of criteria. As a result, when combining compliance scores for a computing resource over a collection of policies, some policies may overlap (e.g., share criteria). In some such examples, the criteria dependencies may be accounted for by calculating the combined compliance score as the conjunction of the collection of policies (e.g., the set of the criteria). In the illustrated example, the policy aggregator 918 uses Equations 9-11 below to calculate a combined compliance score (e.g., a policy-aggregated compliance score) for a computing resource against a collection of policies ($P_1$ to $P_n$) that include shared criteria.

$$I(P_1 \cup \ldots P_n \mid a) = I(P_1 \,\&\&\, \ldots P_n \mid a) \quad \text{Equation 9}$$

$$G(P_1 \cup \ldots P_n \mid a) = I(P_1 \cup \ldots P_n \mid 0) - I(P_1 \cup \ldots P_n \mid a) \quad \text{Equation 10}$$

$$B(P_1 \cup \ldots P_n \mid a) = \frac{G(P_1 \cup \ldots P_n \mid a)}{I(P_1 \cup \ldots P_n \mid 0)} \quad \text{Equation 11}$$

In Equation 9 above, the combined surprisal value ($I(P_1 \cup \ldots P_n \mid a)$) is calculated as the surprisal of the single policy ($P_1 \,\&\&\, P_2 \ldots P_n$) formed from the conjunction (e.g., the logical AND operator) of the collection of policies ($\{P_1, \ldots P_n\}$). The example policy aggregator 918 uses Equation 10 above to calculate the information gain ($G(P_1 \cup \ldots P_n \mid a)$) for the computing resource (a) against the collection of policies ($P_1$ to $P_n$). The example policy aggregator 918 uses Equation 11 above to calculate the combined compliance score ($B(P_1 \cup \ldots P_n \mid a)$) (e.g., the policy-aggregated compliance score) for the computing resource (a) against the collection of policies ($\{P_1, \ldots P_n\}$). Thus, calculating a combined compliance score for a collection of policies that share some criteria is similar to calculating a compliance score for a single policy formed from the collection of policies ($\{P_1, \ldots P_n\}$). As a result, the surprisal values, the information gain, and the compliance scores for the collection of policies may be calculated using the same approach as described above in connection with Equations 3-5, but with a larger policy formed from the conjunction of the policies of the collection of policies.

While Equations 9-11 above assume the collection of policies ($\{P_1, \ldots P_n\}$) share (e.g., overlap with) some criteria, the example policy aggregator 918 may also calculate the combined compliance score for a collection of policies as if the policies are independent from each other, even if the policies do share criteria. In some such examples, the policy aggregator 918 uses Equations 12-14 below to calculate a combined compliance score (e.g., a policy-aggregated compliance score) for a computing resource over a collection of policies.

$$I(\{P_1, \ldots P_n\} \mid a) = \sum I(P_i \mid a) \qquad \text{Equation 12}$$

$$G(\{P_1, \ldots P_n\} \mid a) = I(\{P_1, \ldots P_n\} \mid 0) - I(\{P_1, \ldots P_n\} \mid a) \qquad \text{Equation 13}$$

$$B(\{P_1, \ldots P_n\} \mid a) = \frac{G(\{P_1, \ldots P_n\} \mid a)}{I(\{P_1, \ldots P_n\} \mid 0)} \qquad \text{Equation 14}$$

When the collection of policies are independent of each other (or assumed to be independent of each other), the example policy aggregator 918 calculates the combined surprisal value ($I(\{P_1, \ldots P_n\} \mid a)$) by summing the surprisal values for each of the policies in the collection of policies. As a result, the policy aggregator 918 uses Equation 12 above to calculate the maximum surprisal ($I(P_i \mid 0)$) for each of the policies ($P_i$) of the collection of policies ($\{P_1, \ldots P_n\}$) and sums the individual maximum surprisals. The example policy aggregator 918 also uses Equation 12 above to also calculate the remaining surprisal value ($I(P_i \mid a)$) for the computing resource (a) for each of the policies ($P_i$) of the collection of policies ($\{P_1, \ldots P_n\}$) and sums the individual remaining surprisal values. Once the combined surprisal values are calculated, the example policy aggregator 918 calculates the compliance score using the same approach as described above in connection with Equations 4 and 5. That is, the example policy aggregator 918 uses Equation 13 above to calculate the information gain ($G(\{P_1, \ldots P_n\} \mid a)$) for the computing resource (a) against the collection of policies ($\{P_1, \ldots P_n\}$). The example policy aggregator 918 uses Equation 14 to calculate the combined score ($B(\{P_1, \ldots P_n\} \mid a)$) (e.g., the policy-aggregated compliance score) for the computing resource (a) against the collection of policies ($\{P_1, \ldots P_n\}$).

In some examples, a combined compliance score for policies that overlap and a combined compliance score for policies that are independent may be related by the mutual surprisal between the policies. For example, Equation 15 below may be used to relate dependent and independent combined compliance scores of two policies ($P_x$, $P_y$) against the computing resource (a).

$$I(P_x \cup P_y \mid a) = I(\{P_x, P_y\} \mid a) + I(P_x; P_y \mid a) \qquad \text{Equation 15}$$

$$= I(\{P_x, P_y\} \mid a) + 0 \text{ (if } P_x, P_y \text{ are independent)}$$

In Equation 15 above, the combined surprisal value ($I(P_x \cup P_y \mid a)$) is the conjunction of the two policies ($P_x$, $P_y$) for the computing resource (a) and the surprisal ($I(P_x; P_y \mid a)$) is the mutual surprisal between the policies ($P_x$, $P_y$). Thus, if the policies are independent, then by using Equations 9 and 12 above, it holds that the combined surprisal value $I(P_x \cup P_y \mid a) = I(\{P_x, P_y\} \mid a)$ as there is no mutual surprisal and the surprisal value ($I(P_x; P_y \mid a)$) is equal to zero.

As discussed above, combining compliance scores depends on the maximum surprisal for the combined policies. When policies are considered to be of equal priority (even with unequal maximum surprisals), the example policy aggregator 918 may use Equation 16 below to calculate the average combined compliance score.

$$\mu B(\{P_1, \ldots P_n\} \mid a) = \frac{m}{n} * \left(\prod_{j \in J} B(P_j \mid a)\right) \wedge \left(\frac{1}{m}\right) \qquad \text{Equation 16}$$

where:

$$J = \{i : B(P_i \mid a) > 0\}, m = \|J\|$$

In Equation 16 above, the average combined compliance score ($\mu B(\{P_1, \ldots P_n\} \mid a)$) is calculated as the expected (m of n) geometric mean of the (m) non-zero compliance scores in the set (J) with size ($\|J\|$). Thus, when using Equation 16 above to calculate an average combined compliance score, the example policy aggregator 918 removes any bias that may otherwise occur from the respective policies having different maximum surprisals (e.g., an inherent bias). In some examples, a subjective bias may be added to a combined compliance score by providing a priority value to a policy. For example, the priority value may be a numeric factor ($k_i$) assigned to the policy ($P_i$) (e.g., written as $k_i P_i$). In some such examples, the policy aggregator 918 may use Equation 17 below to calculate an average combined compliance score where the policies ($P_i$) are assigned a respective bias ($k_i$).

$$\mu B\left(\bigcup k_i P_i \mid a\right) = \frac{m}{n} * \left(\prod_{j \in J} B(P_j \mid a) \wedge k_j\right) \wedge \left(\frac{1}{m}\right) \qquad \text{Equation 17}$$

where:

$$J = \{i : B(P_i \mid a) > 0\}, m = \sum k_j, n = \sum k_i$$

In Equation 17 above, the bias ($k_i$) is the priority of the respective policy ($P_i$) and the bias ($k_j$) is the priority of the respective policy ($P_j$) having a non-zero score.

In the illustrated example of FIG. 9, the compliance measurer 304 includes the example score comparator 920 to compare compliance scores. For example, a system administrator may wish to compare a computing resource ($a_j$) to a group of computing resources ($\{a_1, \ldots a_n\}$) to determine how the computing resource measures in compliance with respect to policy (P) and the group of computing resources. In some such examples, the score comparator 920 retrieves the compliance score ($B(P \mid a_j)$) for the computing resource ($a_j$) and the combined compliance score ($B(P \mid \{a_1, \ldots a_n\})$) for the group of computing resources ($\{a_1, \ldots a_n\}$) from the example scores database 314. In some examples, the score comparator 920 may initiate the example aggregator 912 to calculate a combined score for the group of computing resources ($\{a_1, \ldots a_n\}$). The example score comparator 920 compares the retrieved compliance scores (e.g., from the scores database 314 and/or the aggregator 912) and stores the comparison results (e.g., a value indicative of the difference between the compliance scores) in the example scores database 314.

While the examples discussed above correspond to measuring compliance of a policy by attempting to satisfy the criteria of the policy, the example compliance measurer 304 may also calculate alternative measurements. For example, in some policies, the criteria may correspond to an undesired (e.g., pathological) state. That is, rather than measuring compliance, the example compliance measurer 304 may measure non-compliance of an inverse policy. For example, the example score calculator 904 may use Equation 18 below to convert a compliance score of a computing resource (a) on a policy (P) to the score of the computing resource (a) on the inverse policy ($\neg$ P).

$$B(P|a) = -B(\neg P|a) \quad \text{Equation 18}$$

In Equation 18 above, an improving compliance score occurs by progressing towards 100% on the policy (P). Alternatively, an improving compliance score may also occur by progressing towards −100% on the inverse policy ($\neg$ P). That is, the compliance score improves as the computing resource (a) dissatisfies criteria of the inverse policy ($\neg$ P). For example, a policy may require that logging be disabled on a computing resource. In some such examples, the compliance score for the computing resource improves when the "logging.enabled" state of the computing resource is "false."

As discussed above in connection with surprisal values, the compliance score is representative of the remaining amount of uncertainty (e.g., missing information) that a computing resource can satisfy a policy given the compliance state of the computing resource. In some examples, Equation 19 below may be used to define the set of truth-values of criteria ($V_a$) determined by a computing resource (a) on a policy (P).

$$V_a = \{V \rightarrow t : V \in V_P \,\&\&\, V(a)\} \quad \text{Equation 19}$$

The criteria truth-values that are determined using Equation 19 above are those that satisfy criteria: the set of criteria truth-values ($V_a$) contains values for the criteria (V) that are tested by a policy (P) (i.e., $V \in V_P$) and are satisfied by a computing resource (a) (i.e., V(a)). Alternatively, when a policy corresponds to an inverse policy, Equation 20 below may be used to define the set of criteria truth-values ($V_a$) determined by a computing resource (a) on a policy ($\neg$ P).

$$V_a = \{V \rightarrow f : V \in V_P \,\&\&\, \neg V(a)\} \quad \text{Equation 20}$$

The criteria truth-values that are determined using Equation 20 above are those of unsatisfied criteria: the set of criteria truth-values ($V_a$) contains the criteria (V) that are tested by a policy (P) (i.e., $V \in V_P$) and are unsatisfied by a computing resource (a) (i.e., $\neg$ V(a)).

While Equation 19 and Equation 20 above may be used to calculate the set of determined criteria ($V_a$), the example score calculator 904 may also presume a value for the set ($V_a$) and use that set to calculate compliance scores for hypothetical situations (e.g., "what if" compliance scores). For example, consider Equation 21 below, which is a logical representation of a policy (P).

$$P = (V_1 \| V_2) \,\&\&\, V_3 \quad \text{Equation 21}$$

In Equation 21 above, the number of criteria is three, the SatCount(P) is three (e.g., $P(V_1, V_2, V_3)$ if ($V_1 \rightarrow f$, $V_2 \rightarrow t$, $V_3 \rightarrow t$) or ($V_1 \rightarrow t$, $V_2 \rightarrow f$, $V_3 \rightarrow t$) or ($V_1 \rightarrow t$, $V_2 \rightarrow t$, $V_3 \rightarrow t$)) and the maximum surprisal (I(P|0)) is 1.415 crits. Using Equations 5 and 21 above, the example score calculator 904 may calculate the compliance score for different sets of criteria compliance states. For example, Table 1 below illustrates the effect on the compliance score when some criteria are considered established (presumed or determined). Each row illustrates an example of established criteria, the remaining undetermined criteria, the SatCount, and the resulting compliance score, for the policy in Equation 21 above.

TABLE 1

| Established Criteria $V_a$ | Number of Undetermined Criteria | SatCount | Compliance Score |
|---|---|---|---|
| $V_3 \rightarrow t$ | 2 | 3 | 70.7% |
| $V_3 \rightarrow t$, $V_2 \rightarrow f$ | 1 | 1 | 29.3% |
| $V_3 \rightarrow t$, $V_2 \rightarrow f$, $V_1 \rightarrow f$ | 0 | 0 | −100% |
| $V_3 \rightarrow t$, $V_2 \rightarrow f$, $V_1 \rightarrow t$ | 0 | 1 | 100% |

When the truth-values of a subset of the criteria ($V_P$) is established by a set ($V_a$), as discussed above in connection with the example score calculator 904, the maximum surprisal (I(P|0)) reflects the size of the policy in crits, while the information gain ($G(P|V_a)$) measures the portion of the policy (P) satisfied by the established criteria ($V_a$), and the compliance score ($1-B(P|V_a)$) is the normalized amount of non-compliance with the policy (P). In addition, the impact of a second set of established criteria truth-values ($V_a'$) to the policy (P) with respect to the first set of criteria truth-values ($V_a$) may be represented by Equation 22 below. The percent difference between the second set of criteria truth-values ($V_a'$) and the first set of criteria ($V_a$) with respect to the policy (P) may be represented by Equation 23 below.

$$\text{Impact} = G(P|V_a') - G(P|V_a) \quad \text{Equation 22}$$

$$\text{Percent Difference} = \|B(P|V_a') - B(P|V_a)\| \quad \text{Equation 23}$$

In some examples, the dependence or independence of a policy may be determined based on a comparison of the maximum surprisals of the policies. For example, if Equation 24 below is true, then the two policies ($P_1$, $P_2$) are independent. If Equation 25 below is true, then the two policies ($P_1$, $P_2$) are dependent (e.g., overlap). If Equation 26 below is true, then satisfying policy ($P_1$) is more uncertain (e.g., requires satisfying more criteria). If Equation 27 below is true, then satisfying the first policy ($P_1$) subsumes (e.g., includes) the second policy ($P_2$).

$$I(P_1 \,\&\&\, P_2|0) = I(P_1|0) + I(P_2|0) \quad \text{Equation 24}$$

$$I(P_1 \,\&\&\, P_2|0) < I(P_1|0) + I(P_2|0) \quad \text{Equation 25}$$

$$I(P_1|0) > I(P_2|0) \quad \text{Equation 26}$$

$$I(P_1|0) = I(P_1|0) + I(P_2|0) \quad \text{Equation 27}$$

In some examples, Equations 24-27 above are also applicable to rules, as a rule may be considered a mini-policy.

While an example manner of implementing the compliance measurer 304 of FIG. 3 is illustrated in FIG. 9, one or more of the elements, processes and/or devices illustrated in FIG. 9 may be combined, divided, re-arranged, omitted, eliminated and/or implemented in any other way. Further, the example results monitor 902, the example score calculator 904, the example surprisal calculator 906, the example information gain calculator 908, the example scorer 910, the example aggregator 912, the example group aggregator 914, the example temporal aggregator 916, the example policy aggregator 918, the example score comparator 920 and/or, more generally, the example compliance measurer 304 of FIG. 3 may be implemented by hardware, software, firmware and/or any combination of hardware, software and/or firmware. Thus, for example, any of the example results monitor 902, the example score calculator 904, the example surprisal calculator 906, the example information gain calculator 908, the example scorer 910, the example aggregator 912, the example group aggregator 914, the example temporal aggregator 916, the example policy aggregator 918, the example score comparator 920 and/or, more generally, the example compliance measurer 304 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the results monitor 902, the example score calculator 904, the example surprisal calculator 906, the example information gain calculator 908, the example scorer 910, the example aggregator 912, the example group aggregator 914, the example temporal aggregator 916, the example policy aggregator 918 and/or the example score comparator 920 is/are hereby expressly defined to include a tangible computer readable storage device or storage disk such as a memory, a digital versatile disk (DVD), a compact disk (CD), a Blu-ray disk, etc. storing the software and/or firmware. Further still, the example compliance measurer 304 of FIG. 3 may include one or more elements, processes and/or devices in addition to, or instead of, those illustrated in FIG. 9, and/or may include more than one of any or all of the illustrated elements, processes and devices.

Flowcharts representative of example machine-readable instructions for implementing the compliance measurer 304 of FIGS. 3 and/or 9 are shown in FIGS. 10-14 and 26. In this example, the machine-readable instructions comprise a program for execution by a processor such as the processor 2412 shown in the example processor platform 2400 discussed below in connection with FIG. 24. The programs may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example programs are described with reference to the flowcharts illustrated in FIGS. 10-14 and 26, many other methods of implementing the example compliance measurer 304 may alternatively be used. For example, the order of execution of the blocks may be changed, and/or some of the blocks described may be changed, eliminated, or combined. Although the operations in the flow diagrams of FIGS. 10-14 and 26 are shown in seriatim, the examples of FIGS. 10-14 and 26 may additionally or alternatively be implemented so that one or more of the operations are performed in parallel with one or more other ones of the operations.

Figure 10:
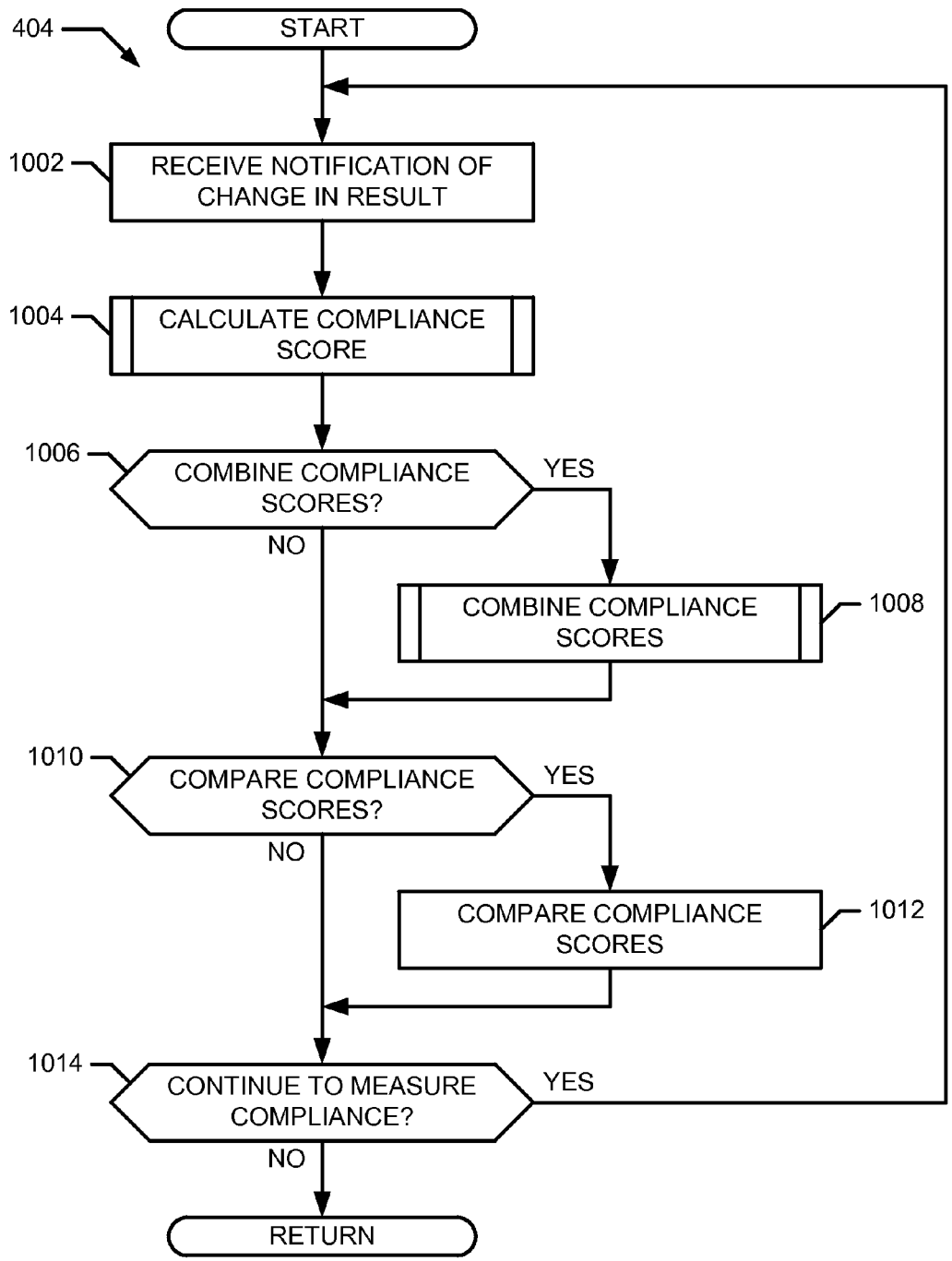
FIGS. 10-14 are flow charts representative of example machine-readable instructions that may be executed to measure compliance states of computing resources in a virtual computing environment.

The example program of FIG. 10 begins at block 1002 when the example compliance measurer 304 (FIGS. 3 and 9) receives a notification for a change in an assessment result. For example, the results monitor 902 (FIG. 9) may receive a notification from the example compliance assessor 302 (FIG. 3) or the example results database 312 (FIG. 3) of a change in an assessment result. In some examples, the change in an assessment result may correspond to a configuration change in a computing resource (e.g., the example computing server 104 (FIG. 1)) in the example virtual computing environment 100 (FIG. 1). At block 1004, the example score calculator 904 (FIG. 9) calculates a compliance score. In some examples, block 1004 is implemented using an example method described below in connection with FIG. 11.

At block 1006, the compliance measurer 304 determines whether to combine the calculated compliance score with one or more compliance scores. For example, the compliance score calculated in block 1004 may be included with compliance scores for a group of computing resources that are also subject to compliance policies. If, at block 1006, the example compliance measurer 304 determines to combine the compliance score calculated at block 1004 with one or more compliance scores, then, at block 1008, the example aggregator 912 (FIG. 9) combines compliance scores over a group of assets, over time, or over a collection of policies. Example processes that may be used to implement block 1008 is described below in connection with FIGS. 12-14. Control then proceeds to block 1010 to determine whether to compare compliance scores.

After the aggregator 912 combines compliance scores over a group of assets, over time, or over a collection of policies at block 1008, or if the compliance measurer 304 determines not to combine the calculated compliance score at block 1006, at block 1010, the compliance measurer 304 determines whether to compare the calculated compliance score with one or more compliance scores. For example, the compliance score calculated in block 1004 may be compared to other scores calculated in block 1004 and/or combined at block 1008.

If, at block 1010, the compliance measurer 304 determines to compare the calculated compliance score, then, at block 1012, the example score comparator 920 compares compliance scores. For example, the score comparator 920 may calculate the difference between a first computing resource compliance score and a second computing resource compliance score. In some examples, the score comparator 920 may determine whether one compliance score is within a threshold of a second compliance score. For example, the score comparator 920 may determine whether the first computing resource is operating within a threshold (e.g., a predetermined threshold such as 5%, a dynamic threshold that changes based on the time of day, etc.) of a combined compliance score of the computing resource over time (e.g., determine whether the first computing resource is operating within a threshold of its usual compliance scores). In some examples, the score comparator 920 may identify a trend of compliance of the first computing resource over time based on compliance scores determined at respective times. In some examples, the score comparator 920 stores the results of the comparison in the scores database 314. For example, the score comparison results may be used to identify moments in time when a computing resource is not in compliance with a policy. Control then proceeds to block 1014 to determine whether to continue measuring compliance.

After the score comparator 920 compares compliance scores at block 1012, or if the compliance measurer 304 determines not to compare compliance scores at block 1010, then, at block 1014, the compliance measurer 304 determines whether to continue measuring compliance. For example, a compliance assessment process may be stopped, or power to the compliance measurer 304 may be removed. In some such examples, the example program of FIG. 10 ends. Otherwise, if the compliance measurer 304 determines to continue measuring compliance, control returns to block 1002, and the example compliance measurer 304 continues to measure compliance of the virtual computing environment 100.

Figure 26:
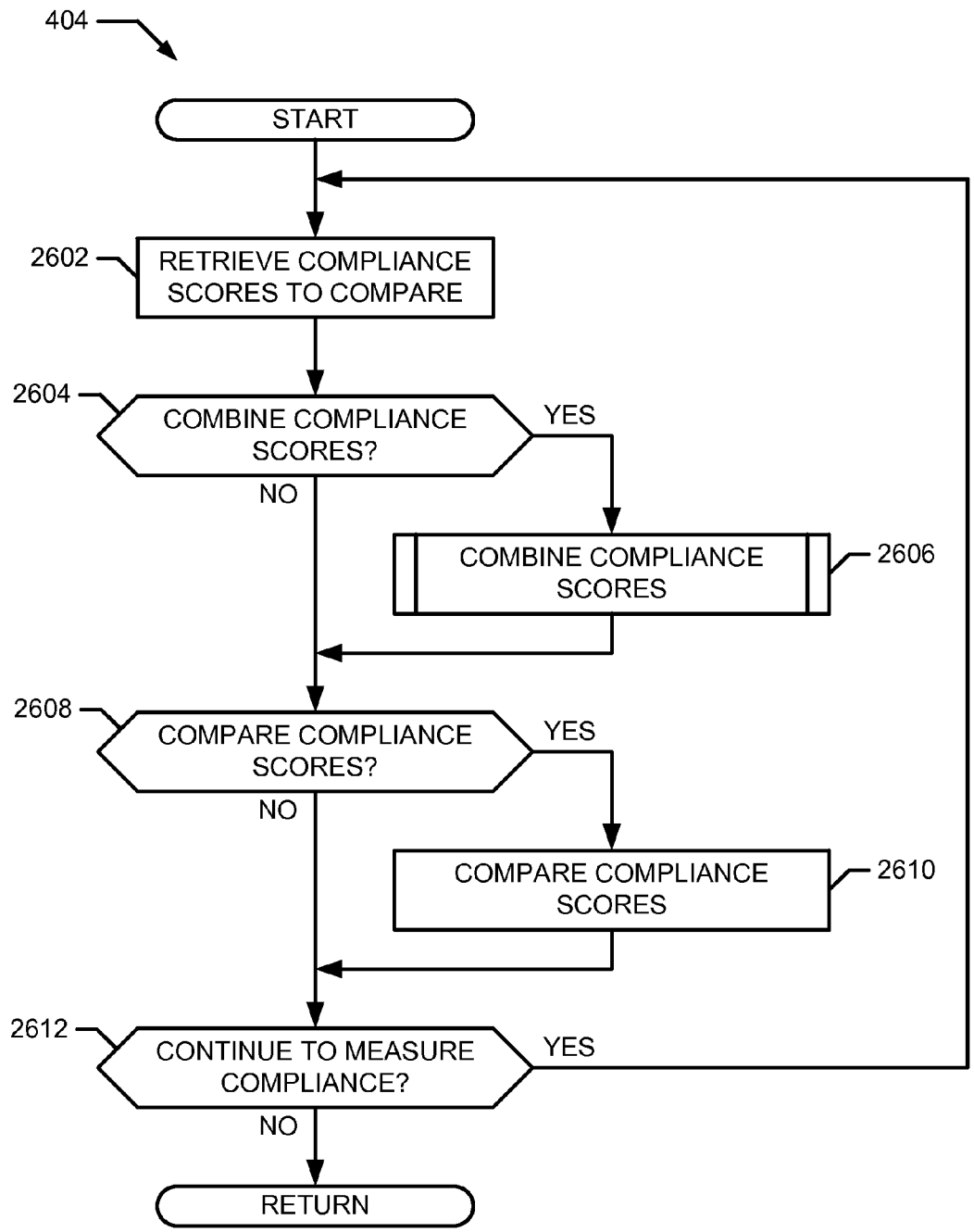
FIG. 26 is a flow chart representative of example machine-readable instructions that may be executed to measure compliance states of computing resources in a virtual computing environment.

The example method of FIG. 26 determines compliance of a computing resource when a notification for a change in an assessment result is not received. For example, the example method of FIG. 26 may be executed when the example compliance measurer 304 (FIGS. 3 and 9) is measuring compliance but the results monitor 902 (FIG. 9) does not receive a notification from the example compliance assessor 302 (FIG.

3) or the example results database 312 (FIG. 3) of a change in an assessment result. The example method of FIG. 26 may be used to implement block 404 of FIG. 4. The example method of FIG. 26 begins at block 2602 when the example score comparator 920 (FIG. 9) retrieves compliance scores to compare. For example, the score comparator 920 may retrieve one or more compliance scores calculated at block 1004 (FIG. 10), combined at block 1008 (FIG. 10) and/or compared at block 1012 (FIG. 10) from the example results database 312.

At block 2604, the compliance measurer 304 determines whether to combine compliance scores. For example, one of the retrieved compliance scores may be included in a group of computing resources that are also subject to compliance policies. If, at block 2604, the example compliance measurer 304 determines to combine at least one of the retrieved compliance scores at block 2602 with one or more other compliance scores, then, at block 2606, the example aggregator 912 (FIG. 9) combines the compliance scores over a group of assets, over time, or over a collection of policies. Example processes that may be used to implement block 2606 is described below in connection with FIGS. 12-14. Control then proceeds to block 2608 to determine whether to compare compliance scores.

After the aggregator 912 combines compliance scores over a group of assets, over time, or over a collection of policies at block 2606, or if the compliance measurer 304 determines not to combine compliance scores at block 2604, at block 2608, the compliance measurer 304 determines whether to compare compliance score(s) with other compliance score(s). For example, the combined compliance score calculated in block 2606 may be compared to other compliance scores retrieved in block 2602. Alternatively, if the example compliance measurer 304 determines not to combine compliance scores at block 2604, for example, the compliance measurer 304 may determine whether to compare a first compliance score retrieved in block 2602 to other compliance scores retrieved in block 2602.

If, at block 2608, the compliance measurer 304 determines to compare compliance scores, then, at block 2610, the example score comparator 920 compares compliance scores. For example, the score comparator 920 may calculate the difference between a first computing resource compliance score and a second computing resource compliance score. In some examples, the score comparator 920 may determine whether one compliance score is within a threshold of a second compliance score. For example, the score comparator 920 may determine whether the first computing resource is operating within a threshold (e.g., a predetermined threshold such as 5%, a dynamic threshold that changes based on the time of day, etc.) of a combined compliance score of the computing resource over time (e.g., determine whether the first computing resource is operating within a threshold of its usual compliance scores). In some examples, the score comparator 920 may identify a trend of compliance of the first computing resource over time based on compliance scores determined at respective times. In some examples, the score comparator 920 stores the results of the comparison in the scores database 314. For example, the scored comparison results may be used to identify moments in time when a computing resource is not in compliance with a policy. Control then proceeds to block 2612 to determine whether to continue measuring compliance.

After the score comparator 920 compares compliance scores at block 2610, or if the compliance measurer 304 determines not to compare compliance scores at block 2608, then, at block 2612, the compliance measurer 304 determines whether to continue measuring compliance. For example, a compliance assessment process may be stopped, or power to the compliance measurer 304 may be removed. In some such examples, the example program of FIG. 26 ends. Otherwise, if the compliance measurer 304 determines to continue measuring compliance, control returns to block 2602, and the example compliance measurer 304 continues to measure compliance of the virtual computing environment 100.

Figure 11:
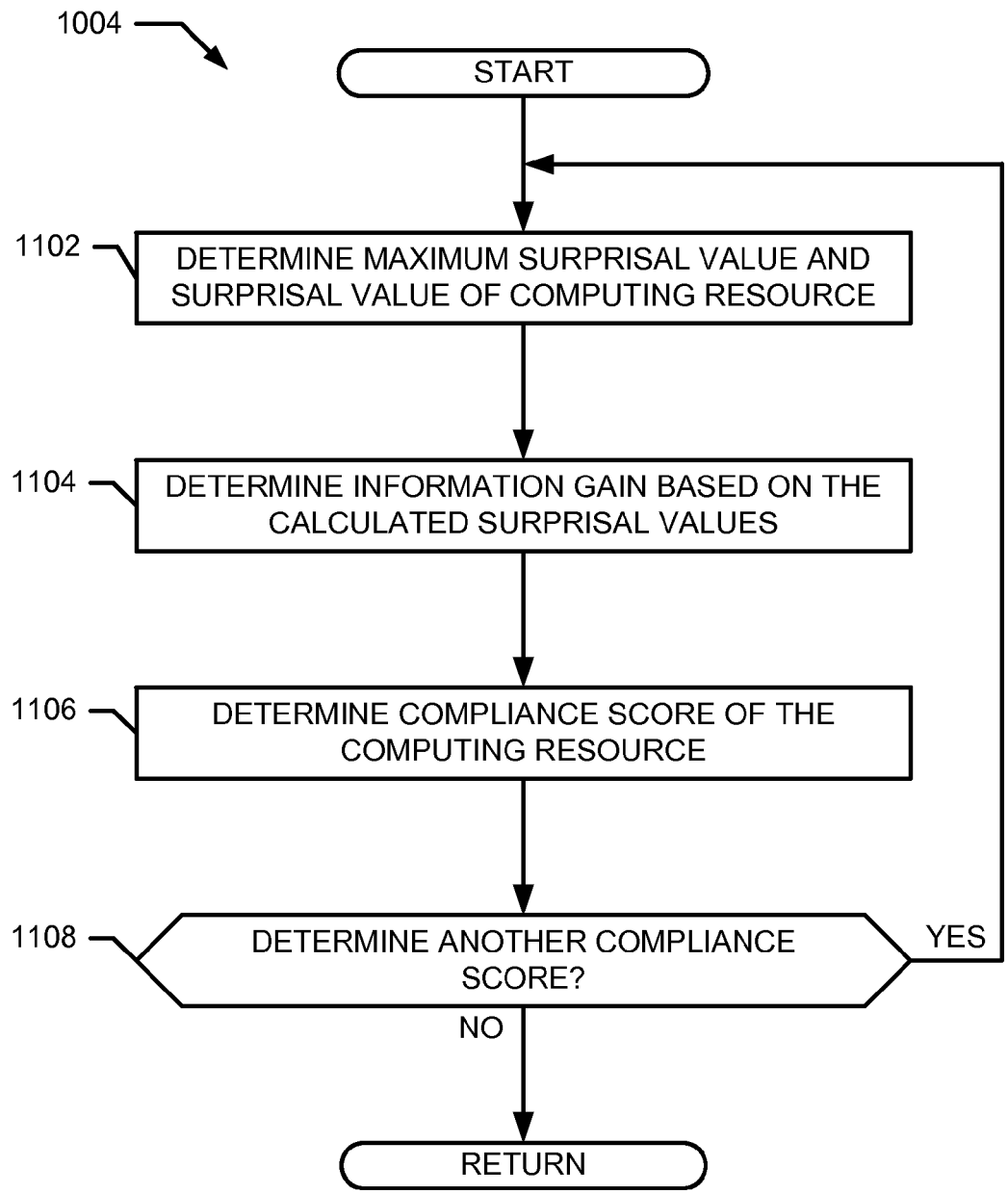

The example method of FIG. 11 calculates a compliance score for a computing resource. For example, a system administrator may decide to calculate a compliance score for a computing resource ($a_j$) (e.g., the example computing server 104 of FIG. 1) of a set of computing resources ($\{a_1, \ldots a_m\}$) against a policy ($P_i$) of a collection of policies ($\{P_1, \ldots P_n\}$). The example method of FIG. 11 may be used to implement block 1004 of FIG. 10. The example method of FIG. 11 begins at block 1102 when the example surprisal calculator 906 (FIG. 9) of the score calculator 904 (FIG. 9) determines a maximum surprisal value (($I(P_i|0)$)) and a remaining surprisal value ($I(P_i|a_j)$) for a computing resource ($a_j$). For example, the surprisal calculator 906 may use Equation 3a above to calculate a maximum surprisal (($I(P_i|0)$)) for the policy ($P_i$). The example surprisal calculator 906 may also use Equation 3b above to calculate a remaining surprisal value ($I(P_i|a_j)$) for the computing resource ($a_j$) against the policy ($P_i$).

At block 1104, the example information gain calculator 908 (FIG. 9) determines the information gain based on the calculated surprisal values. For example, the information gain calculator 908 may use Equation 4 above to measure the amount of compliance ($G(P_i|a_j)$) with the policy ($P_i$) given the configuration state of the computing resource ($a_j$).

At block 1106, the example scorer 910 (FIG. 9) determines a compliance score for the computing resource. For example, the scorer 910 may use Equation 5 above to calculate a compliance score ($B(P_i|a_j)$) for the computing resource ($a_j$) against the policy ($P_i$).

At block 1108, the example score calculator 904 determines whether to determine another compliance score. For example, the score calculator 904 may determine that the notification received from the results monitor 902 includes another computing resource ($a_j$) or may determine that another policy ($P_i$) is enforced against the computing resource ($a_j$). If the score calculator 904 determines that there is another compliance score to calculate, control returns to block 1102 to calculate new surprisal values. Otherwise, if, at block 1108, the score calculator 904 determines not to calculate another compliance score, control returns to a calling function or process such as the example program of FIG. 10, and the example process of FIG. 11 ends.

Figure 12:
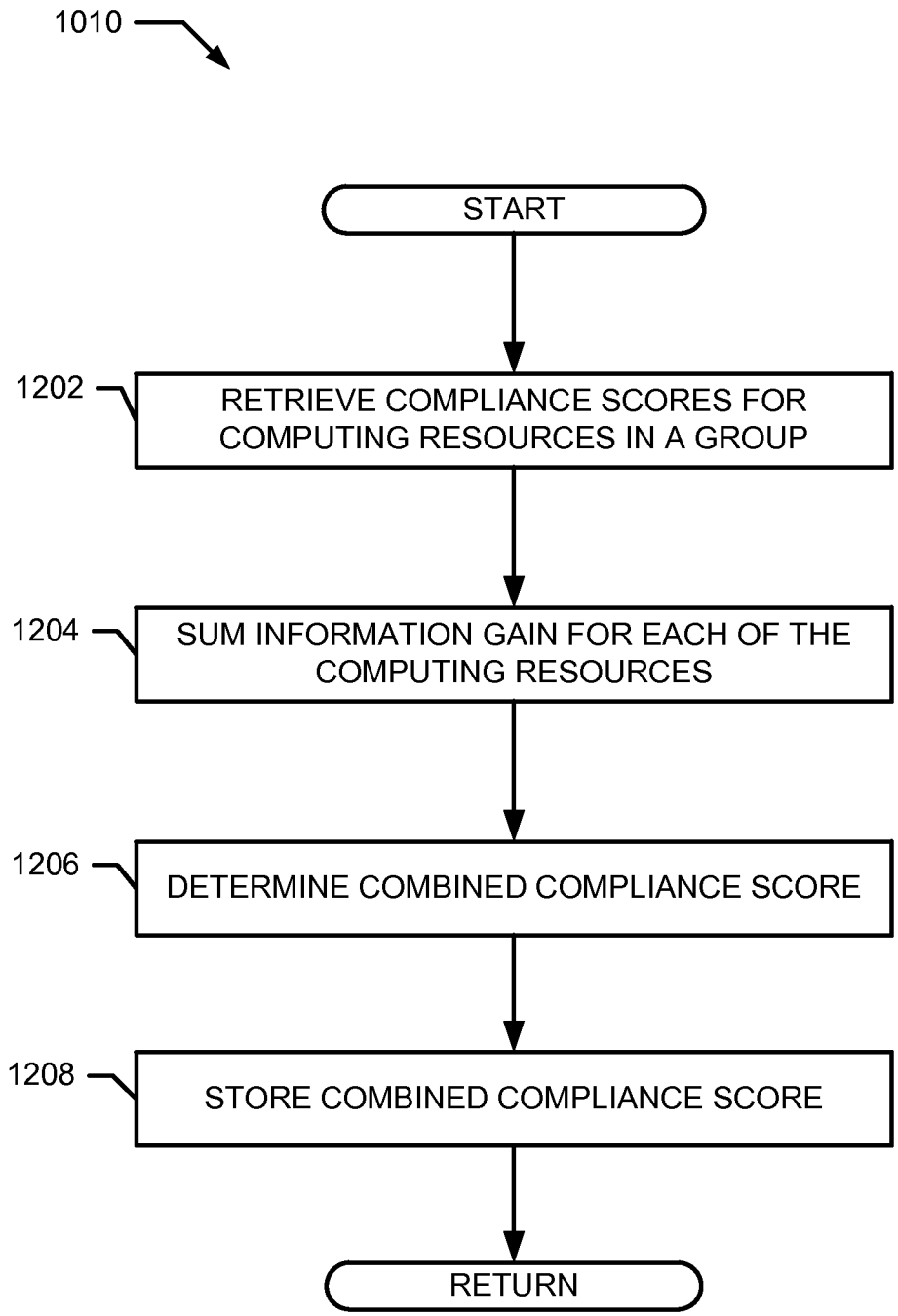

The example method of FIG. 12 combines compliance scores for a group of computing resources against a policy. The example method of FIG. 12 may be used to implement block 1010 of FIG. 10. The example method of FIG. 12 begins at block 1202 when the example aggregator 912 (FIG. 9) retrieves compliance scores from the example scores database 314 (FIG. 3). For example, the aggregator 912 may retrieve compliance scores for ESXi hosts, for virtual machines, for ESX hosts that are part of a cluster, for physical computing devices like networking and storage devices, etc.

At block 1204, the example group aggregator 914 (FIG. 9) sums the information gain ($G(P_i|\{a_1, \ldots a_n\})$) of the compliance scores for each of the computing resources included in the group of computing resources ($\{a_1, \ldots a_n\}$). In some examples, the group aggregator 914 may cause the information gain calculator 908 (FIG. 9) to calculate an information gain for each of the computing resources in the group of computing resources.

At block 1206, the example group aggregator 914 determines the combined compliance score for the group of computing resources. For example, the group aggregator 914 may use Equation 6 above to normalize the summed information gain ($\Sigma G(P_i|a_j)$) using the maximum surprisal value ($I(P_i|0)$) for the policy to calculate the combined compliance score ($B(P_i|\{a_1, \ldots a_n\})$) for the group of computing resources ($\{a_1, \ldots a_n\}$). In some examples, the group aggregator 914 may trigger the example surprisal calculator 906 (FIG. 9) to calculate the maximum surprisal ($I(P_i|0)$) for the policy ($P_i$).

At block 1208, the example group aggregator 914 stores the calculated combined compliance score (e.g., the group-aggregated compliance score) in the example scores database 312. Control then returns to a calling function or process such as the example program of FIG. 10, and the example process of FIG. 12 ends.

Figure 13:
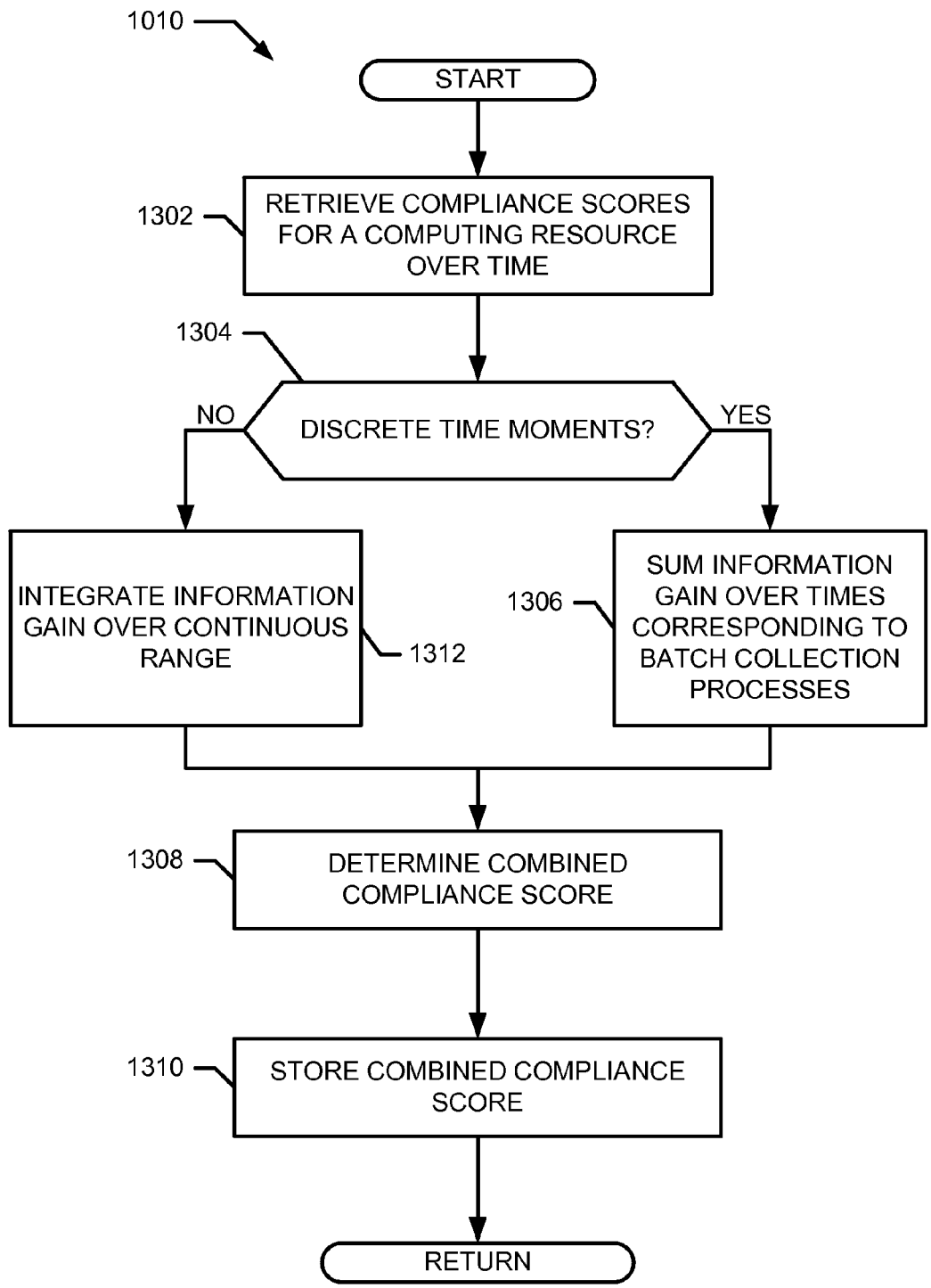

The example method of FIG. 13 combines compliance scores for a computing resource over time. The example method of FIG. 13 may be used to implement block 1010 of FIG. 10. The example method of FIG. 13 begins at block 1302 when the example aggregator 912 (FIG. 9) retrieves compliance scores from the example scores database 314 (FIG. 3). For example, the aggregator 912 may retrieve compliance scores for a computing resource ($a_j$) during a past period.

At block 1304, the example temporal aggregator 916 (FIG. 9) determines whether the retrieved compliance scores are of discrete moments or resulting from configuration change events continuously collected in real-time as configuration changes occur. For example, the aggregator 912 may retrieve compliance scores over the course of a week (e.g., a duration during which continuous monitoring of events is used to detect events as configuration changes occur), every Monday at 9:00 AM (e.g., batch polling at discrete moments in time), etc. If the temporal aggregator 916 determines that the retrieved compliance scores correspond to configuration change events of discrete moments at times ($\{t_1, \ldots t_m\}$), at block 1306, the temporal aggregator 916 sums the information gain ($G(P|a@t_j)$) for j in (1 ... m) of the compliance scores corresponding to a time during which a batch collection process was performed. In some examples, the temporal aggregator 916 causes the information gain calculator 908 to calculate an information gain for the computing resource (a) for a particular time ($t_j$) (e.g., corresponding to each time at which a batch collection process was performed).

At block 1308, the example temporal aggregator 916 determines the combined compliance score for the computing resource based on configuration change events. For example, the temporal aggregator 916 may use Equation 7 above to normalize the summed information gain ($\Sigma G(P|a@t_j)$) using the maximum surprisal ($I(P|0)$) for the policy (P) to calculate the combined compliance score ($B(P|\{a@t_1, \ldots a@t_m\})$) for the discrete time moments ($\{t_1, \ldots t_m\}$). In some examples, the temporal aggregator 916 may cause the example surprisal calculator 906 to calculate the maximum surprisal for the policy.

At block 1310, the example temporal aggregator 916 stores the calculated combined compliance score (e.g., the temporally-aggregated compliance score) of the computing resource (a) over the period ($\{t_1 \ldots t_m\}$) in the example scores database 314.

Referring again to block 1304, if the example temporal aggregator 916 determines that the retrieved compliance scores correspond to configuration change events collected continuously over time (e.g., over a continuous interval of time $[t_1, t_m]$), then, at block 1312, the temporal aggregator 916 integrates the information gain ($G(P|a@t)$) of the retrieved compliance scores for the computing resource (a) over the interval $[t_1, t_m]$. For example, the temporal aggregator 916 may cause the information gain calculator 908 to calculate an information gain for the computing resource over the duration of continuously collected configuration change events. In some examples, the temporal aggregator causes the information gain calculator 908 to calculate the information gain at points of configuration change (e.g., upon change events). The temporal aggregator 916 may then use Equation 8 above to normalize the integrated information gain to calculate the combined compliance score. Control then proceeds to block 1308 to calculate a combined compliance score. For example, the temporal aggregator 916 may use Equation 8 above to normalize the integrated information gain to calculate the combined compliance score ($B(P|a@[t_1, t_m])$). At block 1310, the example temporal aggregator 916 stores the calculated combined compliance score of the computing resource (a) over the period $[t_1, t_m]$ in the example scores database 314. Control then returns to a calling function or process such as the example program of FIG. 10, and the example process of FIG. 13 ends.

Figure 14:
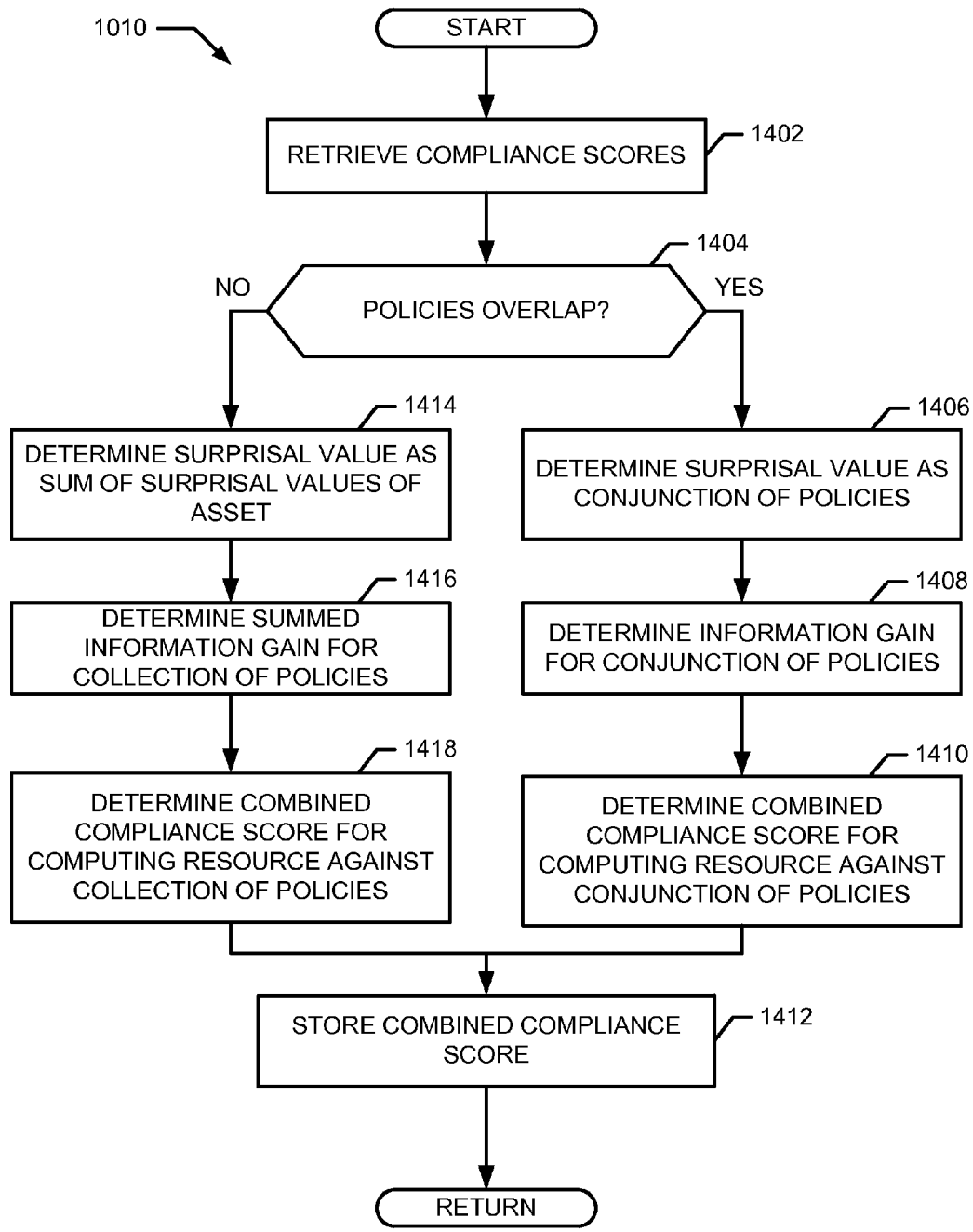

The example method of FIG. 14 combines compliance scores for a computing resource over a collection of policies. The example method of FIG. 14 may be used to implement block 1010 of FIG. 10. The example method of FIG. 14 begins at block 1402 when the example aggregator 912 (FIG. 9) retrieves compliance scores from the example scores database 314 (FIG. 3). For example, the aggregator 912 may retrieve compliance scores for a computing resource (a) calculated with respect to policies from a collection of policies ($\{P_1, \ldots P_n\}$). At block 1404, the example policy aggregator 918 (FIG. 9) determines whether the retrieved compliance scores are calculated against policies that overlap. For example, the policies overlap if they have at least one rule in common (e.g., two policies measuring the same category such as risk, compliance health, etc.).

If the policy aggregator 918 determines the policies associated with the retrieved compliance scores do overlap (e.g., share one or more criteria), then the combined compliance score is calculated as the conjunction of the policies and, at block 1406, the policy aggregator 918 determines the surprisal values for the conjunction of the policies. That is, the combined compliance score for the collection of policies may be calculated similar to calculating the compliance score for a policy including all the criteria of the collection of policies. For example, the policy aggregator 918 may use Equation 9 above to calculate the maximum surprisal ($I(P_1 \cup \ldots P_n|0)$) of the collection of policies ($\{P_1, \ldots P_n\}$). The example policy aggregator 918 may use Equation 9 above to also calculate the remaining surprisal value ($I(P_1 \cup \ldots P_n|a)$) of the computing resource (a) against the collection of policies ($\{P_1, \ldots P_n\}$). In some examples, the policy aggregator 918 may cause the surprisal calculator 906 (FIG. 9) to calculate the surprisal values.

At block 1408, the example policy aggregator 918 determines the information gain for the conjunction of the collection of policies. For example, the policy aggregator 918 may use Equation 10 (FIG. 9) to calculate the information gain ($G(P_1 \cup \ldots P_n|a)$) for the collection of policies ($\{P_1, \ldots P_n\}$) enforced against the computing resource ($a_i$). In some examples, the policy aggregator 918 may cause the information gain calculator 908 (FIG. 9) to calculate the information gain.

At block 1410, the example policy aggregator 918 determines the combined compliance score for the computing resource (a) over the collection of policies ($\{P_1, \ldots P_n\}$). For example, the policy aggregator 918 may use Equation 11 above to normalize the information gain ($G(P_1 \cup \ldots P_n|a)$)

using the maximum surprisal ($I(P_1 \cup \ldots P_n|0)$) for the conjunction of the collection of policies ($\{P_1, \ldots P_n\}$) to calculate the combined compliance score ($B(P_1 \cup \ldots P_n|a)$) for the computing resource (a) against the collection of policies ($\{P_1, \ldots P_n\}$). In some examples, the policy aggregator 918 may cause the example surprisal calculator 906 (FIG. 9) to calculate the maximum surprisal ($I(P_1 \cup \ldots P_n|0)$) for the conjunction of the policies ($\{P_1, \ldots P_n\}$).

At block 1412, the example policy aggregator 918 stores the calculated combined compliance score (e.g., the policy-aggregated compliance score) in the example scores database 314.

Returning to block 1404, if the example policy aggregator 918 determines the policies associated with the retrieved compliance scores do not overlap (e.g., are independent policies sharing no criteria, or are to be treated as independent policies, etc.), then, at block 1414, the policy aggregator 918 determines the combined surprisal value as the sum of the surprisal values of all the policies in the collection of policies ($\{P_1, \ldots P_n\}$). For example, the policy aggregator 918 may use Equation 12 above to calculate the maximum surprisal ($I(P|0)$) for each policy in the collection of policies ($\{P_1, \ldots P_n\}$). The example policy aggregator 918 may use Equation 12 above to also calculate the surprisal value ($I(\{P_1, \ldots P_n\}|a)$) for the computing resource against each of the policies in the collection of policies ($\{P_1, \ldots P_n\}$). In some examples, the policy aggregator 918 may cause the surprisal calculator 906 to calculate the surprisal values.

At block 1416, the example policy aggregator 918 determines the information gain for the computing resource against the collection of policies. For example, the policy aggregator 918 may use Equation 13 above to calculate the combined information gain ($G(\{P_1, \ldots P_n\}-a)$). In some examples, the policy aggregator 918 may cause the information gain calculator 908 to calculate the information gain.

At block 1418, the example policy aggregator 918 determines the combined compliance score for the computing resource over the collection of policies. For example, the policy aggregator 918 may use Equation 14 above to normalize the combined information gain ($G(\{P_1, \ldots P_n\}|a)$) using the summed maximum surprisal value ($\Sigma(I(P_i|0))$) for the collection of policies ($\{P_1, \ldots P_n\}$) against the computing resource (a). In some examples, the policy aggregator 918 may cause the example surprisal calculator 906 to calculate the summed maximum surprisal value for the collection of policies. Control then proceeds to block 1412, and the example policy aggregator 918 stores the calculated combined compliance score in the example scores database 314. After block 1412, control returns to a calling function or process such as the example program of FIG. 10, and the example process of FIG. 14 ends.

III. Identifying Priorities

Compliance policies apply to an inventory of computing resources such as the computing resources of the example virtual computing environment 100 of FIG. 1. Policies may be defined by any organization, industry consortium, government agency, company and/or any other entity or individual. Some example policies that may be used with examples disclosed herein are provided by VMware, Inc., a Delaware corporation, in the vSphere Hardening Guide (VHG) and by the Defense Information Securities Agency (DISA) in the form of Secure Technical Implementation Guides (STIGS).

An individual rule may be applicable to a subset of the inventory, such as to ESXi hosts within a datacenter that contains ESXi hosts, datastores and networking equipment. Thus, as used herein, an asset class is the subset of an inventory of computing resources satisfying a scope condition (e.g., satisfying a test performed by the scope tester 406 of FIG. 4) of a rule within a policy. The set of computing resources (or computing assets) that satisfy the scope condition may sometimes be referred to as being within the scope of the rule. For example, a first asset class may include all ESXi hosts, a second asset class may include Virtual Machines (VMs) with VMware Tools software installed, and a third asset class may include ESX hosts that are members of a cluster. In some examples, asset classes may overlap (e.g., a resource may be a member of more than one asset class). The size of an asset class (e.g., the first asset class, the second asset class, etc.) is the number of computing resources it contains. For example, the VHG policy identifies 27 asset classes tested by 150 rules.

To determine compliance of a computing resource that is within the scope of a rule, the computing resource is tested against a rule check condition (e.g., a test performed by the check tester 408 of FIG. 4) of the rule. In some examples, when a scope condition fails (e.g., the computing resource is not within the scope of the rule), the rule corresponding to the scope condition is considered inapplicable, a rule check condition corresponding to the rule is not tested, and no defect is generated. When the computing resource satisfies the scope condition but fails the rule check condition of the rule, a defect is generated. Thus, as used herein, a defect results (e.g., is generated) when a computing resource fails the rule check condition corresponding to a rule. When a defect is generated, the associated computing resource and rule, including the scope condition results and the rule check condition, may be logged. In the illustrated example, each defect has an associated repair action to correct the defect. For example, a repair action may include installing an update or a software patch. In some examples, an update or patch changes a configuration setting such as setting an "enable copying" property of a computing resource to False to satisfy a "disable copy" rule of a policy.

Using prior systems to test large numbers of computing resources using a significant number of rules, the resulting list of defects (sometimes referred to as a "compliance report" or "results") may quickly become unmanageable. Fully automated remediation using such prior systems is often impractical. Examples disclosed herein are useful to overcome such limitations of prior systems by ranking defects so that high-priority defects may be prioritized or ranked relatively higher to receive quicker attention and/or remediation. Thus, to process defects resulting from computing resources that fail policy rules, example methods and apparatus disclosed herein prioritize defects according to their relevance to particular users (e.g., system administrators), entities (e.g., organizations or businesses), etc.

Relevance, as used herein, may be represented as a priority order determined by past (i.e., historical) repair actions performed by the corresponding person, entity, etc. For example, response times of how quickly users addressed and/or repaired the same types of defects may be represented as defect historical repair rates. A defect historical repair rate indicates how quickly defects have been addressed by the user (e.g., an entity, an IT department, an individual, etc.) in the past. For example, a user may historically address (e.g., attempt to repair) defects associated with risk categories (e.g., security vulnerabilities) quicker than defects associated with operational compliance categories. Examples disclosed herein combine the defect historical repair rate with weights learned from the defect repair history (e.g., a log of past repair actions to repair defects) to map the defect historical repair rate into a priority order that correlates with relevance. To this end, example methods and apparatus disclosed herein include grouping defects into defect classes that share a common repair action to correct the defect, generating an estimation function based on previous user behavior and attentiveness at maintaining a policy, estimating a priority order for the defect classes using the estimation function, and ranking the defect classes based on their estimated priority order.

Figure 15:
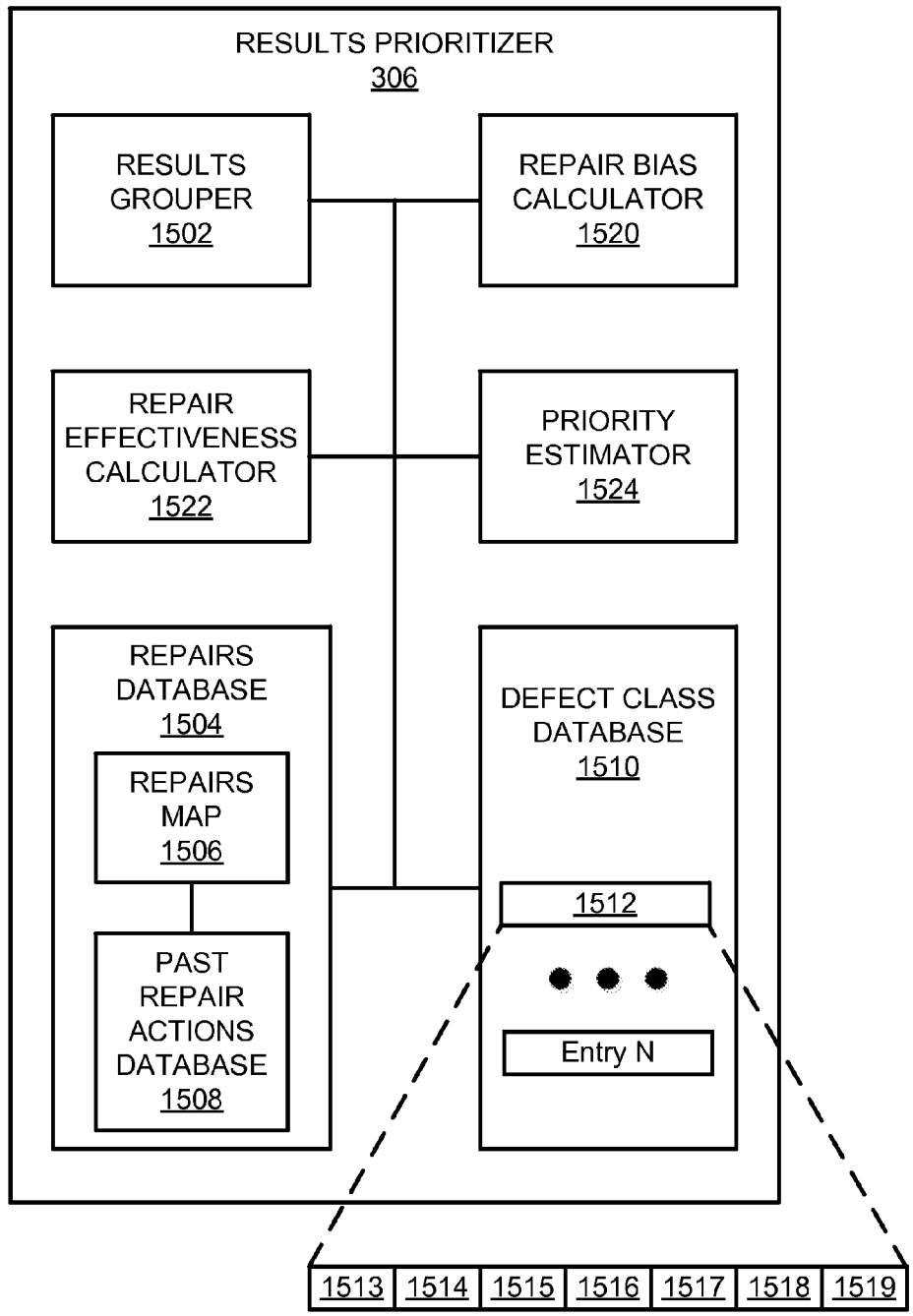
FIG. 15 is a block diagram of an example implementation of the example results prioritizer of FIG. 3.

FIG. 15 is a block diagram of an example implementation of the example results prioritizer 306 (FIG. 3) of the example compliance monitor 218 of FIGS. 2 and 3. In the illustrated example of FIG. 15, the example results prioritizer 306 includes an example results grouper 1502, an example repairs database 1504, an example defect class database 1510, an example repair bias calculator 1520, an example repair effectiveness calculator 1522 and an example priority estimator 1524. The example repairs database 1504 includes an example repairs map 1506 that maps a defect to a repair action used to correct the defect. The example repairs database 1504 also includes an example past repair actions database 1508 that stores a repair history (e.g., historical data) of past repair actions. For example, the past repair actions database 1508 may identify when a defect was detected and when a repair action to correct the defect was executed (or implemented) by a user (e.g., a system administrator).

In the illustrated example of FIG. 15, the example results prioritizer 306 includes the example results grouper 1502 to aggregate defects into groupings (e.g., defect classes). When the example results grouper 1502 receives a notification of a defect (e.g., from the example compliance assessor 302 (FIG. 3), the example results database 312 (FIG. 3), etc.), the results grouper 1502 uses the scope test information included in the defect to identify an asset class that includes the computing resource identified in the defect. In the illustrated example of FIG. 15, the results grouper 1502 queries the repairs map 1506 for a repair action to correct the defect.

The example results grouper 1502 of FIG. 15 aggregates defects into defect classes by grouping the defects sharing a common asset class and having the same repair action. Defects in the same defect class correspond to computing resources of the same asset class. Thus, the repair action (e.g., installing a patch) associated with those defects is applicable to and may be used for any computing resource in the asset class. For example, the results grouper 1502 may group a first defect into a defect class based on the first defect belonging to a same asset class and corresponding to a same repair action as a second defect in the defect class (e.g., two different defects fixed by applying the same patch). In some examples, instead of prioritizing individual resource (e.g., asset) defects, the example results grouper 1502 enables prioritizing defect classes, which facilitates using the same repair to process (e.g., correct) the defects in the same defect class. The size of a defect class is the number of defects contained in the defect class. The extent of a defect class is representative of the set of computing resources affected by the defects in the defect class although a one defect to one resource mapping may not be true for each instance (e.g., a resource may have two defects in the same class). In examples disclosed herein, defects are associated with a timestamp to identify different times at which defects occur. After the example results grouper 1502 classifies a defect, the results grouper 1502 logs a defect entry corresponding to the classified defect in the defect class database 1510.

In the illustrated example of FIG. 15, the example defect class database 1510 stores defect entries generated by the example results grouper 1502 when classifying an assessment result indicative of a compliance failure (e.g., a defect). An example entry 1512, shown in FIG. 15, includes an example defect identifier 1513, an example timestamp 1514, an example asset identifier 1515, an example asset class identifier 1516, an example policy rule identifier 1517, an example repair action identifier 1518, and an example defect class identifier 1519. The example defect identifier 1513 identifies a defect (e.g., a defect reference number) that resulted from an assessment. The example timestamp 1514 identifies the time at which the defect identified by the defect identifier 1513 occurred. The example asset identifier 1515 identifies a computing resource that corresponds to the defect identified by the defect identifier 1513. The example asset class identifier 1516 identifies an asset class that includes the computing resource identified by the asset identifier 1515. The example policy rule identifier 1517 identifies the rule failed by the computing resource identified by the asset identifier 1515. The example repair action identifier 1518 identifies a repair action to correct the defect identified by the defect identifier 1513. The example defect class identifier 1519 identifies a defect class that includes the defect identified by the defect identifier 1513. The example Table 2 below includes three defect entries (e.g., defects) categorized into two example defect classes having corresponding policy rules, asset classes and repair actions based on the VHG policy discussed above.

TABLE 2

| Defect Class | Rule | Asset Class | Repair |
| --- | --- | --- | --- |
| 1 | disable-console-copy | VM with Tools | isolation.tools.copy.disable := True |
| 2 | isolate-vum-proxy | vCenter | Limit the connectivity between Update Manager and public patch repositories. |
| 2 | isolate-vum-webserver | vCenter | Limit the connectivity between Update Manager and public patch repositories. |

In the illustrated example of FIG. 15, the example results prioritizer 306 includes the example repair bias calculator 1520 to determine a repair bias for preferring to repair defects of one defect class over defects of another defect class. For example, the example repair bias calculator 1520 may determine that a first type of defect class may contain defects having shorter detect-to-repair times (e.g., the duration between defect detection and defect repair and/or defect repair initiation) than other defect classes. In some such examples, the repair bias calculator 1520 may determine that the user exhibits quicker response times for correcting defects of the first defect class than for correcting defects from other defect classes.

The example repair bias calculator 1520 of FIG. 15 uses the historical rate of repair (e.g., retrieved from the example past repair actions database 1508) for each of the defect classes based on historical repair actions to determine prioritizations for correcting different defects from different defect classes. That is, the example results prioritizer 306 may utilize the defect class historical rate of repairs calculated by the example repair bias calculator 1520 to identify defects associated with a historical higher rate of repair (e.g., shorter intervals between defect detection and defect repair) as defects that a user responds to more quickly relative to other defects from defect classes with lower rates of repair.

In the illustrated example of FIG. 15, the example repair bias calculator 1520 determines the historical rate of repair for a defect class based on previous assessment results from the example results database 310 of FIG. 3, the example defect class database 1510 and/or the example past repair actions database 1508. For example, the repair bias calculator 1520 may identify when a defect was detected and when a repair action to correct the defect was executed (or implemented) by a user from the example past repair actions database 1508. Thus, the rate of repair may be representative of an average historical detect-to-repair time between detecting a same defect as a first defect and initiating repair of the same defect. The techniques disclosed below in connection with Equations 28 and 29 may be used by the example repair bias calculator 1520 to calculate a repair bias for repairing defects from one defect class over defects from another defect class. For example, the repair bias calculator 1520 may use Equation 28 below to calculate the rate (y) at which a defect (in a defect class ($D_j$)) is repaired at a time (t).

$$y_j^t = \min((\|A_j^{t-1}\| - \|A_j^t\|)/\|C_j\|, 0) \quad \text{Equation 28}$$

In Equation 28 above, an asset class ($C_j$) is a subset of an inventory of computing resources (e.g., assets) that satisfy a scope condition for a policy rule, and the extent ($A_j$) of a defect class ($D_j$) is representative of the set of computing resources affected by the defects in a defect class ($D_j$). The fraction of an asset class ($C_j$) affected by a defect class ($D_j$) is the ratio of the number of computing resources ($\|A_j\|$) affected by the defect class ($D_j$) to the number of computing resources in the asset class ($\|C_j\|$). Thus, the example repair bias calculator 1520 uses Equation 28 above to calculate the change in the fraction of an asset class affected by defects in a defect class ($D_j$) between assessment tests (e.g., between times (t−1, t)). In some examples, the repair bias calculator 1520 may then use Equation 29 below to calculate the normalized rate ($y_j$) at which defects in a defect class ($D_j$) are repaired.

$$y_j = \Sigma_t y_j^t/n, \text{ for } n \text{ time cycles} \quad \text{Equation 29}$$

In Equation 29 above, the number of time cycles (n) is the different times data points were calculated by Equation 28 above. Thus, the example repair bias calculator 1520 uses Equation 29 above to calculate the average rate of repair for a defect in a defect class ($D_j$) (e.g., the normalized rate (e.g., detect-to-repair time per defect occurrence) at which defects in a defect class ($D_j$) are repaired) per step (e.g., between assessment tests to generate the defects). In the illustrated example, the average rate of repair ($y_j$) is representative of the repair bias of defect class ($D_j$). In some examples, the average rate of repair ($y_j$) may be used to determine relevance. For example, a defect class with a relatively higher average rate of repair ($y_j$) (e.g., a lower detect-to-repair time per defect occurrence) may correspond to a more relevant defect to repair to a user, and, thus, may be prioritized or ranked relatively higher than a defect class with a lower average rate of repair.

In the illustrated example of FIG. 15, the example results prioritizer 306 includes the example repair effectiveness calculator 1522 to calculate the effect that repairing a defect has on the overall compliance of computing resources with a policy. For example, correcting a defect by changing a property state (or configuration setting) of a computing resource affects all policies that include that computing resource in their scope. This change is quantifiable, and the example repair effectiveness calculator 1522 of FIG. 15 calculates an average change in compliance score (e.g., a repair effectiveness) for each policy resulting from repairs to a defect class. The repair effectiveness may then be used to prioritize certain repairs over others. For example, a defect class with a relatively higher repair effectiveness may correspond to a more relevant defect to repair to a user, and, thus, may be prioritized or ranked relatively higher than a defect class with a lower repair effectiveness.

In the illustrated example of FIG. 15, the example repair effectiveness calculator 1522 may retrieve compliance scores from the example compliance measurer 304 (FIG. 3) and/or the example scores database 314 (FIG. 3) that are indicative of a degree of compliance of a computing resource (e.g., an asset) to a policy. For example, for each policy (P) and computing resource (a), a compliance score of B(P|a) in the range [−1,1] is calculated, where 1 indicates total satisfaction of the policy by the computing resource (a). As discussed in greater detail above in connection with the example compliance measurer 304, the compliance score may be normalized for groups of computing resources and/or of a computing resource at specific times. For example, the compliance score ($B(P|\{a_1, \ldots, a_n\})$) is the compliance score of a policy (P) given the computing resources ($\{a_1, \ldots a_n\}$). The compliance score of computing resources may be utilized to determine the score of computing resource (a) on policy (P) at time (t) (e.g., $B(P|a^t)$). In some such examples, an average change in compliance score (e.g., score improvement) when repairs to defects in a defect class ($D_j^t$) are performed may be found using Equations 30 and 31 below.

$$b_{j,i}^t = \min(B(P_i \mid A_j^t) - B(P_i \mid A_j^{t-1}), 0) \quad \text{Equation 30}$$

$$b_{j,i} = \frac{\sum_t b_{j,i}^t}{n}, \text{ for } n \text{ cycles} \quad \text{Equation 31}$$

In Equation 30 above, the change in compliance score ($b_{j,i}^t$) is the difference in compliance score between the extent of the defect class at a first time (t) and at a previous time (t−1), the compliance score ($B(P_i|A_j^t)$) is the compliance score for the policy ($P_i$) given the extent of the defect class at the first time (t), and the compliance score ($B(P_i|A_j^{t-1})$) is the compliance score for the policy ($P_i$) given the extent of the defect class at the second time (t−1). In other words, the change in compliance score ($b_{j,i}^t$) is the amount that repairing a defect in a defect class ($D_j^t$) improves the compliance score on the policy ($P_i$) at time (t). The example repair effectiveness calculator 1522 may then use Equation 31 above to calculate the repair effectiveness ($b_{j,i}$) on a policy ($P_i$) (e.g., the average (or normalized) change in compliance score (e.g., score improvement) on a policy ($P_i$)) based on the average of the summed total of the change in compliance scores given a change in the extent ($A_j$) (e.g., the set of affected computing resources) of a defect class per step (e.g., between assessment tests).

In the illustrated example of FIG. 15, the example results prioritizer 306 includes the example priority estimator 1524 to estimate a rank order for defect classes based on relevance to corrective actions that are typically performed by a particular user (e.g., an entity, an IT group, an individual, and/or any other type of user of content). Rather than retrieving explicit preferences from a user (e.g., prompting the user to identify a priority order), the example priority estimator 1524 uses repair bias to estimate a rank order for the defect classes. That is, historical repair data such as past repair actions and previous assessment results are utilized to determine which, if any, defect class defects a user implicitly prefers to correct relatively more quickly than defects from other defect classes. In some such examples, the defect classes may be ranked based on the average duration of a repair interval. For example, a defect class with a high rate of repair (e.g., a short detect-to-repair interval per defect occurrence) may be representative of types of defects that a user prefers to correct relatively more quickly than other defects. Thus, the example priority estimator 1524 may estimate a priority order of defect classes based on repair bias calculations retrieved from the example repair bias calculator 1520. As a result, the past corrective behavior of the user in question is used to set the priority during as opposed to express priority rankings input by the user. In some examples, express priority rankings may additionally or alternatively be entered. In some examples, the priority estimator 1524 facilitates displaying the defect class in rank order with a plurality of other defect classes based on the estimated priority.

As discussed above, repairing a defect may affect compliance scores of more than one policy that is enforced in the computing environment. Thus, in some examples, the priority estimator 1524 may estimate a rank order for defect classes based on repair effectiveness of a repair in making a computing resource comply with (e.g., improve the compliance score of) a policy. For example, the priority estimator 1524 may compare the average score change step on a policy for the different defect classes and rank-order the defect classes accordingly. Thus, the example priority estimator 1524 may estimate a priority order of defect classes based on repair effectiveness calculations retrieved from the example repair effectiveness calculator 1522.

In some examples, the example priority estimator 1524 leverages the rate of repair calculations with the repair effectiveness calculations to estimate a priority order for the defect classes. In some such examples, the example priority estimator 1524 uses a learning algorithm (e.g., a machine-learning algorithm) to generate an estimation function based on historical data to estimate the priority order, which may then be used to predict the rank-order for the defect classes.

The priority estimator 1524 of the illustrated example uses a support vector regression (SVR) learning algorithm to generate an estimation function. Instead of soliciting training examples from a user, the example priority estimator 1524 builds a training set based on historical data retrieved from, for example, the results database 310 of FIG. 3, the example defect class database 1510 and/or the example past user repairs database 1518. As a result, the example SVR learning algorithm learns to predict relevant priorities based on past repair actions and previous assessment results. In some such examples, the priority estimator 1524 may use Equations 32 and 33 below to build a training set for the example SVR learning algorithm.

$$S_j^t = (x_j^{t-1}, y_j^t) \qquad \text{Equation 32}$$

$$S^t = U_j S_j^t \qquad \text{Equation 33}$$

In Equation 32 above, the training set vector ($S_j^t$) for defects in a defect class ($D_j$) at time (t) is calculated using the rate of repair ($y_j^t$) for defects in the defect class ($D_j$) at time (t) and a feature vector ($x_j^{t-1}$). The feature vector ($x_j^{t-1}$) is a vector that combines the rate of repair calculations and the repair effectiveness calculations for the time (t−1) into a vector. For example, the feature vector ($x_j^{t-1}$) may include the average repair rate ($y_j^{t-1}$) of defects in a defect class ($D_j$), the repair effectiveness ($b_{j,i}^{t-1}$) on policies $P_i$ in ({$P_1, \ldots P_n$}), the asset class ($C_j$) corresponding to the defect class ($D_j$), etc. The example priority estimator 1524 uses the training set vector ($S_j^t$) to build a training set ($S^t$), which may then be input into the example SVR learning algorithm. As shown in Equation 33 above, the training set ($S^t$) is the union of training set vectors ($S_j^t$) for the defects in the defect class ($D_j$) at a time (t). Thus, the training set ($S^t$) represents a collection of feature vectors ($x_j^{t-1}$, $y_j^t$) for each (j) and defect class ($D_j$) at time (t).

The example priority estimator 1524 may then use the training set ($S^t$) as input into the SVR learning algorithm. For example, the priority estimator 1524 may use Equation 34 below to generate a rank estimating function ($f^t$).

$$f^t = SVR(S^t) \qquad \text{Equation 34}$$

In Equation 34 above, the rank estimating function ($f^t$) is output by the SVR learning algorithm at each time (t) and the rank estimating function ($f^t$) depends on the training set input ($S^t$) to the SVR learning algorithm. The example priority estimator 1524 of the illustrated example uses the rank estimating function ($f^t$) to predict the next (e.g., at time t+1) rate of repair ($y_j^{t+1}$) based on the feature vector ($x_j^t$) for defects in the defect class ($D_j$). For example, the priority estimator 1524 may use Equation 35 below to predict the next rate of repair ($y_j^{t+1}$).

$$y_j^{t+1} \cong f^t(x_j^t) \qquad \text{Equation 35}$$

In Equation 35 above, the predicted next rate of repair ($y_j^{t+1}$) is representative of an estimated relevance based on past repair actions. In some examples, the predicted next rate of repair is used as a priority for repairing defects of defect class ($D_j$) at time (t) (e.g., $D_j^t$). In some such examples, the priority estimator 1524 may facilitate displaying the defect classes in rank order based on the priorities for repairing the defects of the respective defect classes.

In the illustrated example of FIG. 15, the priority estimator 1524 estimates relevance (e.g., priorities) of a defect based on the repair history of the corresponding defect class. Additionally, the calculated repair bias used by the priority estimator 1524 is user-agnostic. That is, a first user repair bias for repairing, for example, performance compliance defects may influence the repair priorities predicted for a second user (e.g., a user more interested in, for example, repairing security vulnerability defects).

Accordingly, in some examples, the example priority estimator 1524 may use user identifiers to personalize the estimated relevance ($y_j^{t+1}$) and prediction function ($f^t$) calculated in Equation 35 above. For example, when an entry is logged in the past repair actions database 1508, the entry may also include a user identifier to identify the user who initiated the repair. In some such examples, the user identifier may be used to personalize the repair bias for repairing defects (e.g., to specific IT personnel, specific groups in an entity, etc.). For example, the priority estimator 1524 may filter entries from the example past repair actions database 1508 that do not match the user identifier representative of the current user prior to estimating a relevance (e.g., an estimated next rate of repair) for a defect class such that only repairs by the corresponding user affect the estimate. In some such examples, the repair bias of the first user would not skew the predicted repair priorities for a second user.

In some examples, the priority estimator 1524 adjusts prioritization based on preferences of system administrators or groups within an enterprise that may work on different portion of the virtual computing environment 100 (FIG. 1) or on the same portion at different times (e.g., day shift versus night shift). For example, defect repairs made by one member of a work-group may influence the expected rate of repair (and hence defect class relevance) of other members of the work-group. In some examples, the repair history may be weighted based on hierarchy in a group. For example, the priority estimator 1524 may give preference to (e.g., weigh heavier) a repair history of a system administration department manager than a system administrator in the department when estimating relevance.

In some examples, defect classes may influence other defect classes. For example, different policy rules may share criteria (e.g., tested configuration settings). As a result, a first user preference for repairing a first defect class may be used to influence the estimated next rate of repair ($y_j^{t+1}$) of a related second defect class that shares criteria.

In some examples, a "filter bubble" may influence the estimated relevance (e.g., the estimated next rate of repair) of defect classes. A filter bubble may occur when recommendations are influenced (e.g., overwhelmingly influenced) by past behavior and, thereby, biasing the user (or repairs) into more of the same behavior. For example, the repair history for a first defect class may be so robust that repairing subsequent defects of the first defect class are continuously prioritized over repairing other defect classes. As a result, the other defect classes are unable to rise in priority, and the example priority estimator 1524 continues to prioritize the first defect class over the other defect classes, thereby continuing to bias the user into repairing defects in the first defect class. In some such examples, the inputs into the priority estimator 1524 may be periodically (e.g., once per week) and/or aperiodically (e.g., in response to a user request) modified based on user preferences. For example, a user may select (e.g., via a switch) to disable smart recommendations, rank defects conventionally (e.g., not based on estimated relevance, etc.), insert random results (e.g., into the training data), and/or adjust the degrees of predictive power versus static scoring via a graphical user interface element such as, for example, a "volume knob."

While an example manner of implementing the results prioritizer 306 of FIG. 3 is illustrated in FIG. 15, one or more of the elements, processes and/or devices illustrated in FIG. 15 may be combined, divided, re-arranged, omitted, eliminated and/or implemented in any other way. Further, the example results grouper 1502, the example repairs database 1504, the example repairs map 1506, the example past repair actions database 1508, the example defect class database 1510, the example repair bias calculator 1520, the example repair effectiveness calculator 1522, the example priority estimator 1524, and/or, more generally, the example results prioritizer 306 of FIG. 3 may be implemented by hardware, software, firmware and/or any combination of hardware, software and/or firmware. Thus, for example, any of the example results grouper 1502, the example repairs database 1504, the example repairs map 1506, the example past repair actions database 1508, the example defect class database 1510, the example repair bias calculator 1520, the example repair effectiveness calculator 1522, the example priority estimator 1524 and/or, more generally, the example results prioritizer 306 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example results grouper 1502, the example repairs database 1504, the example repairs map 1506, the example past repair actions database 1508, the example defect class database 1510, the example repair bias calculator 1520, the example repair effectiveness calculator 1522 and/or the example priority estimator 1524 is/are hereby expressly defined to include a tangible computer readable storage device or storage disk such as a memory, a digital versatile disk (DVD), a compact disk (CD), a Blu-ray disk, etc. storing the software and/or firmware. Further still, the example results prioritizer 306 of FIGS. 3 and 15 may include one or more elements, processes and/or devices in addition to, or instead of, those illustrated in FIG. 15, and/or may include more than one of any or all of the illustrated elements, processes and devices.

Figure 16:
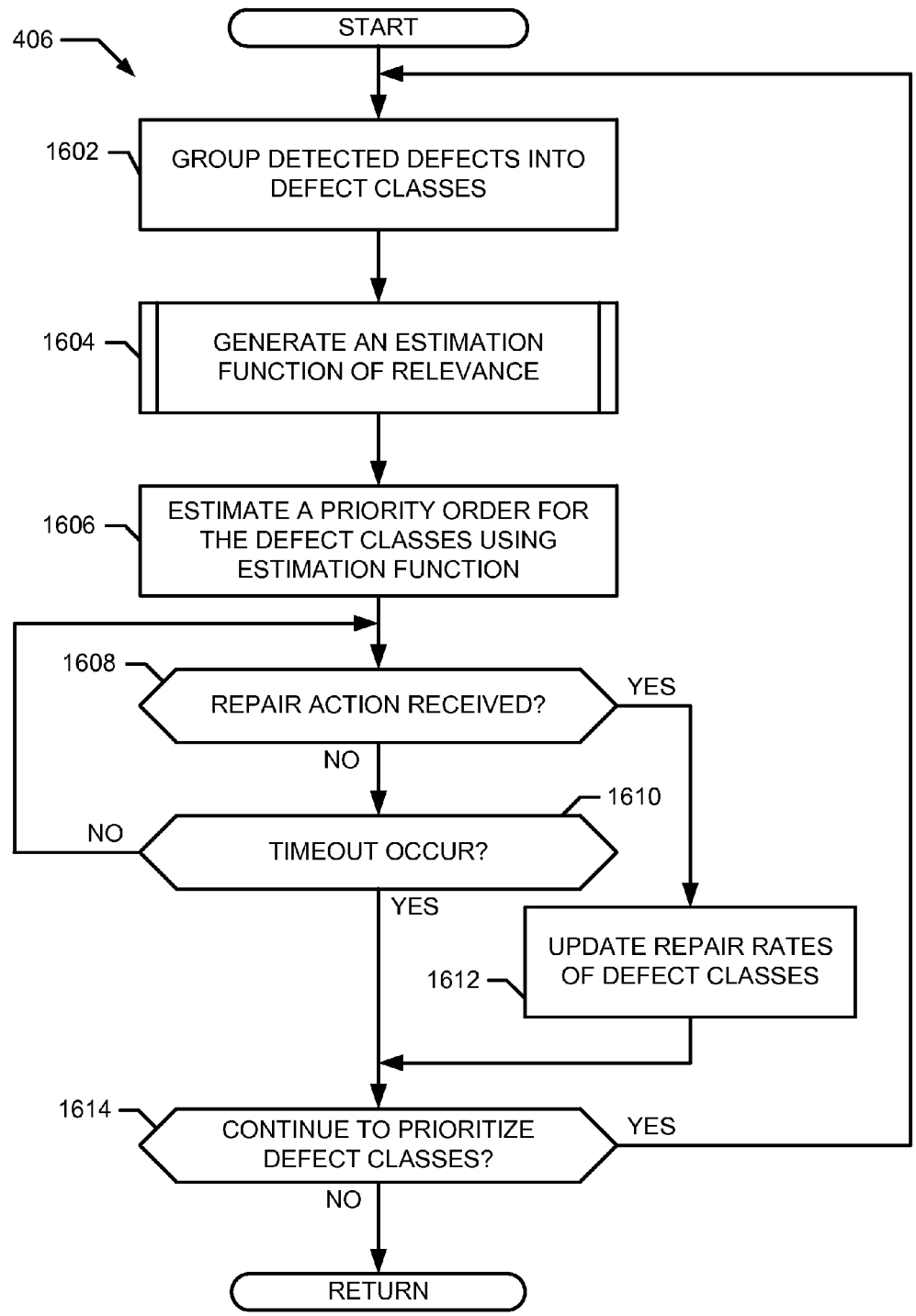
FIGS. 16 and 17 are flow charts representative of example machine-readable instructions that may be executed to identify priorities of assessment results of policy compliance of computing resources in a virtual computing environment.
Figure 17:
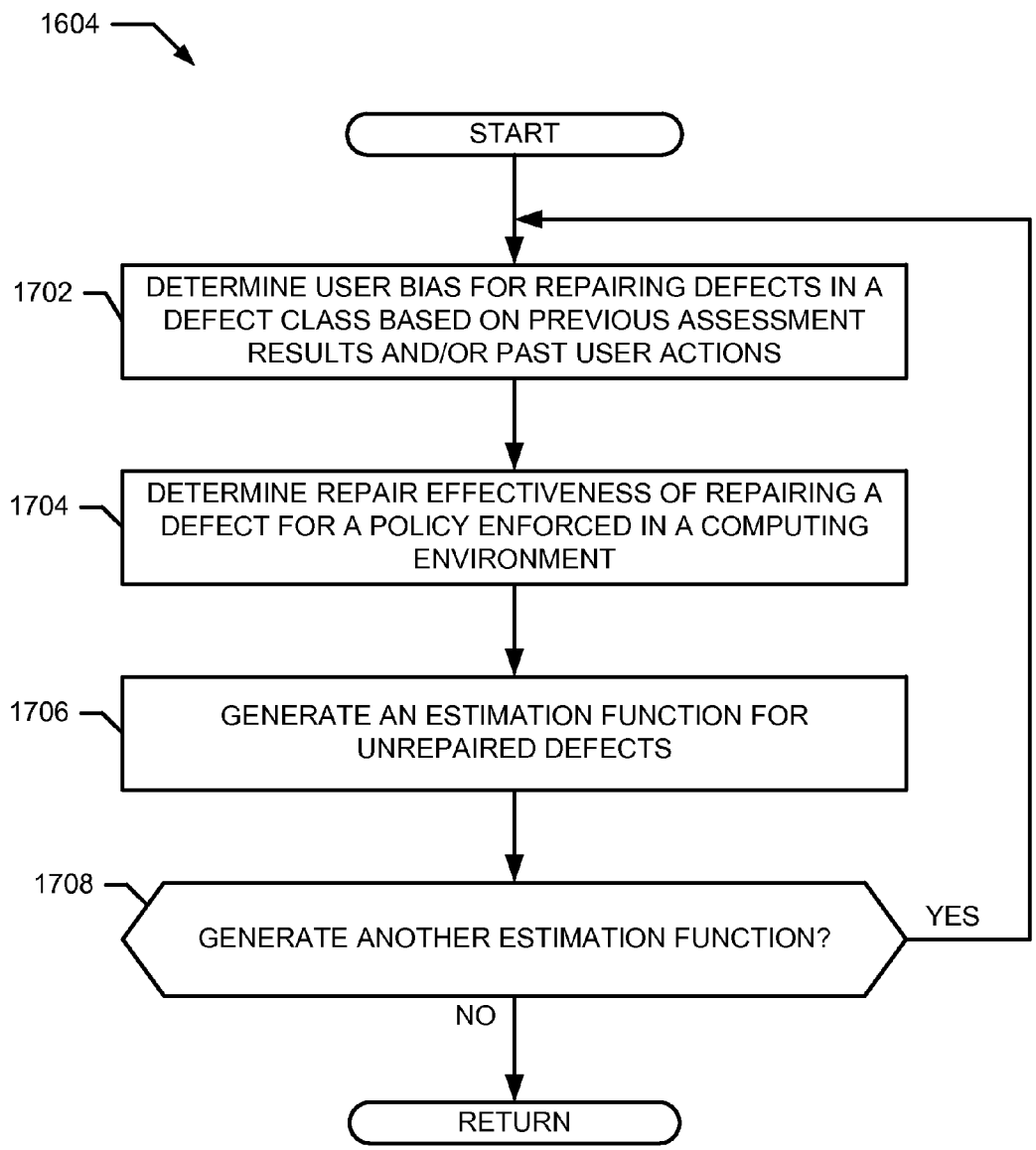

Flowcharts representative of example machine-readable instructions for implementing the results prioritizer 306 of FIGS. 3 and 15 are shown in FIGS. 16 and 17. In this example, the machine-readable instructions comprise a program for execution by a processor such as the processor 2412 shown in the example processor platform 2400 discussed below in connection with FIG. 24. The programs may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowcharts illustrated in FIGS. 16 and/or 17, many other methods of implementing the example results prioritizer 306 may alternatively be used. For example, the order of execution of the blocks may be changed, and/or some of the blocks described may be changed, eliminated, or combined. Although the operations in the flow diagrams of FIGS. 16 and 17 are shown in seriatim, the examples of FIGS. 16 and 17 may additionally or alternatively be implemented so that one or more of the operations are performed in parallel with one or more other ones of the operations.

The example method of FIG. 16 begins at block 1602 when the example results grouper 1502 (FIG. 15) groups defects into defect classes. In the illustrated examples, the results grouper 1502 groups the defects into defect classes based on a same asset class and a same repair action. For example, the results grouper 1502 may determine an asset class for a defect based on a non-compliant computing resource, and the results grouper 1502 may use the example repairs map 1506 (FIG. 15) to determine a repair action for the defect. In some such examples, the defect classes may be determined by the different combinations of asset classes and repair actions associated with the defects.

At block 1604, the example priority estimator 1524 (FIG. 15) generates an estimation function of relevance (e.g., the next rate of repair) for the defect classes. In the illustrated example, the priority estimator 1524 determines the estimation function of relevance based on historical data including previous assessment results and/or past repair actions. An example method that may be used to implement block 1604 is described below in connection with FIG. 17. For example, the priority estimator 1524 may use Equation 34, as discussed above in connection with FIG. 15, to generate the estimation function.

At block 1606, the priority estimator 1524 estimates a priority order for the defect classes using the estimation function. For example, the priority estimator 1524 may estimate a priority order for each of the defect classes listed in a backlog of unrepaired defects. The priority estimator 1524 may then use Equation 35, as discussed above in connection with FIG. 15, to estimate a priority order for the defect classes with unrepaired defects and then determine a priority order for the defect classes based on their estimated priority order.

At block 1608, the example results prioritizer 306 (FIGS. 3 and 15) determines whether a repair action is received. For example, the results prioritizer 306 may pause prioritizing defect classes until an action is taken against the ordered defect class. For example, the results prioritizer 306 may check whether a response to the estimated priority order is received from a user. If no repair action is received at block 1608, then, at block 1610, the results prioritizer 306 determines whether a timeout occurs. If no timeout occurs at block 1610, then control returns to block 1608 to determine whether a repair action is received. Otherwise, if a timeout does occur at block 1610, then control proceeds to block 1614 to determine whether to continue prioritizing defect classes.

Returning back to block 1608, if the results prioritizer 306 determines that a repair action was received, then, at block 1612, the results prioritizer 306 updates the repair rates of defect classes. For example, the results prioritizer 306 may update the repair rates of the defect classes stored in the past repair actions database 1508 (FIG. 15) based on the repair action(s) taken at block 1608. Control then proceeds to block 1614 to determine whether to continue prioritizing defect classes.

At block 1614, the example results prioritizer 306 determines whether to continue prioritizing defect classes. For example, a process or application using the results prioritizer 306 may be stopped or power may be removed from the results prioritizer 306 (e.g., through a system shutdown event). If the results prioritizer 306 determines to stop prioritizing defect classes, the example process of FIG. 16 ends. Otherwise, control returns to block 1602 to group defects into defect classes.

The example method of FIG. 17 may be used to generate an estimation function of relevance based on historical data. The example method of FIG. 17 may be used to implement block 1604 of FIG. 16. Initially, at block 1702, the example repair bias calculator 1520 (FIG. 15) determines a repair rate for repairing defects in a defect class based on previous assessment results and/or past repair actions. For example, the repair bias calculator 1520 may use Equation 28, as discussed above in connection with FIG. 15, to calculate a change in the fraction of computing resources affected by defects in a defect class ($D_j$) at a time (t). The example repair bias calculator 1520 may then use Equation 29, as discussed above in connection with FIG. 15, to calculate an average rate of repair ($y_j$) at which defects in a defect class ($D_j$) are repaired based on the sum of the change in the number of computing resources affected by the defect class ($D_j$) over the number of cycles (n).

At block 1704, the example repair effectiveness calculator 1522 (FIG. 15) determines repair effectiveness of repairing a defect for a policy enforced in a computing environment. For example, the repair effectiveness calculator 1522 may use Equation 30, as discussed above in connection with FIG. 15, to calculate a change in compliance score given the extent of the defect class at a first time and at a second time. The example repair effectiveness calculator 1522 may then use Equation 31, as discussed above in connection with FIG. 15, to calculate a repair effectiveness ($b_{j,i}$) (e.g., an average change in compliance score) for each policy enforced in the computing environment resulting from repairs to defects in a defect class ($D_j$).

At block 1706, the example priority estimator 1524 generates an estimation function for unrepaired defects. An example technique of generating the estimation function includes training a learning algorithm (e.g., machine-learning algorithm) based on repair rates (e.g., the repair rates determined at block 1702) and repair effectiveness (e.g., the repair effectiveness determined at block 1704). For example, the priority estimator 1524 may use Equations 32 and 33, as discussed above in connection with FIG. 15, to build a training set including the repair rates from the example repair bias calculator 1520 and the repair effectiveness from the repair effectiveness calculator 1522. In some examples, the priority estimator 1524 may then use Equation 34, as discussed above in connection with FIG. 15, to generate an estimation function for the unrepaired defects based on the output of the training algorithm (e.g., a support vector regression (SVR) algorithm).

At block 1708, the example priority estimator 1524 determines whether to generate another estimation function. For example, the priority estimator 1524 may receive notification that the example past repair actions database 1508 (FIG. 15) was updated with additional past repair actions. If the priority estimator 1524 determines there is another estimation function to generate, for example, based on the additional past repair actions, control returns to block 1702. Otherwise, if, at block 1708, the priority estimator 1524 determines not to generate another estimation function, control then returns to a calling function or process such as the example program of FIG. 16, and the example process of FIG. 17 ends.

IV. Reporting Results

The example reporter 318 of FIG. 3 may retrieve user information stored in the example compliance database 308 (FIG. 3) to generate reports for a user (e.g., a system administrator). Reports may be helpful in determining the compliance posture of a computing resource and/or the virtual computing environment 100 (FIG. 1). The example reporter 318 of FIG. 3 generates different reports based on different user selections. For example, the reporter 318 may retrieve assessment results stored in the results database 312 (FIG. 3) and generate a report identifying the assessment results for one or more of computing resource(s) (e.g., assets), a policy (or policies), the virtual computing environment 100, etc. In some examples, the reporter 318 retrieves compliance scores from the scores database 314 (FIG. 3) and generates a report identifying the compliance scores for one or more of a computing resource(s), a policy (or policies), a range of time, a set of designated times, the virtual computing environment 100, etc. In some other examples, the reporter 318 retrieves rankings from the priority order database 316 (FIG. 3) and generates a report identifying the ranked order of the assessment results.

Figure 18:
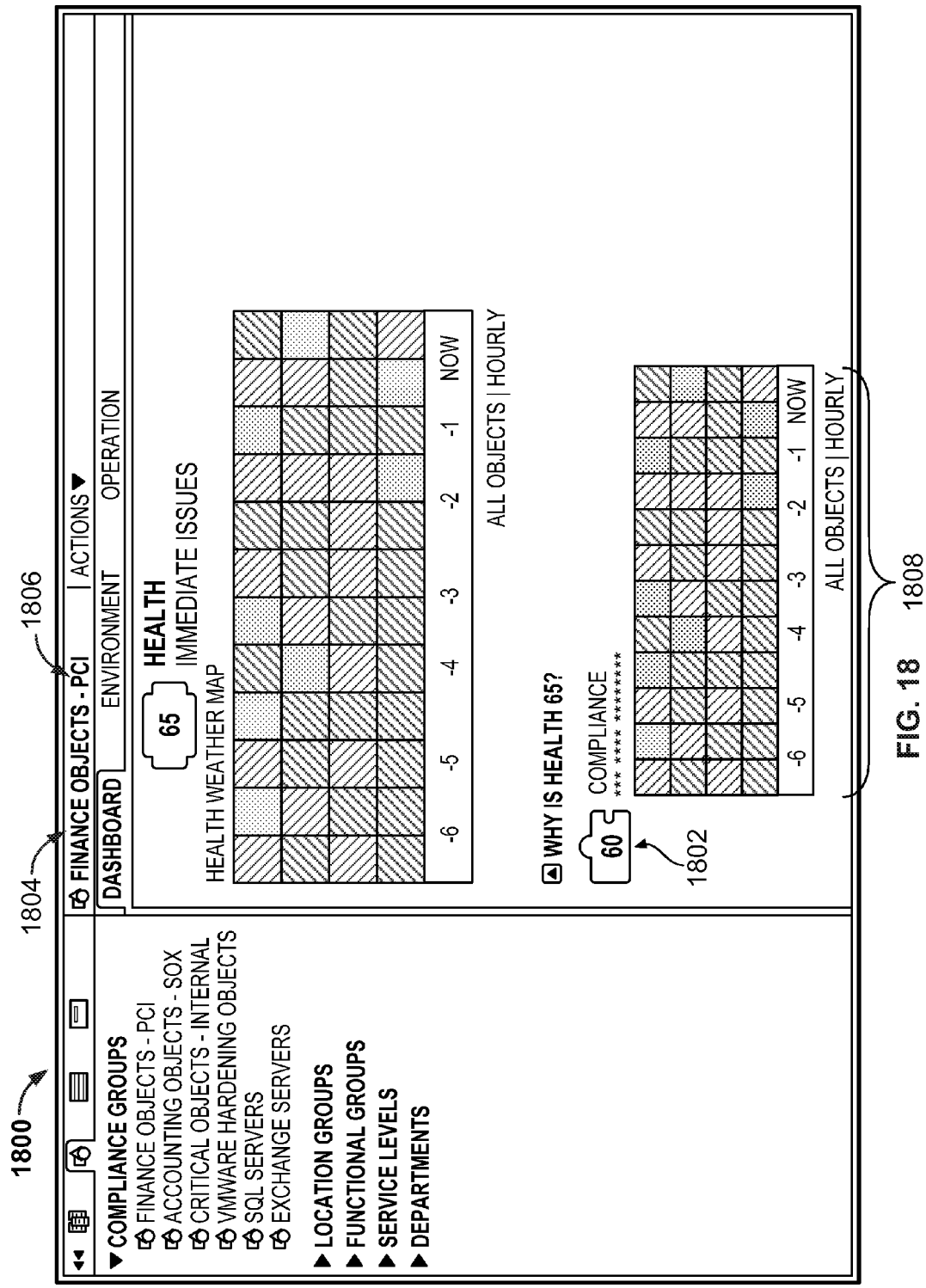
FIGS. 18-23 illustrate example graphical user interfaces generated by the example reporter of FIG. 3 to generate reports for a user.

FIGS. 18-23 illustrate example interfaces generated by the example reporter 318. FIG. 18 illustrates an example interface 1800 displaying a real-time compliance summary for a computing environment (e.g., the example virtual computing environment 100). The example interface 1800 displays a compliance score 1802, a finance group identifier 1804, a policy identifier 1806, and a compliance timeline 1808. The example reporter 318 may retrieve the compliance score 1802 from the example scores database 314. The example reporter 318 may retrieve the group identifier 1804 from the example core services controller 216 (FIG. 2) (e.g., via a resources and virtual machine inventory management application). In the illustrated example, the group identifier 1804 corresponds to a group of computing resources associated with a finance department. The example reporter 318 may retrieve a policy enforced in the finance group of computing resources from the example policy database 310 (FIG. 3) and display the policy identifier 1806 corresponding to the retrieved policy. The example reporter 318 may retrieve previous compliance scores for the finance group of computing resources to generate the compliance timeline 1808.

Figure 19:
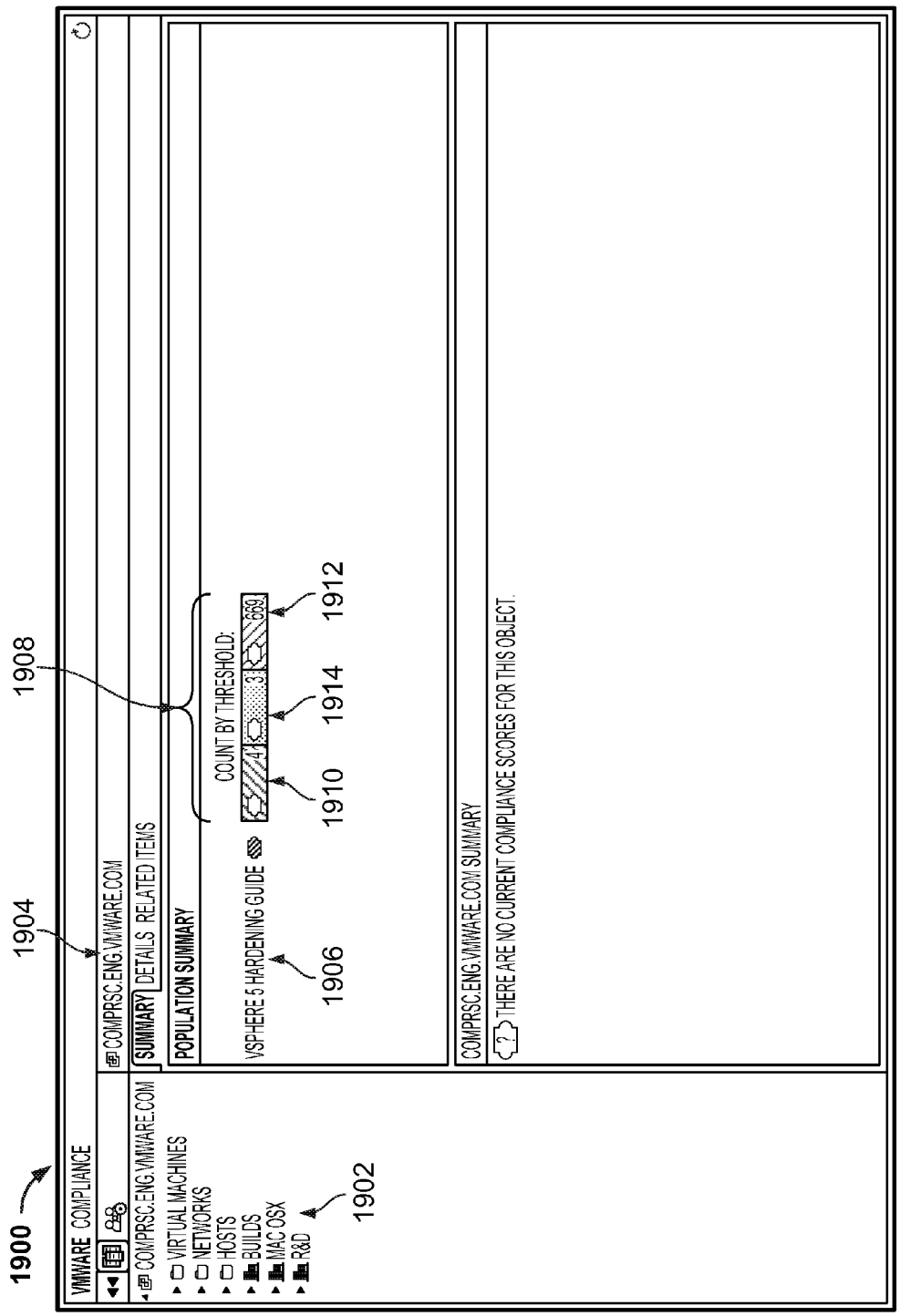

FIG. 19 illustrates an example interface 1900 displaying a compliance summary of a computing resource's compliance with a policy. The example reporter 318 may retrieve an inventory list 1902 from the example compliance database 308 (FIG. 3) to display to a user. In the illustrated example, a computing resource or resource group 1904 (CompRsc.eng.vmware.com) from the inventory list 1902 is selected, and the policy 1906 (e.g., the vSphere 5 Hardening Guide) is enforced on the computing resource 1904. In the illustrated example, the population summary 1908 corresponds to the group of computing resources included in the selected computing resource 1904. Thus, the reporter 318 may retrieve assessment results from the example results database 312 (FIG. 3) that are related to or under control of the selected computing resource 1904. In the illustrated example of FIG. 19, the population summary 1908 provides the number of compliance successes 1910 (e.g., four), the number of compliance critical-failures 1912 (e.g., 669), and the number of compliance warnings 1914 (e.g., three). In some examples, a compliance critical-failure 1912 may indicate that a computing resource is out-of-compliance with a critical rule. For example, a compliance critical-failure may be indicative of a security vulnerability with the selected computing resource. In some examples, a compliance warning 1914 may be indicative of a computing resource that is out-of-compliance with a non-critical rule (or non-essential rule).

In some examples, the compliance status (e.g., the compliance success, the compliance critical-failure and/or the compliance warning) may correspond to compliance score threshold percentages for the computing resource. For example, a compliance score between 90% and 100% may correspond to a compliance success, a compliance score between 70% and 89% may correspond to a compliance warning, and a compliance score between 0% and 69% (or less than 70%) may correspond to a compliance critical-failure. Thus, in some examples, the number of compliance successes 1910, the number of compliance critical-failures 1912, and the number of compliance warnings 1914 correspond to the number of computing resources within the group of computing resources included in the selected computing resource 1904 in which the compliance score was within one of the compliance score threshold percentages. In some other examples, the number of compliance successes 1910, the number of compliance critical failures 1912, and the number of compliance warnings 1914 may correspond to the compliance score of one computing resource assessed at different times ($\{t_1, \ldots t_m\}$). In some other examples, the number of compliance successes 1910, the number of compliance critical failures 1912, and the number of compliance warnings 1914 may correspond to the compliance score of one computing resource assessed over a period of time $[t_1, t_m]$. In some other examples, the number of compliance successes 1910, the number of compliance critical-failures 1912, and the number of compliance warnings 1914 may correspond to the compliance score of the different rules that are imposed on the selected computing resource 1904. In some examples, the threshold percentages may be modified by a user.

Figure 20:
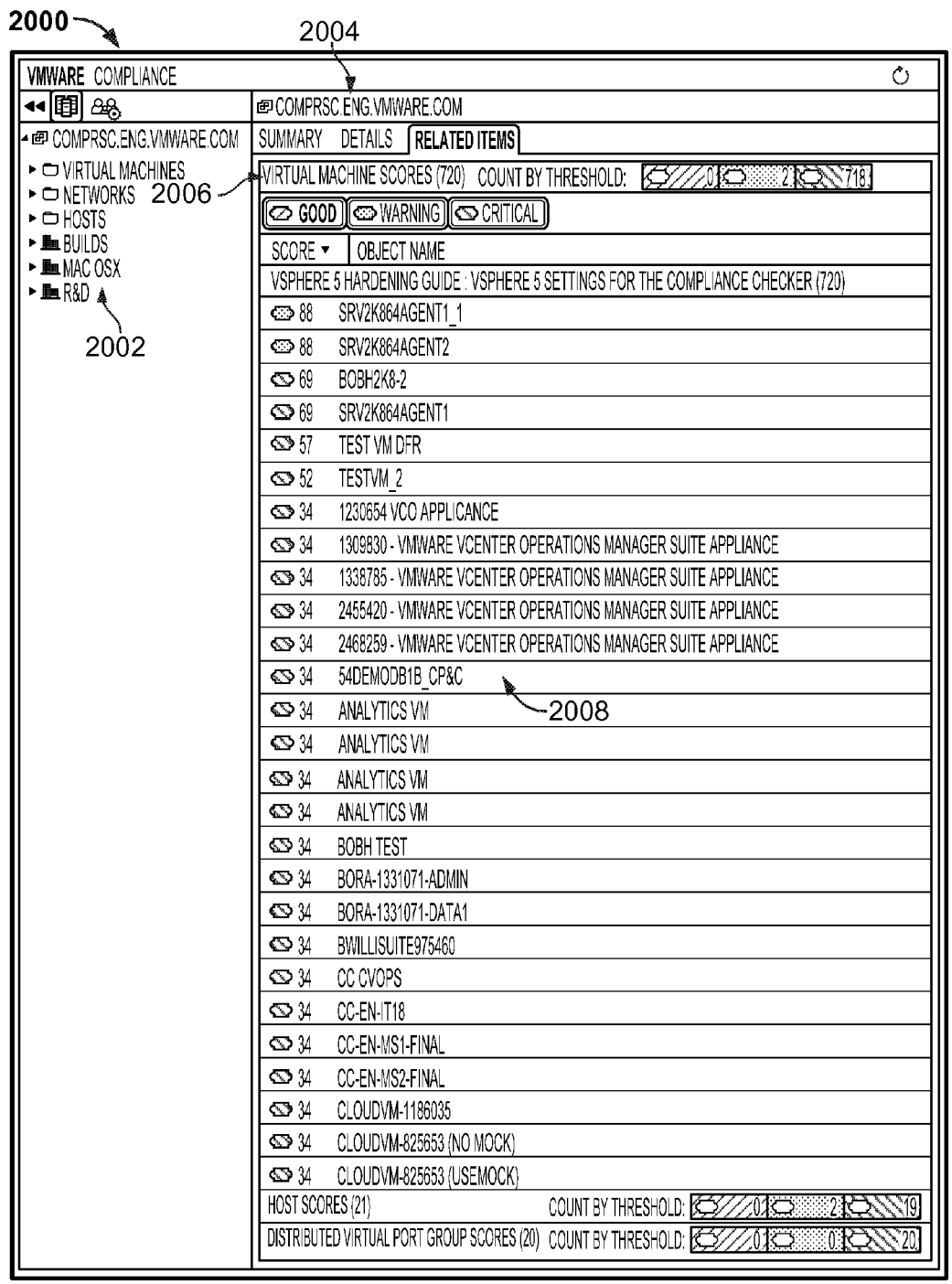

FIG. 20 illustrates an example interface 2000 displaying a compliance summary for computing resources related to a selected computing resource. The example interface 2000 includes the inventory list 2002 and identifies the selected computing resource 2004 (CompRsc.eng.vmware.com). In the illustrated example, the reporter 318 (FIG. 3) retrieves assessment results from the example results database 312 (FIG. 3) and/or compliance scores from the example scores database 314 (FIG. 3) that are related to the selected computing resource 2004. The example interface 2000 displays the compliance scores for a group of virtual machines 2006 included in the selected computing resource 2004. An example list of virtual machines 2006 and the corresponding compliance scores is displayed in the interface panel 2008.

Figure 21:
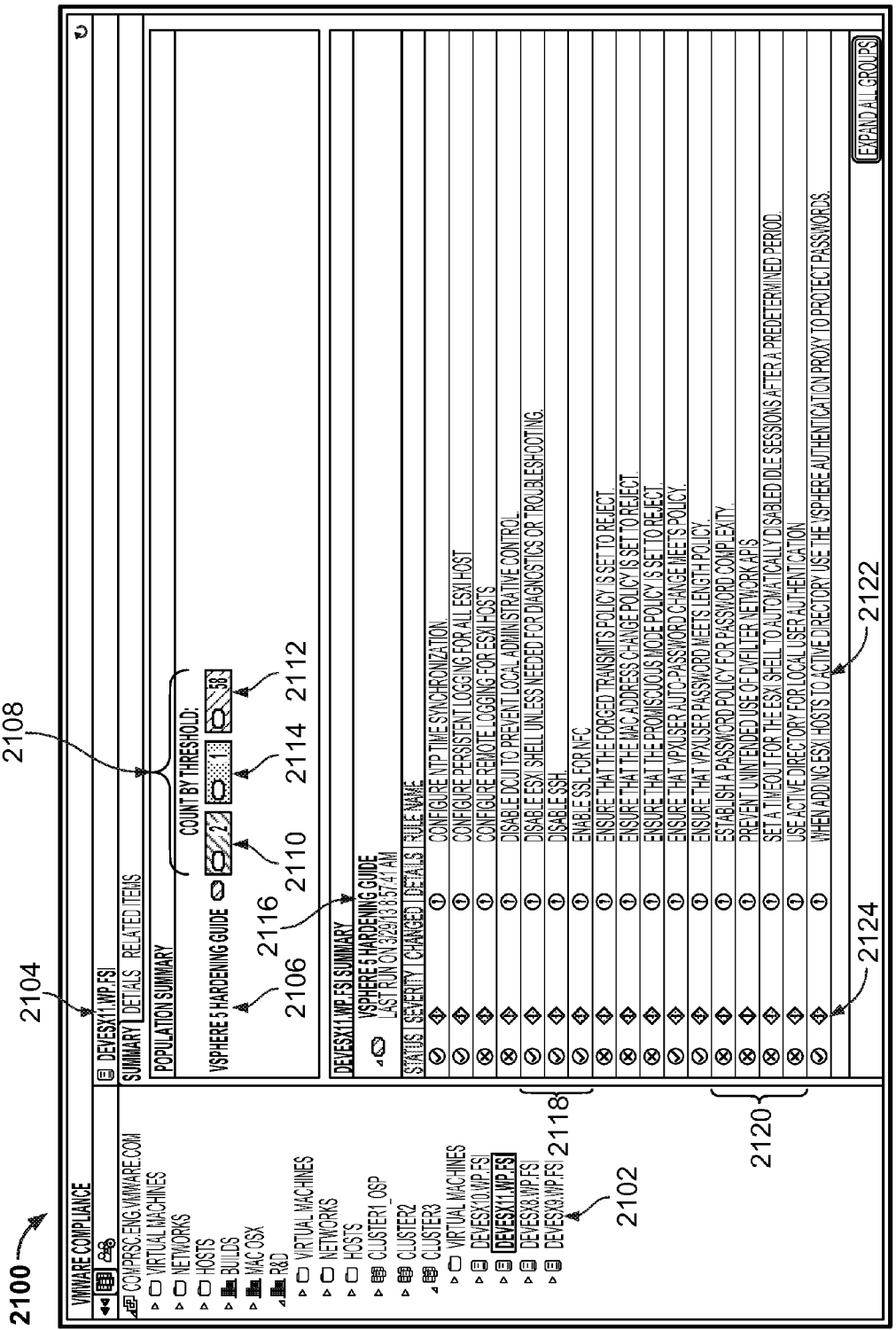

FIG. 21 illustrates an example interface 2100 displaying a combined population compliance summary for a group of computing resources related to a selected computing resource and a compliance summary for the selected computing resource. The example interface 2100 of FIG. 21 includes an inventory list 2102, the selected computing resource 2104 (CompRsc.eng.vmware.com), and the policy 2106 (e.g., the vSphere 5 Hardening Guide) that is enforced on the computing resource 2104. The example interface 2100 also includes the population summary 2108 corresponding to the group of computing resources included in the selected computing resource 2104 and the corresponding number of compliance successes 2110 (e.g., two), number of compliance critical-failures 2112 (e.g., 58), and number of compliance warnings 2114 (e.g., one). The example interface 2100 also includes interface panel 2116 to display a compliance summary for the selected computing resource 2104. In the illustrated example of FIG. 21, the interface panel 2116 includes indicators for compliance successes 2118 and for compliance failures 2120 for corresponding ones of the rules 2122. The example interface panel 2116 also includes a severity indicator 2124 to indicate the level of severity (e.g., a compliance critical-failure 1912 (FIG. 19), and/or a compliance warning 1914 (FIG. 19), etc.) when the selected computing resource 2104 is out-of-compliance with one of the rules 2122.

Figure 22:
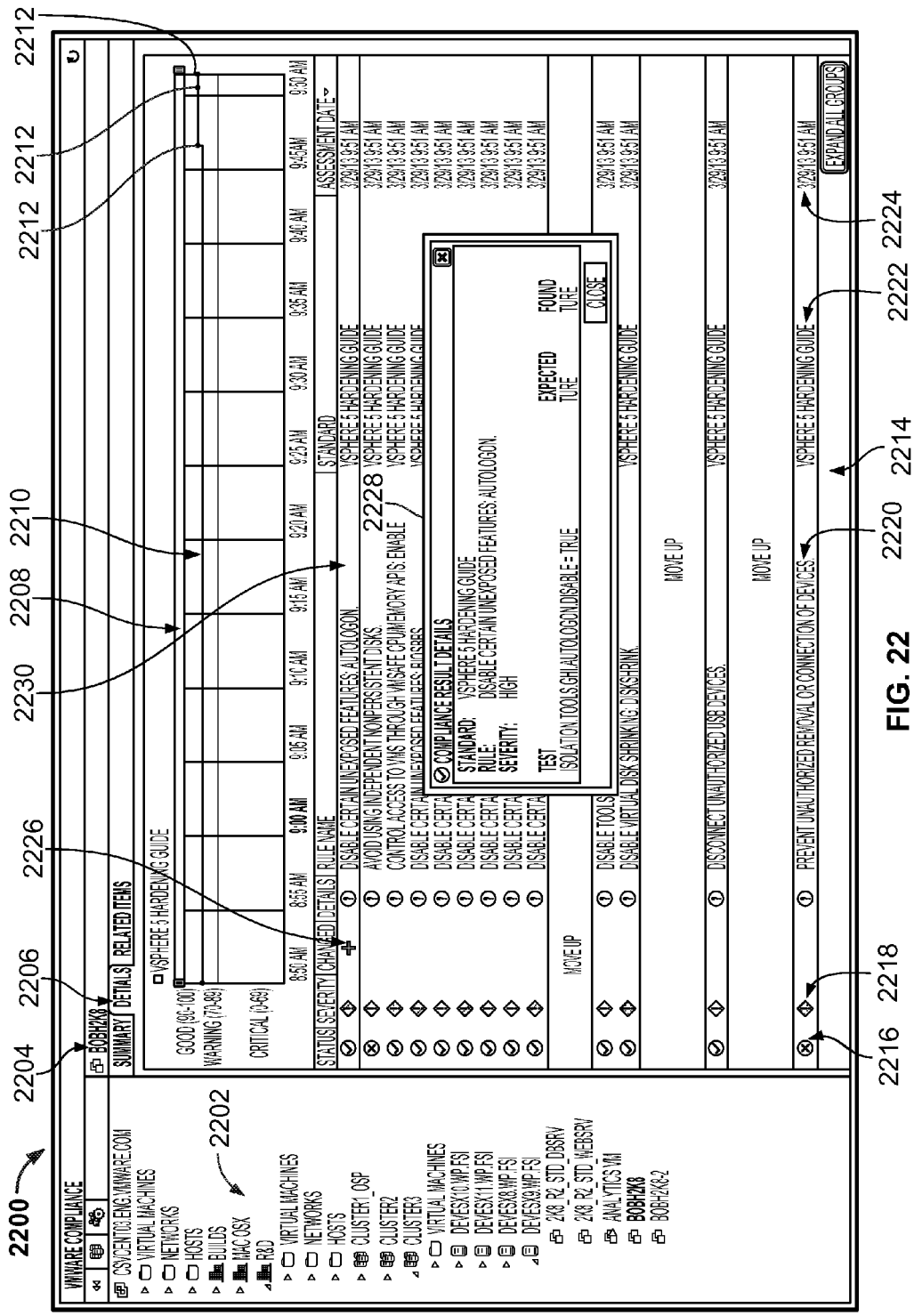

FIG. 22 illustrates an example interface 2200 displaying detailed compliance information for a selected computing resource. The example interface 2200 displays an inventory list 2202, the selected computing resource 2204 (BobH2k8), and a "Details" tab 2206 that is selected. The example interface 2200 also includes a detailed compliance timeline 2208. To generate the detailed compliance timeline 2208, the reporter 318 (FIG. 3) may retrieve compliance scores from the example scores database 314 (FIG. 3). As discussed in greater detail above in connection with the example compliance assessor 302 and the example compliance measurer 304 (FIG. 3), the compliance assessor 302 performs compliance assessments when an event (e.g., a configuration change) is detected (e.g., the compliance assessor 302 is event-driven), and the compliance measurer 304 calculates compliance scores when an assessment result changes. Thus, the compliance scores may be displayed in the detailed compliance timeline 2208 as a trace 2210 (e.g., a stream of continuous compliance measurements). In the illustrated example, the trace 2210 is representative of the compliance score of the selected computing resource 2204 over time. In addition, marks 2212 located on the trace 2210 are indicative of when compliance measurements were performed.

The example interface 2200 also includes example interface panel 2214 to display historical compliance measurements in a list. Accordingly, the example interface panel 2214 includes compliance state (or status) indicators 2216 and severity indicators 2218 for the corresponding rules 2220. The example interface panel 2214 also includes the policy 2222 (sometimes referred to as "standard") to which each of the rules 2220 correspond and a timestamp 2224 indicative of when the compliance measurement was made. The example interface panel 2214 includes a change indicator 2226 to indicate when a change in compliance for a rule 2220 is measured. In the illustrated example, the rule 2230 is selected and a popup panel 2228 displays detailed information regarding the compliance assessment. In the illustrated example, the reporter 318 retrieves detailed information regarding the rule from the example policy database 310 (FIG. 3) (e.g., the "standard" (e.g., the policy), the "rule," the "severity" level, the check "test" and the "expected value" (e.g., the check state). The example reporter 318 may retrieve the "found" state (e.g., the computing resource state) from the example results database 312 (FIG. 3).

Figure 23:
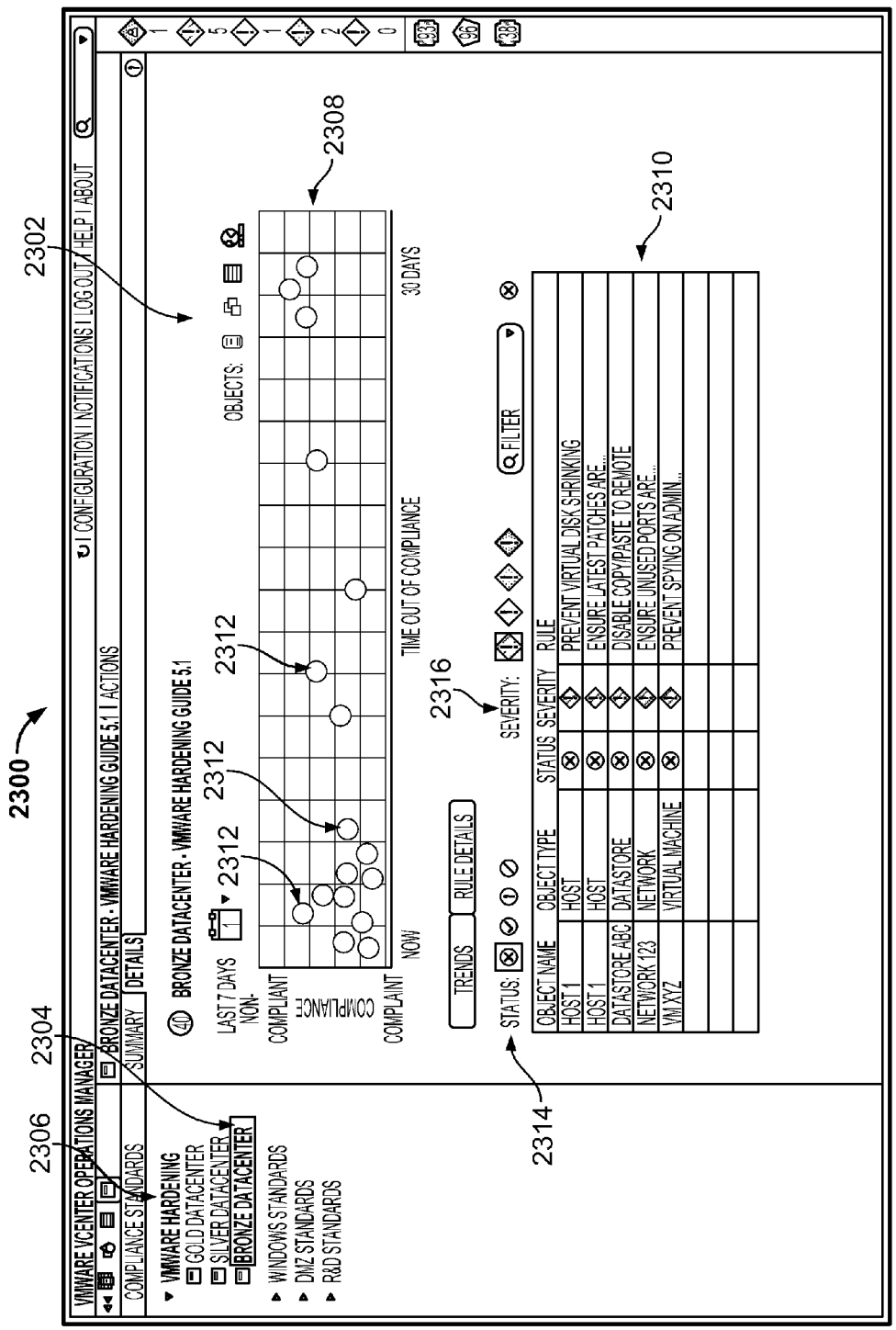

FIG. 23 illustrates an example interface 2300 to display assessment results for a policy. For example, the reporter 318 (FIG. 3) may retrieve assessment results from the example results database 312 (FIG. 3). In the illustrated example, the interface 2300 includes a details panel 2302 providing assessment results for compliance of the computing resource 2304 (e.g., the Bronze Datacenter) with the policy 2306 (e.g., the VM Hardening Guide 5.1). The example details panel 2302 includes a timeline 2308 and a results list 2310. In the illustrated example, the example timeline 2308 projects compliance measurements 2312 over a thirty day period. For example, the reporter 318 may process compliance scores retrieved from the example scores database 314 (FIG. 3) and/or the example score comparator 920 (FIG. 9) to identify trends in compliance measurements. The example reporter 318 may then predict compliance measurements 2312 over a time period of interest. In the illustrated example of FIG. 23, the results list 2310 is a filtered list of assessment results. For example, the results list 2310 only includes assessment results indicative of compliance failures 2314 for rules with a critical severity level 2316. Thus, the example results list 2310 may display a combination of assessment results corresponding to a compliance state 2314 that is selected (e.g., compliance failures, compliance successes, compliance unknown, and/or compliance inapplicable) and a rule severity level (e.g., critical, non-critical, etc.).

As mentioned above, the example processes of FIGS. 4, 6, 7, 10-14, 16 and 17 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine-readable storage medium" are used interchangeably. Additionally or alternatively, the example processes of FIGS. 4, 6, 7, 10-14, 16 and 17 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 24:
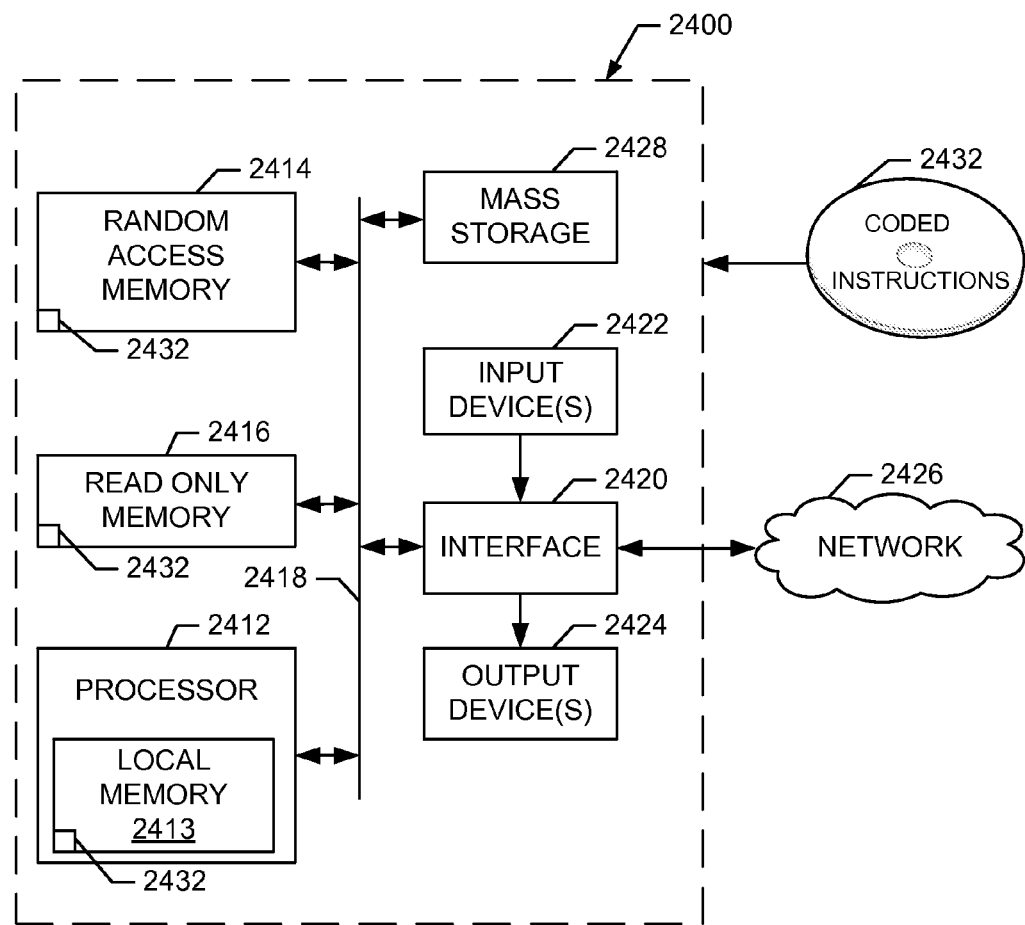
FIG. 24 is a block diagram of an example processing platform capable of executing the example machine-readable instructions of FIGS. 4, 6, 7, 10-14, 16 and 17 to implement the example compliance monitor of FIGS. 2 and/or 3, the example compliance assessor of FIGS. 3 and/or 5, the example compliance measurer of FIGS. 3 and/or 9, and/or the example results prioritizer of FIGS. 3 and/or 15, respectively.

FIG. 24 is a block diagram of an example processor platform 2400 capable of executing the instructions to implement the compliance monitor 218 of FIGS. 2 and/or 3, the compliance assessor 302 of FIGS. 3 and/or 5, the compliance measurer 304 of FIGS. 3 and/or 9, and/or the results prioritizer 306 of FIGS. 3 and/or 15. The processor platform 2400 can be, for example, a server or any other type of computing device.

The processor platform 2400 of the illustrated example includes a processor 2412. The processor 2412 of the illustrated example is hardware (e.g., a semi-conductor based logic circuit). For example, the processor 2412 can be implemented by one or more integrated circuits, logic circuits, microprocessors or controllers from any desired family or manufacturer.

The processor 2412 of the illustrated example includes a local memory 2413 (e.g., a cache). The processor 2412 of the illustrated example is in communication with a main memory including a volatile memory 2414 and a non-volatile memory 2416 via a bus 2418. The volatile memory 2414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2416 may be implemented by flash memory and/or any other desired type of memory device. Access to the main memory 2414, 2416 is controlled by a memory controller.

The processor platform 2400 of the illustrated example also includes an interface circuit 2420. The interface circuit 2420 may be implemented by any type of interface standard, such as an Ethernet interface, a universal serial bus (USB), and/or a PCI express interface.

In the illustrated example, one or more input devices 2422 are connected to the interface circuit 2420. The input device(s) 2422 permit(s) a user to enter data and commands into the processor 2412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2424 are also connected to the interface circuit 2420 of the illustrated example. The output devices 2424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2420 of the illustrated example, thus, typically includes a graphics driver card, a graphics driver chip or a graphics driver processor.

The interface circuit 2420 of the illustrated example also includes a communication device such as a transmitter, a receiver, a transceiver, a modem and/or network interface card to facilitate exchange of data with external machines (e.g., computing devices of any kind) via a network 2426 (e.g., an Ethernet connection, a digital subscriber line (DSL), a telephone line, coaxial cable, a cellular telephone system, etc.).

The processor platform 2400 of the illustrated example also includes one or more mass storage devices 2428 for storing software and/or data. Examples of such mass storage devices 2428 include floppy disk drives, hard drive disks, compact disk drives, Blu-ray disk drives, RAID systems, and digital versatile disk (DVD) drives.

The coded instructions 2432 of FIGS. 4, 6, 7, 10-14, 16 and/or 17 may be stored in the mass storage device 2428, in the volatile memory 2414, in the non-volatile memory 2416, and/or on a removable tangible computer readable storage medium such as a CD or DVD.

From the foregoing, it will be appreciated that above disclosed methods, apparatus and articles of manufacture enable calculating compliance scores of computing resources in a computing environment based on assessment results to measure adherence of the computing resources to a policy.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to measure compliance of policies to be enforced in a computing environment, the method comprising:
   determining, with a processor, a maximum surprisal value of a policy to be enforced on a computing resource in the computing environment, the policy defining a state associated with a compliance position for the computing resource, the maximum surprisal value (1) corresponding to a probability of the computing resource being in-compliance with the policy based on conditions of the policy and (2) determined without testing the computing resource with respect to the policy;
   determining, with the processor, a current surprisal value of the computing resource with respect to the policy based on knowledge of at least one condition of the policy being at least one of satisfied by or inapplicable to the computing resource, the determining of the current surprisal value based on surprisal analysis techniques;
   determining a compliance score of the computing resource with respect to the policy based on the maximum surprisal value of the policy and the current surprisal value of the computing resource with respect to the policy;
   identifying a priority for determining when to perform a repair action to correct a defect associated with the computing resource based on the compliance score, the priority associated with a repair action to correct the defect; and
   performing the repair action at a scheduled time, the scheduled time based on the compliance score.

2. A method as defined in claim 1, wherein the determining of the current surprisal value of the computing resource with respect to the policy further includes determining compliance of the computing resource with respect to the policy based on a current state of the computing resource identifying conditions of the policy that are currently satisfied.

3. A method as defined in claim 1, wherein the determining of the compliance score of the computing resource to the policy based on the maximum surprisal value of the policy and the current surprisal value of the computing resource with respect to the policy further includes determining a ratio between (a) a difference between the maximum surprisal value of the policy and the current surprisal value of the computing resource with respect to the policy and (b) the maximum surprisal value of the policy.

4. A method as defined in claim 1, further including determining a compliance status of the computing resource with respect to the policy based on a threshold percentage of the compliance score.

5. A method as defined in claim 1, wherein the policy conditions defined by the policy include a Boolean-valued function.

6. A method as defined in claim 1, wherein the determining of the compliance score further includes:
   adjusting the current surprisal value of the computing resource in response to determining a second condition of the policy is satisfied by the computing resource; and
   updating the compliance score for the computing resource based on the adjusted current surprisal value and the maximum surprisal value of the policy.

7. A method as defined in claim 6, wherein the current surprisal value is updated in response to a change in a state of the computing resource.

8. A method as defined in claim 1, wherein the policy is a first policy, the compliance score is a first compliance score, the maximum surprisal value is a first maximum surprisal value, the current surprisal value is a first current surprisal value, and further including:
   determining a policy-aggregated compliance score representing compliance of the computing resource with respect to the first policy and a second policy, the policy-aggregated compliance score including a mathematical combination of the first compliance score and a second compliance score of the computing resource, the second compliance score based on a ratio between (a) a difference between a second maximum surprisal value for the second policy and a second current surprisal value of the computing resource with respect to the second policy and (b) the second maximum surprisal value of the second policy.

9. A method as defined in claim 8, wherein the mathematical combination further includes determining a ratio between (a) a conjunction of the first current surprisal value and the second current surprisal value and (b) a conjunction of the first maximum surprisal value of the first policy and the second maximum surprisal value of the second policy.

10. A method as defined in claim 8, wherein the mathematical combination further includes determining a ratio between (a) a summation of the first current surprisal value and the second current surprisal value and (b) a summation of the first maximum surprisal value of the first policy and the second maximum surprisal value of the second policy.

11. A method as defined in claim 8, further including determining, with the processor, the second current surprisal value of the computing resource with respect to the second policy based on knowledge of at least one condition of the second policy being at least one of satisfied by or inapplicable to the computing resource.

12. A method as defined in claim 1, wherein the policy is a first policy, the computing resource is a first computing resource, the compliance score is a first compliance score, the maximum surprisal value is a first maximum surprisal value, the current surprisal value is a first current surprisal value, the first compliance score of the first computing resource with respect to the first policy is determined at a first time, and further including:
   determining a temporally-aggregated compliance score representing compliance of the first computing resource with respect to the first policy at the first time and at a second time, the temporally-aggregated compliance score of the first computing resource including a mathematical combination of the first compliance score determined at the first time and a second compliance score of the computing resource determined at the second time, the second compliance score determined at the second time based on a ratio between (a) a difference between the first maximum surprisal value of the first policy and a second current surprisal value of the computing resource with respect to the policy determined at the second time and (b) the first maximum surprisal value of the first policy.

13. A method as defined in claim 12, wherein the mathematical combination includes averaging the first compliance score and the second compliance score.

14. A method as defined in claim 12, wherein the mathematical combination includes averaging respective computing scores of the first computing resource over an interval between the first time and the second time.

15. A method as defined in claim 1, wherein the policy is a first policy, the computing resource is a first computing resource, the compliance score is a first compliance score, the maximum surprisal value is a first maximum surprisal value, the current surprisal value is a first current surprisal value, and further including:

determining a group-aggregated compliance score representing compliance of the first computing resource and a second computing resource with respect to the first policy, the group-aggregated compliance score including a mathematical combination of the first compliance score of the first computing resource and a second compliance score of the second computing resource, the second compliance score based on a ratio between (a) a difference between the first maximum surprisal value for the first policy and a second current surprisal value of the second computing resource with respect to the first policy and (b) the first maximum surprisal value of the first policy.

16. A method as defined in claim 1, wherein the compliance score is a first compliance score, the computing resource is a first computing resource, the policy is a first policy, the maximum surprisal value is a first maximum surprisal value, the current surprisal value is a first current surprisal value, and further including:

determining a temporally-aggregated compliance score representing compliance of the first computing resource with respect to the first policy determined at a first time and a second compliance score of the first computing resource with respect to the first policy determined at a second time, the temporally-aggregated compliance score of the first computing resource including a first mathematical combination of the first compliance score and the second compliance score;

determining a group-aggregated compliance score representing compliance of the first computing resource and a second computing resource with respect to the first policy, the group-aggregated compliance score including a second mathematical combination of the first compliance score of the first computing resource and a third compliance score of the second computing resource with respect to the first policy;

determining a policy-aggregated compliance score representing compliance of the first computing resource with respect to the first policy and a second policy, the policy-aggregated compliance score including a third mathematical combination of the first compliance score with respect to the first policy and a fourth compliance score of the computing resource with respect to the second policy; and determining a combined compliance score representing compliance of the first computing resource and the second computing resource with respect to the first policy and the second policy over the first time and the second time, the combined compliance score including a fourth mathematical combination of the temporally-aggregated compliance score, the group-aggregated compliance and the policy-aggregated compliance score.

17. A method to measure compliance of a computing resource with policies to be enforced in a computing environment, the method comprising:

determining, by executing an instruction with a processor, a maximum surprisal value of a policy to be enforced on the computing resource, the policy defining a state associated with a compliant position for the computing resource, the maximum surprisal value (1) representing a probability of the computing resource being in-compliance with the policy based on conditions of the policy and (2) determined without knowledge of a current state of the computing resource, the determining of the maximum surprisal value based on surprisal analysis techniques;

repeatedly determining, by executing instructions with the processor, compliance of the computing resource with respect to the policy based on states of the computing resource over time to generate a plurality of surprisal values with respect to the policy over time;

normalizing, by executing an instruction with the processor, the plurality of surprisal values based on the maximum surprisal value;

identifying, by executing an instruction with the processor, a trend of compliance of the computing resource with respect to the policy over time based on the normalized plurality of surprisal values;

identifying a priority for determining, by executing an instruction with the processor, when to perform a repair action to correct a defect associated with the computing resource based on the trend of compliance, the priority associated with a repair action to correct the defect; and performing the repair action at a scheduled time, the scheduled time based on the trend of compliance.

18. An apparatus to measure compliance of a computing resource with respect to policies to be enforced in a computing environment, the apparatus comprising:

a surprisal calculator to determine a first maximum surprisal value of a first policy to be enforced on the computing resource, the first policy defining a first state associated with a first compliant position for the computing resource, the first maximum surprisal value to represent a probability of the computing resource being in-compliance with the first policy based on conditions of the policy and determined without knowledge of a current state of the computing resource, and the surprisal calculator to determine a second maximum surprisal value of a second policy be enforced on the computing resource, the second policy defining a second state associated with a second compliance position for the computing resource, the second maximum surprisal value to represent a probability of the computing resource being in-compliance with the second policy without knowledge of the current state of the computing resource, the surprisal calculator to determine the first maximum surprisal value and the second maximum surprisal value based on surprisal analysis techniques;

an information gain calculator to determine a first information gain value representative of compliance of the computing resource with respect to the first policy, the first information gain value including a difference between the first maximum surprisal value and a first current surprisal value of the computing resources corresponding to a current state of the computing resource with respect to the first policy, the information gain calculator to determine a second information gain value representative of compliance of the computing resource with respect to the second policy, the second information gain value including a difference between the second maximum surprisal value and a second current surprisal value of the computing resources corresponding to a current state of the computing resource with respect to the second policy;

a scorer to normalize the first information gain value based on the first maximum surprisal value, the scorer to normalize the second information gain value based on the second maximum surprisal value;

a policy aggregator to combine the first normalized information gain value and the second normalized information gain value to identify a compliance of the computing resource with respect to the first and second policies; and a priority estimator to identify a repair action priority for a first defect relative to a second defect associated with the computing resource based on the identified compliance.

19. A tangible computer readable storage medium comprising instructions that, when executed, cause a processor to at least:

determine a first maximum surprisal value of a policy to be enforced on a first computing resource and a second computing resource, the policy defining a state associated with a compliant position for the first computing resource and the second computing resource, the first maximum surprisal value representing (1) a probability of at least one of the first and second computing resources being in-compliance with the policy based on conditions of the policy and (2) determined without knowledge of a current state of the at least one of the first and second computing resources, the instructions to cause the processor to determine the first maximum surprisal value based on surprisal analysis techniques;

determine compliance of the first computing resource with respect to the policy based on a current state of the first computing resource and the first maximum surprisal value to generate a first information gain value of the first computing resource with respect to the policy;

normalize the first information gain value based on the first maximum surprisal value to generate a first normalized compliance score;

determine compliance of the second computing resource with respect to the policy based on a current state of the second computing resource and the first maximum surprisal value to generate a second information gain value of the second computing resource with respect to the policy;

normalize the second information gain value based on the first maximum surprisal value to generate a second normalized compliance score;

combine the first normalized compliance score and the second normalized compliance score to identify a compliance of the first and second computing resources with respect to the policy;

identify a priority associated with determine when to perform a repair action to correct a defect associated with the first computing resource or the second computing resource based on the identified compliance, performing of the repair action to correct the defect; and initiate performance of the repair action at a scheduled time, the scheduled time based on the compliance.

* * * * *